(12) United States Patent
Shono et al.

(10) Patent No.: US 9,662,579 B2
(45) Date of Patent: May 30, 2017

(54) GAME CONTROL METHOD AND SERVER FOR SOCIAL GAME FOR DEVELOPING A SOCIAL NETWORK

(71) Applicant: CRAFTS & MEISTER CO., Ltd., Chuo-ku, Osaka (JP)

(72) Inventors: Takashi Shono, Osaka (JP); Noritaka Funamizu, Osaka (JP)

(73) Assignee: CRAFTS & MEISTER CO., LTD, Osaka (JP)

( * ) Notice: Subject to any disclaimer, the term of this patent is extended or adjusted under 35 U.S.C. 154(b) by 254 days.

(21) Appl. No.: 14/229,249

(22) Filed: Mar. 28, 2014

(65) Prior Publication Data
US 2014/0357360 A1 Dec. 4, 2014

Related U.S. Application Data

(63) Continuation-in-part of application No. 14/089,462, filed on Nov. 25, 2013, and a continuation-in-part of application No. 13/852,054, filed on Mar. 28, 2013, now abandoned.

(60) Provisional application No. 61/826,834, filed on May 23, 2013.

(30) Foreign Application Priority Data

Oct. 4, 2013 (JP) .................................. 2013-208779
Feb. 25, 2014 (JP) .................................. 2014-034578

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| A63F 13/46 | (2014.01) |
| A63F 13/49 | (2014.01) |
| A63F 13/795 | (2014.01) |
| A63F 13/573 | (2014.01) |
| A63F 13/48 | (2014.01) |
| A63F 13/71 | (2014.01) |
| A63F 13/58 | (2014.01) |

(52) U.S. Cl.
CPC .............. *A63F 13/46* (2014.09); *A63F 13/48* (2014.09); *A63F 13/49* (2014.09); *A63F 13/573* (2014.09); *A63F 13/795* (2014.09); *A63F 13/58* (2014.09); *A63F 13/71* (2014.09)

(58) Field of Classification Search
CPC ............ A63F 2300/50; A63F 2300/531; A63F 2300/8017; A63F 13/833; A63F 13/837
See application file for complete search history.

(56) References Cited

U.S. PATENT DOCUMENTS

2011/0065511 A1* 3/2011 Mahan .................... A63F 13/12
463/40

\* cited by examiner

*Primary Examiner* — Milap Shah
*Assistant Examiner* — Jason Pinheiro
(74) *Attorney, Agent, or Firm* — KMF Patent Services, PLLC; S. Peter Konzel; Kenneth M. Fagin

(57) ABSTRACT

A social network game and a server device are provided. It is so configured that registered users have different items depending on their registered groups; connections with other users which are the characteristics of the social network game are achieved in a fighting game; and the timings of communication between the server and a portable terminal are reduced as much as possible during the game, whereby communication errors and interruption of the game are avoided.

10 Claims, 35 Drawing Sheets

FIG.31

| Probability | Case 1 | Case 2 |
|---|---|---|
| 10% | Technique 1 | Technique 5 |
| 15% | Technique 2 | Technique 4 |
| 20% | Technique 3 | Technique 3 |
| 25% | Technique 4 | Technique 2 |
| 30% | Technique 5 | Technique 1 |

FIG.32

| Technique | Hit Distance | Reaction | Action Initiate Time | Power |
|---|---|---|---|---|
| A | H1 | W1 | T1 | P1 |
| B | H2 | W2 | T2 | P2 |
| C | H3 | W3 | T3 | P3 |

| Item | classification | cost |
|---|---|---|
| A | 0 | 10 |
| B | 0 | 30 |
| H | 1 | 50 |
| I | 1 | 100 |
| P | 2 | 0 |
| ... | ... | ... |

FIG.40

| Group | Name | Item 1 | Item 2 | Item 3 |
|---|---|---|---|---|
| 0001 | AAA | J | L | M |
| 0002 | BBB | H | I | J |
| 0003 | CCC | K | J | — |
| 0004 | DDD | H | — | — |
| ... | ... | ... | ... | ... |

FIG.41

| User | Group |
|---|---|
| 00000001 | 0001 |
| 00000002 | 0001 |
| 00000003 | 0002 |
| 00000004 | 0003 |
| ... | ... |

FIG.42

| User | Item 1 | Item 2 | Item 3 | Item 4 | Item 5 |
|---|---|---|---|---|---|
| 00000001 | A | D | E | M | L |
| 00000002 | B | C | G | J | M |
| 00000003 | E | F | H | I | J |
| 00000004 | A | C | E | K | J |
| ... | ... | ... | ... | ... | ... |

Fig.49 (A)   CN
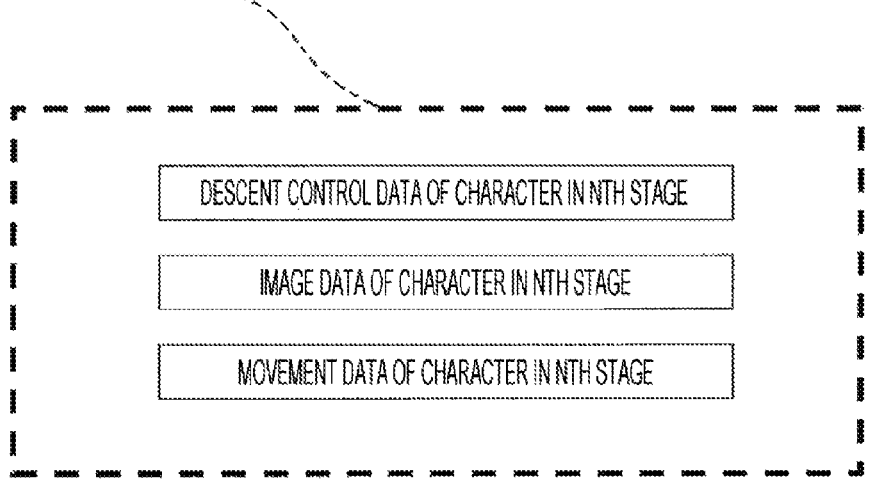
Fig.49 (B)
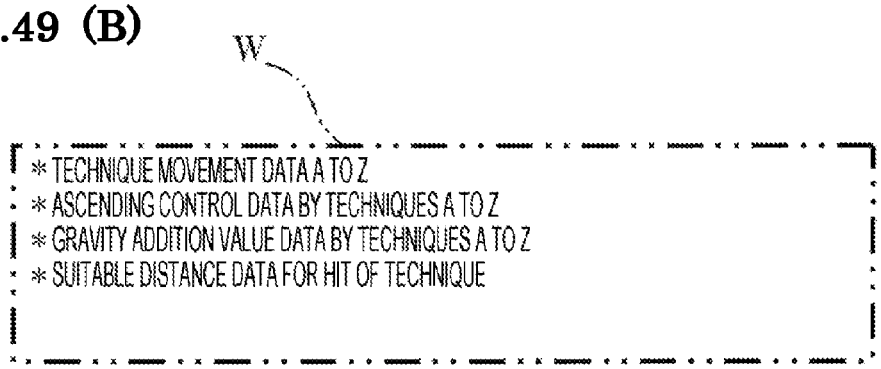

GAME CONTROL METHOD AND SERVER FOR SOCIAL GAME FOR DEVELOPING A SOCIAL NETWORK

BACKGROUND OF THE INVENTION

1. Field of the Invention

The present invention relates to a game control method and a server device suitable for developing a social network among a plurality of users in a social game such as a fighting game or a card game which registered users play one-on-one.

2. Description of Related Art

Social game is defined as a "Game provided on a Social Networking Service. Social games are played via the internet and, unlike conventional video games, it is not necessary to purchase hardware and software in advance and, in general, it can be played for free using a computer or hand phone with internet connectivity. While a social game can be registered for and initiated with free of charge generally, its business model is to offer various items by charging on a deferred payment basis the registered users hoping to be advantageous in the game. As a social game is a game using the internet, unlike conventional game software provided as a software package, it is possible to manage with updates such as adding new functions. Further, one of the characteristics of social games is, with a comparatively easy operation, it can be enjoyed easily.

Another definition is as follows. Social game is a game deployed on an application platform provided by a social networking service. Social game may be also called as a "Social Networking Service Game". Social game is an online game successfully involving social relationships among SNS users within the game system and in general, is operated in the internet browser or on an installed application of the registered users' client terminals.

In general, in a social game, determination of a game operation and recording of game information is conducted on the server device and the client terminal corresponds to a display device for the determined operation.

However, the inventors of the present invention thinks that it may be an important element to cause, in some social games where all the operations for generating movies to display various movements of characters appearing in the game in some social games are performed by the server device, the controller including the CPU of the client terminal to execute part of the operation processes in future game.

Under such situation, in social games, the client terminal can be selected without any restriction on functions or types and it is possible to deploy on an information device or information tools such as a hand phone, smart phone or PC, which are already widely used.

Hence, the strength of a social game is to be able to access a large number of people and social games have been increasing the market share in the game industry.

It is said that the price reduction on consumer game devices in summer 2011 was for the purpose of countering social games by in consideration of the disadvantage of the consumer game devices that dedicated hardware is required to play a game.

Most of the titles are made based on the concept of gathering many registered users widely and the content of a game is very simple and can be played in a very short time, for example, on a work break. On the contrary, a game can be played intermittently in a short period of time, in other words, a social game differs from consumer games and arcade games in that a game can be played easily, and it can be imagined that it is an approach method necessary for social games. That is to say, it is totally the opposite idea to a game design for entertaining users to make them deeply involved in the game world.

Those players who are engrossed with this type of game do not consider a difficult or intricate game as a "challenging game" but consider it as a "boring game" or "bothering game".

However, there still are many who enjoy both of those conventional difficult games and social games, considering conventional games and social games as separate games.

The basic play of many titles is "free to play" and ultrahigh-spending registered users, who spend a large amount of real money on online games and account for about 3% of all registered users, and registered users who spend about a few thousand Japanese yen per month are the major source of profit.

Although 70 to 80% of the registered users play totally free of charge, they are important for game providers as they may become chargeable registered users in the future, they may become a hunting target who are easily defeated by money spending users in a match-up element among users, and they may act as a loser necessary for the spending users to feel superior thinking "I am strong and I am superb."

As such, the characteristics of a social game is that, by lowering the hurdle to participate in a game compared to conventional consumer games which require users to purchase a dedicated gaming device and play with dedicated software, registered users who spend a lot of money to be advantageous in the game, and registered users who play for free not willing to be advantageous in the game, and registered users who are in the middle and willing to play by interacting with each other are able to play the game interacting with a wide range of people.

When a match-up game such as a fighting or card game where registered users play a one-on-one match-up online was applied to a social game, both of the users in the match-up were required to maintain a constant internet connection.

However, as an online match-up game cannot be played if users become offline during the game or the connection is disrupted due to the change in connection condition, the social game with users who prefer to play in a short time between their errands was not suitable for this type of social game. Therefore, there has been no genre such as a fighting game or card game in a social game, or very few if any.

In addition, in shooting games, since many users wish for short-time games, there have been not so many social games of this genre. Furthermore, in general, in case of a social game, since the game calculation process is executed not on the user terminal such as smart phones but on the server side, the story of the game can be changed while researching the preferences of users. Therefore various events are sometimes performed by separating by the day of the week and time.

In such events, a challenge in which a certain rare item can be obtained by clearing a mission which appears for a limited time is set to attract players.

However, such a challenge had been hardly considered as making use of a state that the user terminal which is not operated by a player is not started as described above but the game program is constantly executed on the server.

The reason for this is that the event needs to be announced to player in advance. Therefore, it is necessary to allow a sufficient time to make an event known to players before generating an event.

(Problems in Fighting Games and Card Games)

As one method, the inventors of the present invention came up with a game in which the order of input actions such as attack and guard in a fighting game or the order of cards used in a card game is set in advance and a match-up is played with other users at a predetermined timing based on the preset contents. However, although this enables to solve the issue to avoid a situation where it was impossible to continue due to the communication cut or game stop by user's secede, there was still an issue of lack of close social interactions among users in social games. For example, in a strategic type of game where registered users are required to expand their territory, each registered user becomes the owner of the territory and form alliances with other registered users or become dependent after a loss. This provides the social amusingness of a social game. However, in a one-on-one match-up game such as a fighting or card game, it is difficult to create a situation where users are required to cooperatively accomplish the mission, and also difficult for the registered users to find benefits from making an alliance.

The inventors of the present invention thought it is necessary to have a game control enabling to develop a social network among registered users, to give the benefit to registered users belonging to a certain group and to organically relates to a fighting and card game.

In addition, merely executing the game with another player connected by the network by operating the character of the player's own avatar in an online match-up game is no different from online competitions in arcade games or match-up games using personal computers. Moreover, there has been the problem that the player's own character can only be raised by the player him/herself. That is, even when the player is not playing the game, the part which is mainly in charge of the game control process is the server as described above in the social network games. The inventor of the present invention thought of constructing a new growing game by making good use of this hardware-like environment.

Furthermore, in a fighting game, a match-up between an opponent character controlled by the controller of the server and an avatar character (ally character or operated character) which can be operated by using a touch panel of the user's (game player's) game terminal of the client as an input device is executed, the communication timing between the server which calculates the game process as mentioned above and the game terminal which can be normally conceived is as follows:

That is, it would be so configured that every time the game player operates the touch panel of the game terminal, the operational signal made on the touch panel is transmitted from the game terminal to the server. However, in the case where such a construction is employed, card games and like game, in which frequent operation is not made by the game player, do not involve such frequent transmission of the operational signals, while in case of a fighting game, the frequency increases. Therefore, when the communication environment worsens or like situation occurs even for a moment, communication errors may occur, or a delay in the communication might have affected the victory or defeat of the fighting game.

Therefore, the inventors of the present invention conceived of a configuration in which the game programs are dispersed and stored in advance in the server and the game terminal only for a specific OS of cellular phones was provided, and part of the game program is stored in the storage unit of the game terminal to be executed by the controller of the game terminal, so that the number of communication between the server and game terminal is minimized, to overcome the problems mentioned above.

In particular, dispersing the program itself in such a manner to perform operation processes by different controllers is not especially novel in the computer technology. However, in order to reduce the possibility that the game outcome is affected by the communication environment, there has been some technical problems that the calculation process of which part should be executed by the controller (CPU) on the game terminal side, i.e., the division of roles of the controller of the game terminal and the controller of the server, and the structure of the communication timing should be paid attention to.

(Problems of Shooting Games)

In the case of the shooting game, match-up types and such games in which boss characters are defeated to sequentially clear the stages (boss characters are set for each stage in advance) are commonly found, merely applying a shooting game in which stages are cleared to a social game does not make good use of the hardware-like environment of the social game itself as described above. The inventors of the present invention thus thought if they could create a new challenge.

The same applies to the shooting games as to the fighting games mentioned above. No delay in communication should occur in such a situation that a number of missiles shot by the opponent character are dispersed around the operated character (for example, fighter aircraft) and coming after the operated character, or any influence on the victory or defeat of the game or incapability of the continuation of the game due to the occurrence of interruption in the communication should be avoided.

SUMMARY OF THE INVENTION

The present invention is a game controlling method in a social game in which a one-on-one match-up is conducted among registered users using one or more items selected from possession items; the method comprising: storing, in advance, in a database a plurality of general items and a plurality of special items, the general items being items which the registered users may possess, and the special items being items which said registered user belonging to a group may possess and said registered user not belonging to a group may not possess; according to a request from a first registered user requesting a generation of the group, storing in the database the generated group associated with at least one or more of the special items; and according to a request from a second registered user requesting participation in the group, storing in the database the second registered user associated with the group and giving the second registered user the right to possess one or more of the special items associated with the group.

According to the above structure, the special item is associated with the group by the first registered user generating the group. And the second registered user to participate in this group may select the special item associated with the group. As the group is associated with the special item selected by the first registered user generating the group, the second registered user may enjoy the benefit of possessing different special items depending on the group which the second registered user participates in. Hence, the registered users are given meaning of participating in a group and it may promote building the social connection among the registered users within the group by belonging therein.

Further, in the game controlling method of the present invention, the special items are more advantageous to the game than the general items.

Further, in the game controlling method of the present invention, a consumption cost is set for said special item in advance, and the first registered user may associate the special item with a group in exchange for a possession cost possessed by the first registered user.

Further, in the game controlling method of the present invention, a consumption cost is set for said item in advance and said registered user may possess the item in exchange for a possession cost possessed by the registered user.

Further, in the game controlling method of the present invention, said registered user may possess the possession cost by purchase on credit.

Further, in the game controlling method of the present invention, the possession cost increases according to an elapsed time.

Further, the present invention is a server configured to provide a game in which a one-on-one match-up is conducted among registered users using one or more items selected from possession items, the server: having a database in which a plurality of general items and a plurality of special items are registered, the general items being items which the registered users may possess, and the special items being items which said registered user belonging to a group may possess and said registered user not belonging to a group may not possess; according to a request from a first registered user requesting a generation of the group, storing in the database the generated group associated with at least one or more of the special items; and according to a request from a second registered user requesting participation in the group, storing in the database the second registered user associated with the group and giving the second registered user the right to possess one or more of the special items associated with the group.

A game control method in which, while an opponent character displayed on a display screen of a portable terminal is floating in the air, and until the opponent character reaches a lower point position which triggers the termination of the game set in advance, a technique of the operated character made in response an input to a touch panel for play input of the portable terminal a game control method for calculating a game score associated with the cumulative number of the technique which has hit the opponent character, a controller of the server or terminal executing:

the process for controlling a state that the opponent character descends based on descent control data of the opponent character stored in advance, the process for determining the outcome of success or failure of the technique operated in response to data for determining failure or success of the technique on the opponent character stored in advance for each the technique and the timing of input made through the touch panel by tapping on an image of the technique of the opponent character, the process for executing, when the result of the determination is a success, a control of limiting ascending or descending the opponent character depending on the descent control data for each of the techniques stored in advance, when the result of the determination is a success, a process for executing a process for updating and storing the cumulative data associated with the number of success, transmitting the cumulative data to the server only at the timing which is determined as having reached the lower point position.

An important point here is that the communication process between the portable terminal and the server from the time when the game is started when the game is started, it is so controlled that no communication takes place for executing the game until the timing that it is determined that "the lower point position is reached". Of course, communication is performed to check the communication state between the portable terminal and the server, but it is defined in the first game program that the communication with the server is not necessary for the game to progress as described later. Accordingly, if the communication between the portable terminal and server is interrupted due to any communication failure during the game, there is no risk that the game becomes unfeasible because of this communication failure. This control process is a key factor in social network games.

In addition, the game program for social networks in the present invention includes:

a first program stored in a memory of the terminal downloaded onto (hereinafter referred to as terminal) a portable terminal which is made portable by including an internal electrical power source from an external server for downloading games; and a second program in which the terminal executes the first program responsive to an input to start a game from the input device provided in, the terminal via an operation system program stored in the terminal in advance by the execution of this first program, connected to the server or another server (hereinafter collectively referred to as server) stored in the memory of the server which is capable of executing the game in cooperation with the first program, and the program for social network game executing the following processes utilizing the computer.

(A) in response to the acceptance of the input of to start the game from the input device of the terminal, the first program transmits a signal requesting connection to the external server in which the second program is stored, (B) in response to receiving the signal, the second program, prepares data which is necessary for executing the game based on game progress information contained in the signal, and is also the data to be download into the terminal, and further transmits the prepared data to have it stored in the memory of the terminal, (C) the first program setting the game executable upon storing of the data necessary for executing the game in the memory of the terminal, causing the terminal to execute a process to accept game input to the input device, (D) a single turn or stage has ended in the game executed in the terminal (ending of a unit game, the entire game is so configured to repeat a plurality of the unit games) responsive to the determination by the execution process of the first program, transmitting the signal to request connection to the server in which the second program is stored automatically by the execution of the first game program, (E) based on the game progress information contained in the signal, updating the game progress information stored in each terminal in the server corresponding to terminal identification data contained in the signal, (F) the above processes (B) to (E) are executed, and the transmission frequency of the server and the terminal is controlled to occur only at the start of the unit game and the end of the unit game.

In such a manner, the server and the terminal are caused to perform the preparation of transmission and transmission process of the data for executing the next game on the server side, and no communication with the server is made while the unit game is performed on the terminal side, and therefore the technical problems originating from the environment and construction peculiar to social games as mentioned above can be easily avoided.

It should be noted that the term OS stands for Operation System, which is literally translated a "guide system". More specifically, it denotes the most fundamental software which serves to transmit the information input from keyboards, mouse touch pads and like devices to the application.

In addition, the following invention can be also provided:

A control program of communication timing in a fighting game for controlling communication timings between a server and portable terminal in a game for social networks with a fighting motif, the control program being stored in the storage device of the portable terminal, and executing the following processes under the control of the controller of the portable terminal:

a) when a game start input signal is received from the input device from the portable terminal, starting a fighting game,
b) storing a score updated as need of the fighting game in the storage device of the portable terminal,
c) forcibly ending the fighting game when a predetermined end trigger of the fighting game is detected,
d) after or simultaneously with the process (c) mentioned above, transmitting the score stored in the storage device or the game outcome information associated with the score to the server, the process of transitioning to the standby state for receiving the information based on the game outcome information related to the score from the server, and
e) triggered by the receipt of the information from the server, the process of switching from a reception-disabled state of the start of the next game to a reception-enabled state is executed by the input device.

Instead of repeating the connection state between the server and portable terminal at a predetermined timing constantly during the fighting game, communication is caused to be executed only at the end of the game, and the control program containing the game program stored in the portable terminal is caused to execute the unit game only by the program and the controller the portable terminal without requiring any information from the server, whereby even in a fighting game characterized in that inputs are frequently executed, it is more likely that no process error occurs even in an unstable communication state, and the unit game can be performed trouble-free from the beginning to the end. Communication with the server is executed at end of the game, but the next game is not started until the information received from the server is obtained, and therefore, for example, even in an unstable communication state where communication frequently goes on and off, the processes as described above are executed, and therefore the risk that the game is interrupted can be reduced.

According to the present invention, a new control method and a server device of a game can be provided by making use of the characteristics of social network game.

BRIEF DESCRIPTION OF THE DRAWINGS

FIG. 31 shows an example of a technique selection table.

FIG. 32 shows an attribute of a technique used in a game control method according to an example of the social game.

FIG. 40 is a table showing group items.

FIG. 41 is a table showing groups users belong.

FIG. 42 is a table showing user's items.

FIG. 49(A) and FIG. 49(B) are schematic drawings which show the type of the data stored in a specific region of the storage unit 12 or 13. FIG. 49(A) shows the data about the opponent character varying with each stage, while FIG. 49(B) shows the data which is indicative of the properties of the move varying with each technique with each technique.

DETAILED DESCRIPTION OF THE INVENTION

The game control method and server of the present invention is suitable for a social game where registered users play a one-on-one match-up using one or more items selected from the items they possess. For example, the social game is a game such as a fighting game or match-up card game where registered users play a one-on-one match-up. An example of such match-up game will be explained in details referring to FIG. 1 to FIG. 34C.

Figure 35:
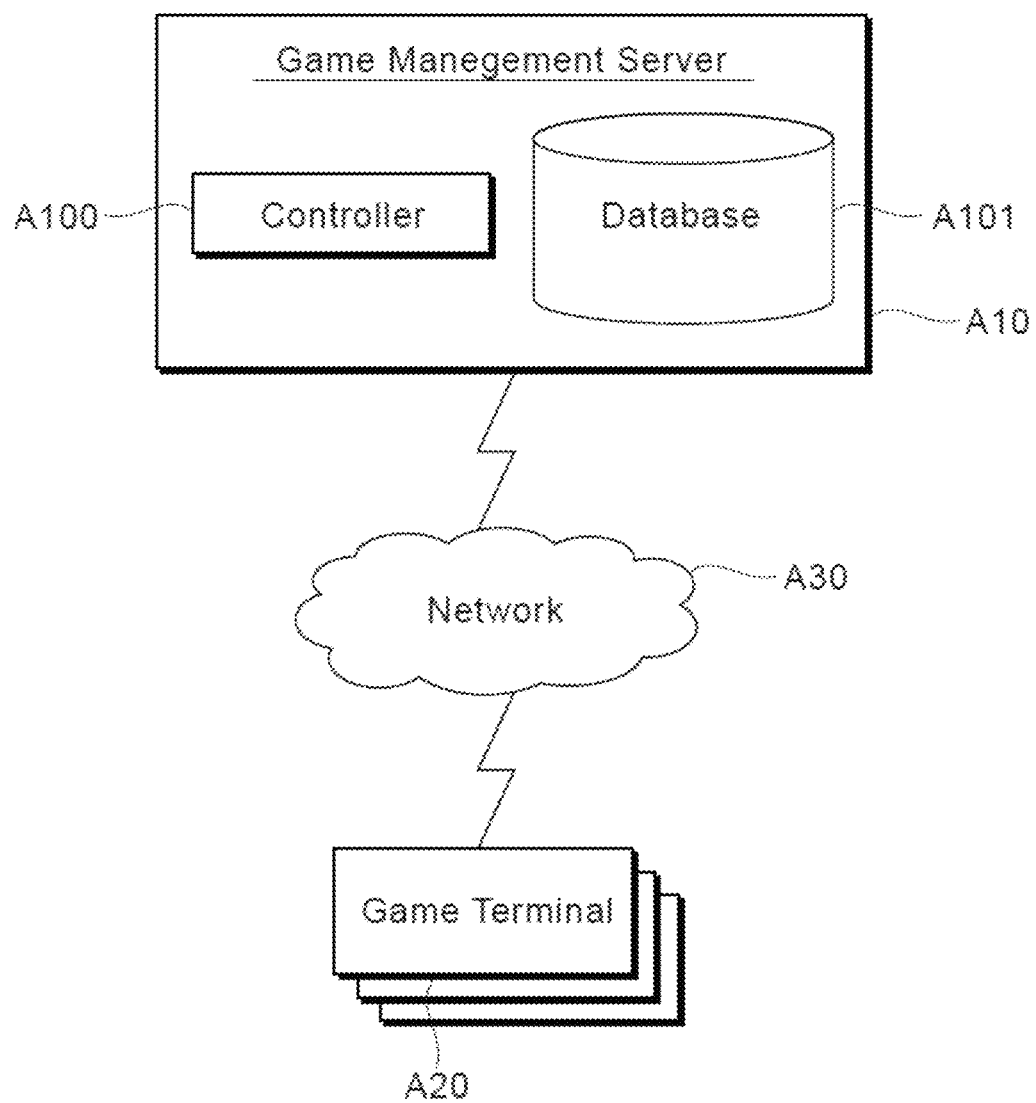
FIG. 35 is an explanatory diagram showing a structure of a game management server.

Such social game is mainly executed on a game management server A10 (server device) shown in FIG. 35. The game management server A10 is connectible through an internet A30 from a game terminal A20 (client terminal) which a registered user possesses. The game management server A10 comprises a controller A100 and a database A101. The game management server A10 is a computer and comprises memory devices such as a CPU (Central Processing Unit), EEPROM (Electrically Erasable and Programmable Read Only Memory) re-writeable storing programs executed by CPU and data used by these programs, and RAM (Random Access Memory) temporary storing data therein when executing a program. The game management server A10 realizes function of the controller A100 and the database A101 in cooperation with these hardware and software in the memory device. The game management server A10 is not limited to one computer and may be a plurality of computers having divided functions.

As such, the game management server A10 has an internal memory, a memory device and a communication module similar to an example of the social game which will be described later. (see FIG. 4) Further, the game terminal A20 has a controller, an internal memory, a memory device and a communication module similar to an example of the social game which will be described later. (see FIG. 4)

A "registered user" is a user having an account for a social game. The registered user is able to operate a social game by logging in to the account.

Further, an "item" is set in advance in order for the registered user to play a match-up with other registered users. For example, an "item" is such as a card in which operations of attacking or guarding action techniques of avatars (virtual character of the registered user on the internet) in a fighting game or status in (attacking power, guarding power, character) in a card game is set. If the registered user sets one or more "items" prior to the game, a one-on-one match-up by the registered users will be conducted at a predetermined timing with the set "items". That is, for the registered user, the match-up is automatically conducted by setting the "items" at a desired timing.

"Registered user's item" is an "item" which the registered user can set for a game in a social game. The "item" can be possessed in exchange for a cost which the registered user has. The cost is a currency in a social game, which increases by charging (purchase on credit) or as time elapses. In other words, the registered user is able to possess "items" by consuming a cost.

Figure 36:
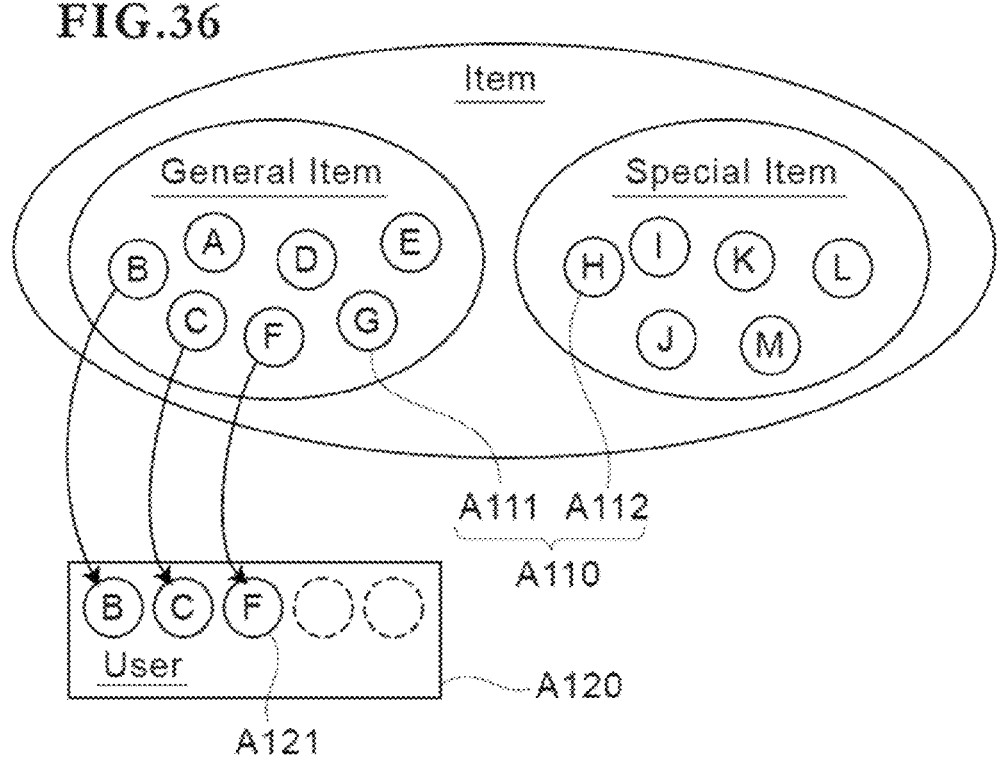
FIG. 36 is an explanatory diagram showing an outline of the social game.

In the present embodiment, a plurality of items A110 are registered in advance in the database A101 of the game management server A10. As shown in FIG. 36, the items A110 are at least classified into a plurality of general items A111 and a plurality of special items A112. Any registered user may possess the general items A111. That is, the registered user may obtain an item by consuming a cost and register it as his/her possession item A121.

As shown in FIG. 36, in the present embodiment, a registered user A120 may register five possession items A121 but it is not limited to that. It is possible to randomly obtain a general item A111 by consuming a predetermined cost, or obtain a desired general item A111 by consuming a preset cost.

Figure 37:
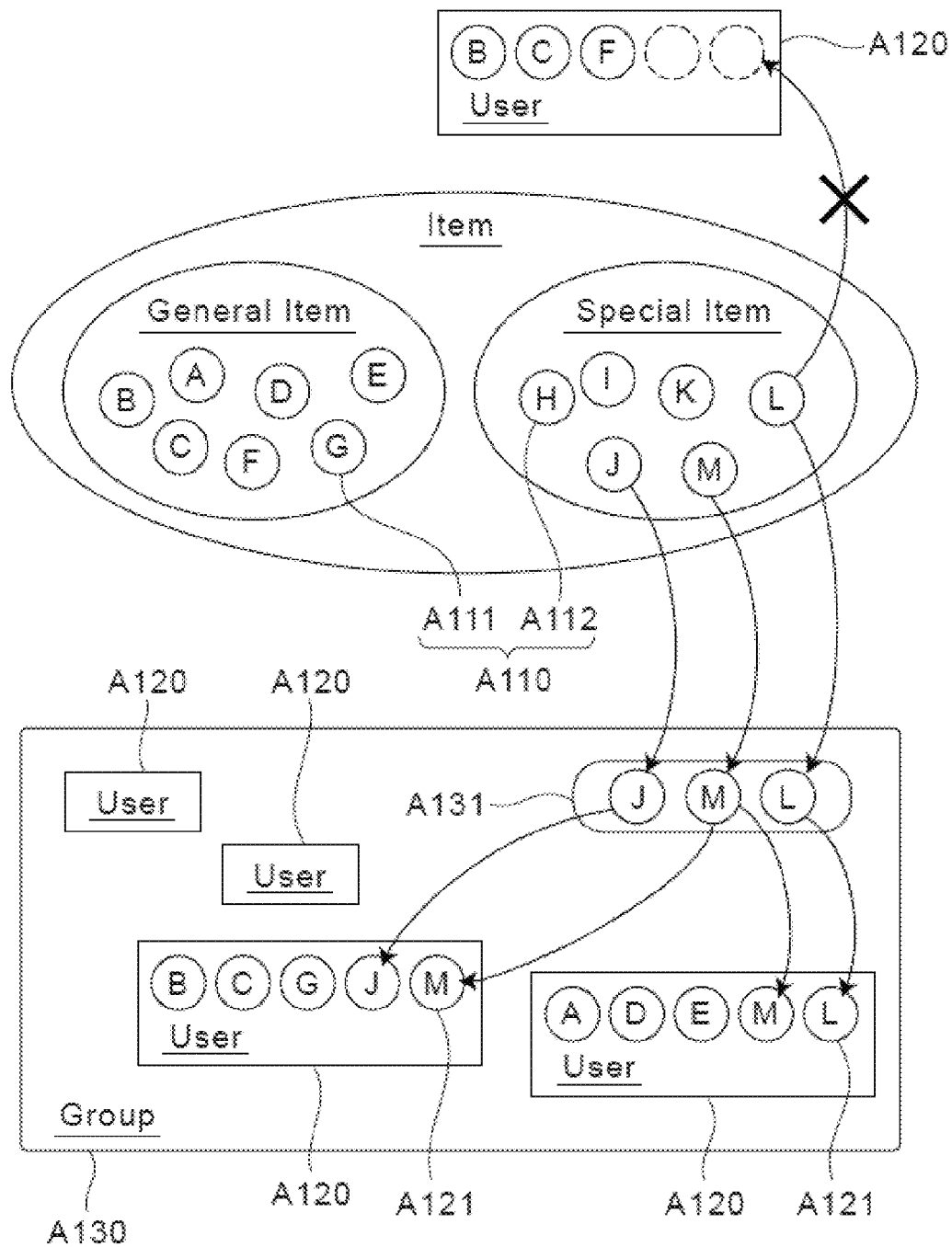
FIG. 37 is an explanatory diagram showing an outline of the social game.

As shown in FIG. 37, a registered user A120 in a group A130 may possess special items A112 but a registered user A120 not in the group A130 may not possess special items A112. That is, a registered user A120 may possess a special item A112 associated with the group A130 by participating in said group. Further, a registered user A120 in the group A130 may obtain one or more special items A120 from the plurality of special items A120 (a group item A131) associated with the group A130.

The group A130 is generated by any registered user A120. The registered user A120 (a first registered user) generating the group A130 determines one or more group items A131 from a plurality of special items A112 when generating the group A130. Group items A131 may be determined by the first registered user's selection or may be determined randomly. Further, the group A130 may be generated by consuming a cost. Group items A131 may be determined by consuming a cost.

A registered user A120 who sends request and participate in the group A130 (a second registered user) may obtain and possess one or more special items A112 from the group items A131 of said group A130. Special items A112 to be obtained from the group items A131 by the second registered user may be determined by the second user's selection or randomly. The second registered user may obtain a special item A112 of the group item A131 by consuming a cost.

The first registered user and the second registered user are distinguished from each other by the differences of their operations and not by account. Therefore, all the registered users may generate a group and may belong to a group. The registered user who generated a group may mandatorily belong to the group that the user generated, or may belong to another group. The registered user may belong to a plurality of groups.

The registered user operates the game terminal A20 as the first registered user or as the second registered user.

Figures 38, 39:
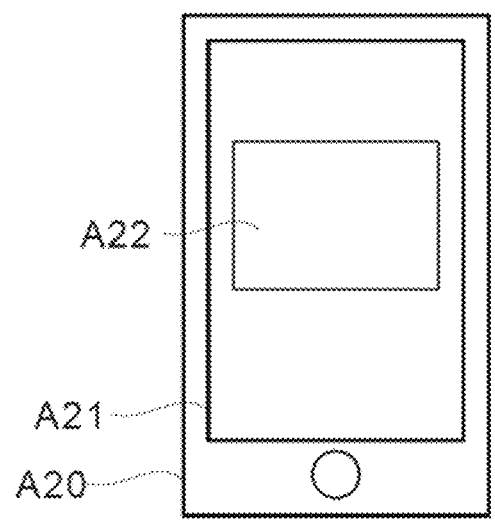
FIG. 38 is an explanatory diagram showing the game terminal.
FIG. 39 is a table showing item classification definitions.

As shown in FIG. 38, the game terminal A20 has a touch screen panel A21. The game terminal A20 receives the response from the game management server A10 and displays contents of the response on a display device such as the touch screen panel A21 of the game terminal A20. The contents of the response may be displayed in a web browser or may be displayed by dedicated application software. The game terminal A20 may be a hand phone, a tablet terminal such as a smart phone, or a PC.

The touch screen panel A21 also act as an input device of the game terminal A20. That is, the game terminal A20 may send a request to the game management server A10 according to input from the registered user to the touch screen panel A21. For example, as shown in FIG. 38, the game terminal A20 displays a for-input image A22 on the touch screen panel A21. The for-input image A22 may include such as buttons, text fields, radio buttons and check boxes.

For example, the game terminal A20 accepts input from the registered user by touch operation to the for-input image A22 and sends the input contents to the game management server A10 as a request. Upon receipt of the request from the game terminal A20, the game management server A10 executes an operation predetermined depending on each request. As such, the game terminal A20 mainly functions as an input device and display device in a social game.

(Game Management Server)

The game management server A10 will be explained in details below.

The database A101 of the game management server A10 has various tables as shown below.

(Definition Table for Item Kind)

FIG. 39 is an item classification definition table. The item classification definition table is a table defining under what conditions each item (such as a technique or card) can be possessed.

The item classification definition table has item columns and classification columns. In the item columns, IDs (item ID) for identifying items are stored. In the classification columns, IDs for identifying classifications of items are stored. The items in the current embodiment are classified into the general item A111 which the registered users may possess, the special item A112 which a registered user in a group may possess and a registered user not in the group may not possess, and a conditioned item A113 which a registered user may possess by fulfilling a predetermined condition in a social game.

In the item classification definition table, the general item is shown as "0", the special item is shown as "1" and the conditioned item is shown as "2". Conditioned items A113 may have different conditions from each other, or multiple conditions may be set to one conditioned item A113. The conditioned item A113 may be obtained automatically by the registered user fulfilling the set condition in the social game. Alternatively, the right to obtain the conditioned item A113 may be given by fulfilling the set condition in the social game.

The item classification definition table is referred to when the registered user obtains an item. For example, when the registered user obtains a general item, the user may obtain only from the general items with the classification "0" by consuming a set cost. Further, the definition of each item itself (name of the item, action status etc.) is defined in association with the item ID in a separate table which is not shown.

This item classification definition table usually does not change. That is, the game management server A10 does not change, add or delete data in the item category definition table by receiving a request from the game terminal A20. In other words, a social game administrator changes, adds or deletes data in the item category definition table only for the purpose of server maintenance or the like of the game management server A10.

(Group Item Table)

FIG. 40 shows a group item table. The group item table is a table storing therein generated groups in association with special items A112.

The group item table has group columns, name columns and item 1-3 columns. In the name columns, group names are stored. In the group columns, IDs (group ID) for identifying groups are stored. An identification number is assigned to a group A130 when the registered user A120 generates the group. In the item 1-3 columns, special items A112 associated with groups are stored. In the present embodiment, each group A130 is associated with three special items A112 at a maximum, but not limited to this.

In the item classification definition table, new data is added when the registered user A120 generates a group. The item classification definition table is referred to when the registered user A120 participates in the group A130 and obtains a special item A112.

(User Belonging Group Table)

FIG. 41 shows a user belonging group table. The user belonging group table is a table storing therein groups which users belong to.

The user's group table has user columns and group columns. In the user columns, IDs (user ID) for identifying users are stored. The user IDs may correspond to account IDs for a social game or unique numbers associated with the account IDs. In the group columns, IDs for identifying groups are stored. Hence, a registered user A120 is associated with a group A130.

New data is added to the item classification definition table when the registered user A120 participates in a group. The item classification definition table is referred to when the registered user A120 obtains a special item A112.

(User Possession Item Table)

FIG. 42 shows a user possession item table. The user possession item table is a table storing therein items which users possess.

The user possession item table has user columns and item 1-5 columns. The user columns store IDs (user ID) for identifying users. The item 1-5 columns store item IDs for items which registered users possess. The user possession item table is updated every time the registered user A120 updates an item.

The database A101 including these various tables is not limited to the above and may be normalized or may be redundant.

The database A101 includes a table for a social game such as the table used in the example of a social game which will be described later, and a table for registered user management (a storage table for personal information or the like defined as registered user IDs).

(Operation of the Game Management Server)

Next, an operation of the game management server A10 is mainly explained.

(Group generation/participation determination process)

Figure 43:
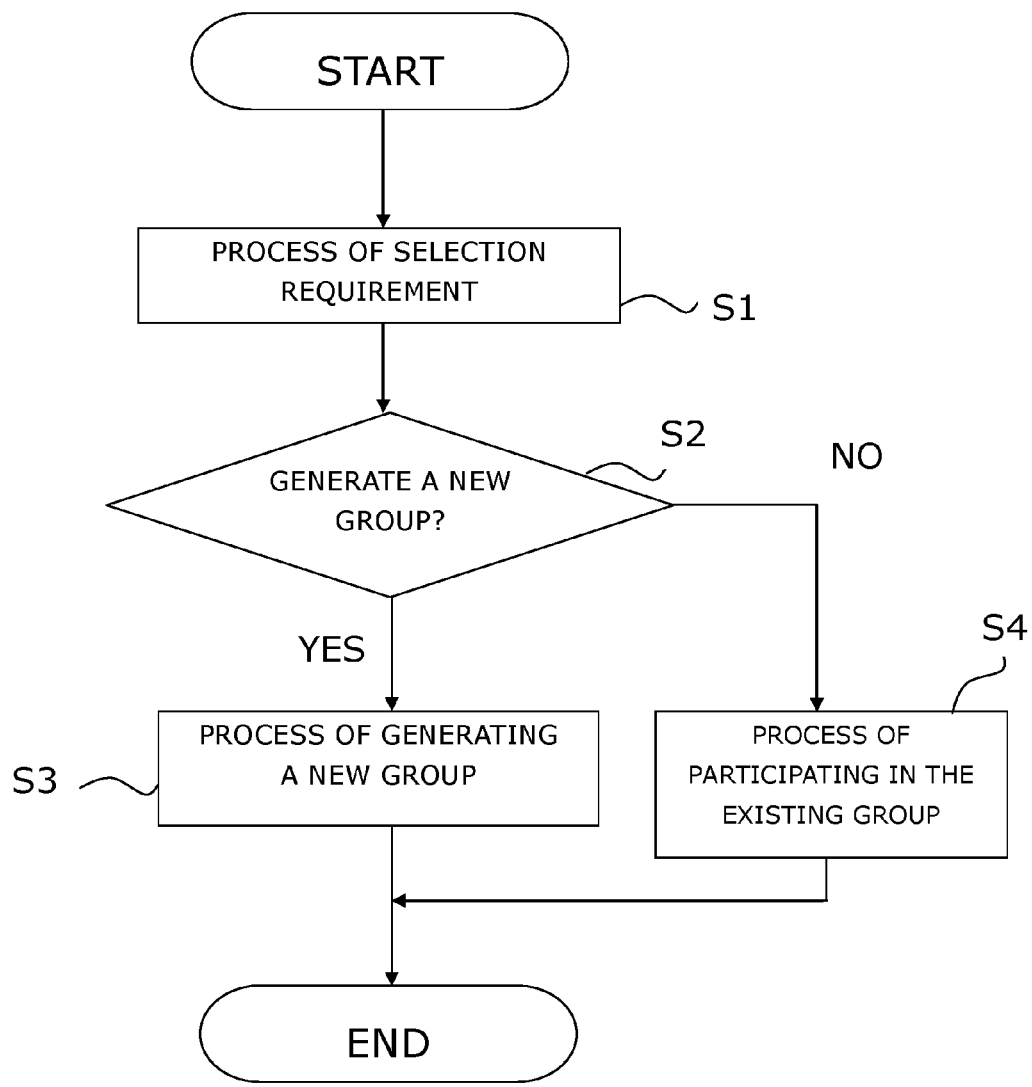
FIG. 43 is a flowchart of a process of group generation/participation determination.

Referring to FIG. 43, a group generation/participation determination process which a controller A100 of the game management server A10 executes will be explained.

The group generation/participation determination process starts when generating an account for a social game, or upon receiving a request to participate in a group, for example, when the for-input image A22 for requesting generation of or participation in the group A130 at the game terminal A20 is operated.

First, the controller A100 transmits a response to the game terminal A20 requesting to determine whether to generate a new group A130 or participate in an existing group A130 (S1). The game terminal A20 which received the response then displays, as the for-input image A22, the above options for selection on the touch screen panel A21.

Next, the controller A100 determines whether the request from the game terminal A20 is to generate a new group A130 or not (participate in the existing group A130) (S2). The controller A100 executes the group generation process if the request from the game terminal A20 is to generate a new group A130 (S2: YES) (S3). The controller A100 executes the group participation process if the request from the game terminal A20 is to participate in the existing group A130 (S2: NO). (S4) Then, this routine ends.

(Group Generation Process)

Figure 44:
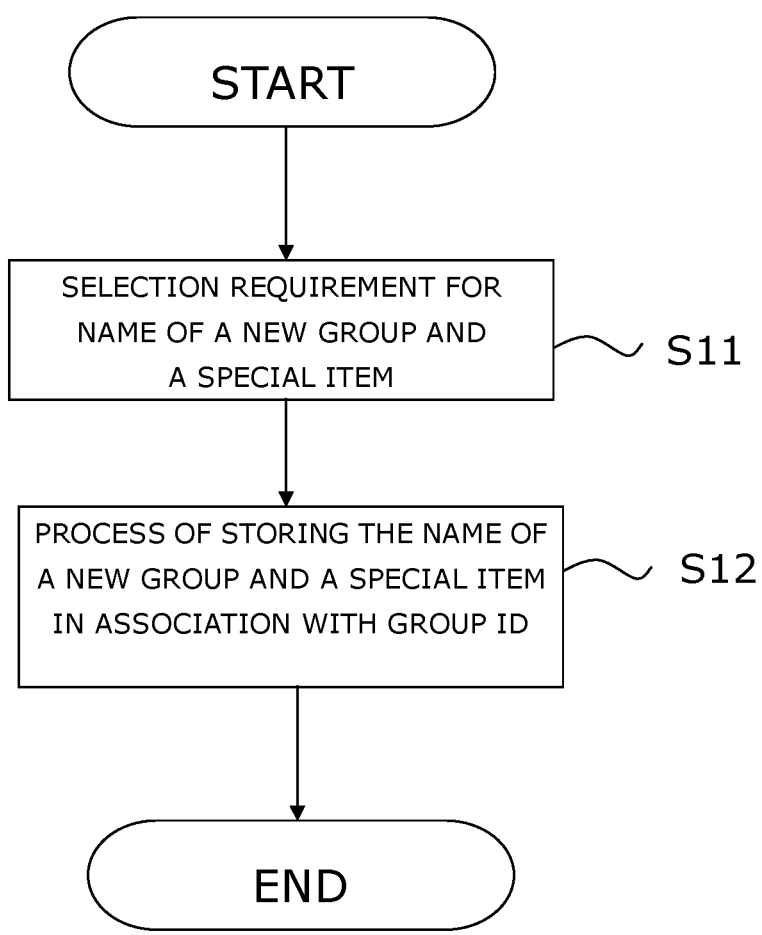
FIG. 44 is a flowchart of a process of group generation

Referring to FIG. 44, the group generation process executed by the controller A100 of the game management server A10 in the group generation/participation determination process will be explained.

First, the controller A100 transmits a response to the registered user requesting to determine the name of a group to be newly generated and to select a special item A112 to be associated with it (S11). The game terminal A20 which received the response then displays, as the for-input image A22, a text field for inputting the group name and the above options for selection on the touch screen panel A21.

Next, the controller A100 newly stores in the group item table (FIG. 40) the group name included in the request from the game terminal A20 and the selected special item A112 in association with numbered group IDs (S12). This process then ends.

As such, according to a request from the first registered user A120 to generate a group A130, the game managing server A10 stores in the database A101 the generated group A130 associated with at least one or more of the special items A112.

(Group Participation Process)

Figure 45:
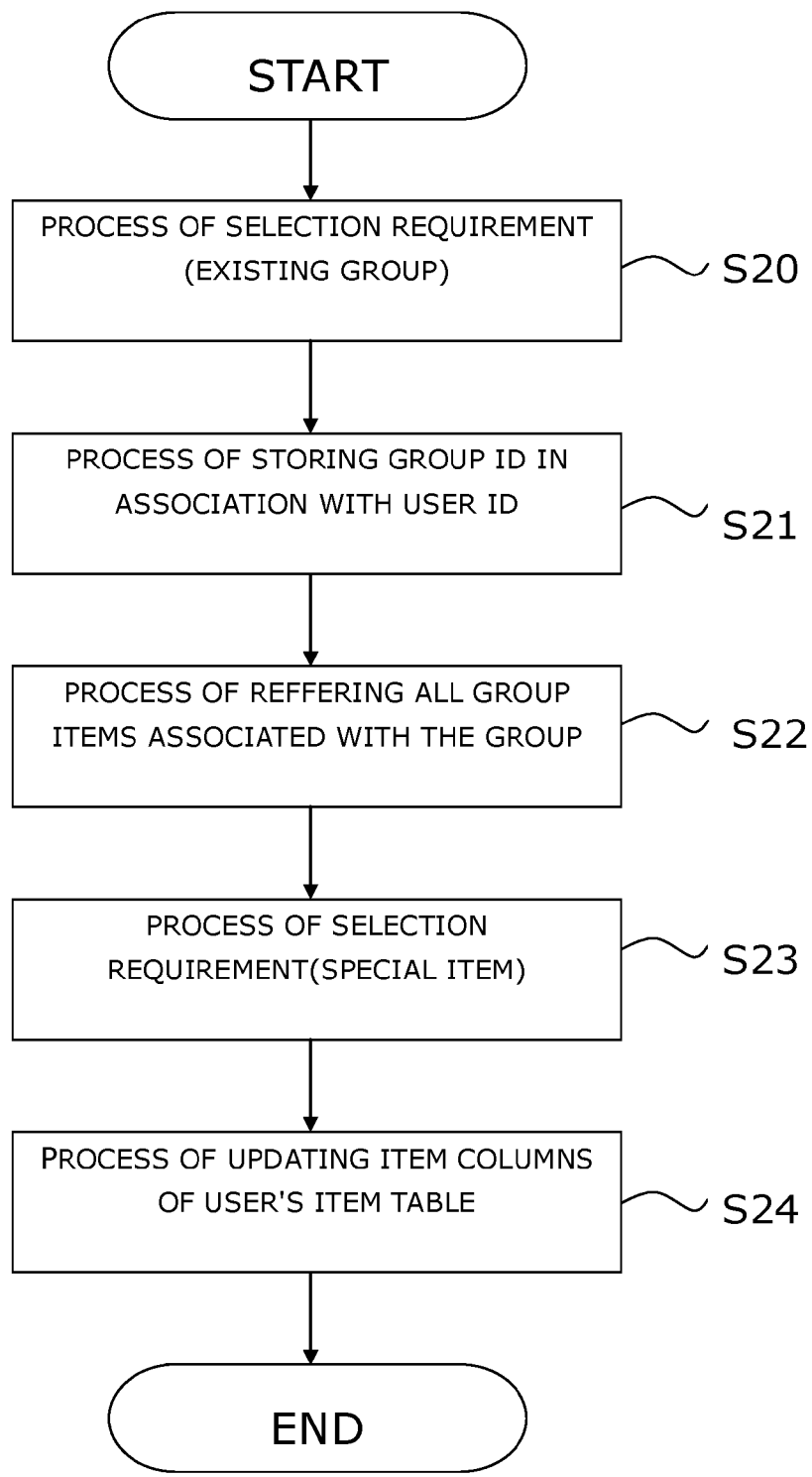
FIG. 45 is a flowchart of a process of group participation
Figure 46:
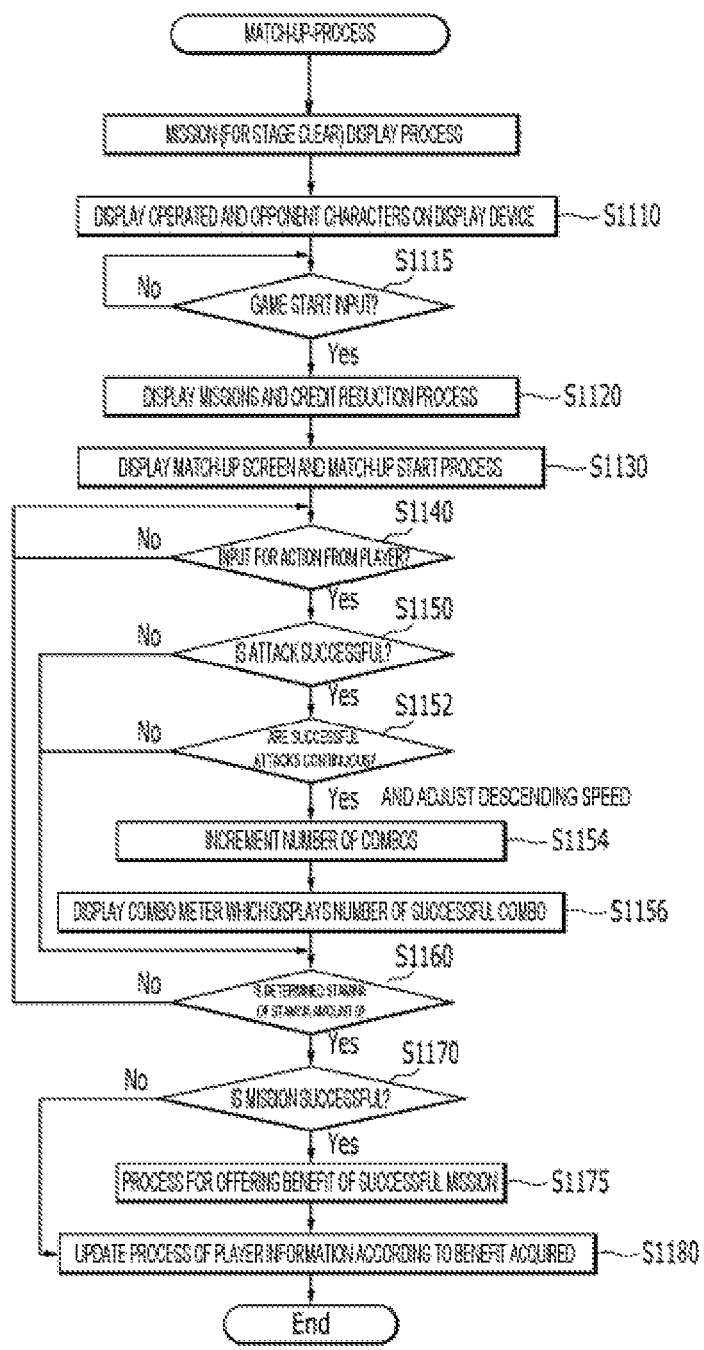
FIG. 46 is a flowchart which shows a match-up process.

Referring to FIG. 45, a group participation process which the controller A100 of the game management server A10 executes during the group generation/participation determination process will be explained.

First, the controller A100 transmits a response requesting to select an existing group A130 (S20). This response may include a name associated with the existing group A130 and the content of a special item A112. In this case, the group item table (FIG. 40) or a data table in which, for example, status of each item itself is defined, which is not shown, are referred to. The game terminal A20 that received a response displays options for selecting a group as a for-input image A22.

Next, based on the selected group included in the request from the game terminal A20, the controller A100 newly stores in the user's group table (see FIG. 41) the group ID of said group in association with the ID of the registered user who made the request. And the controller A100 refers to all the group items associated with the selected group, from the group item table. (S22) Then, a response requesting to select a special item A112 is transmitted. (S23) Here, the game terminal A20 which received the response displays all the special item A112 associated with the selected group A130 and all the items associated with said registered user in the user's item table (see FIG. 42), as for-input images A22 for a check list. That is, the registered user selects a restricted number (for example, not more than five) of items to possess.

Next, the controller A100 updates the item columns 1-5 of the user's item table (see FIG. 42) with the selected items A112 included in the request from the game terminal A20. The process then terminates.

As such, the game management server A10 stores, in the database A101, said second registered user A120 in association with the group A130 according to the request from the second registered user requesting for participation in the group A130, and provides said second registered user A120 with the right to possess one or more special items A112 out of the group items A131 associated with said group A130.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined process function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

Finally, examples of the social game which may apply the above game controlling method and the server are explained below referring to FIG. 1 to FIG. 34C.

The social game generally relates to a game control method and a recording medium.

Recently, game applications for terminals that use a touch screen panel as an input device are provided. Smart phones or tablets are examples of these terminals. The terminals access an application store, and download the game application from the application store. The terminals install the game application and execute the game application to perform a game of the game application.

A Fighting game is a video game where the player controls an on-screen character and engages in close Fight with an opponent character. A player of the Fighting game can use techniques such as attacking, blocking, counter-attacking, and chaining together sequences of attacks. A conventional Fighting game allows the player to execute various techniques by performing specific button combinations. However, it is difficult for the player to use the specific button combinations in the terminal using the touch screen panel.

An aspect of the social game provides a game control method and a recording medium for operating a Fighting game in a game terminal having a touch screen panel.

According to an aspect of the social game, a method of controlling a Fighting game is provided by a controller of a game terminal including the controller and a touch screen panel. The method includes receiving a selection of any one from among a plurality of avatars through the touch screen panel, the plurality of avatars corresponding to a plurality of other players, receiving, from a game management server, information on an avatar technique set including a plurality of technique that is set by other player corresponding to the selected avatar, and starting a match-up between a character corresponding to a player of the game terminal and the selected avatar. The method further includes repeatedly performing a process including selecting any one technique from among the plurality of techniques included in the avatar technique set and actuating the selected technique on the character.

When selecting any one technique, the controller may randomly select any one technique based on selection probabilities that are assigned to the plurality of techniques respectively.

The process may further include determining whether the actuated technique succeeds, and reducing stamina of the character corresponding to the player when the actuated technique succeeds.

Each of the plurality of techniques may have a power for determining a reducing amount of the stamina. In this case, when selecting any one technique, the controller may randomly select any one technique based on selection probabilities corresponding to the plurality of techniques. Further, a selection probability of a first technique having a first power may be higher than a selection probability of a second technique having a second power higher than the first power when a remaining amount of the stamina is less than a predetermined amount, and a selection probability of the first technique may be lower than a selection probability of the second technique when the remaining amount of the stamina is greater than the predetermined amount.

Each of the plurality of techniques may have a hit distance and an action initiate time. The process may further include determining that the actuated technique succeeds if a distance between the character and the avatar is within the hit distance when the action initiate time is lapsed from a time when the selected technique is actuated.

The method may further include reducing stamina with lapse of time, and ending the match-up when the stamina reaches zero. The plurality of techniques may correspond to a plurality of remaining amounts of the stamina. When selecting any one technique, the controller may select a technique corresponding to a remaining amount of the stamina from among the plurality of techniques.

The method may further include providing a result of the match-up to the game management server.

The method may further include receiving information on a technique set including a plurality of techniques through the touch screen panel, and starting a match-up between the character and a second character. The method may further include repeatedly performing a second process including receiving a touch on a predetermined area of the touch screen panel, selecting any one technique from among the plurality of techniques included in the technique set in response to the touch, and actuating the selected technique on the second character.

The plurality of techniques may be arranged in sequence in the technique set, and the plurality of techniques included in the technique set may be selected in sequence when any one technique is selected from among the plurality of techniques in the technique set.

The method may further include receiving a selection of a mission to be accomplished in the match-up between the character and the second character, and providing the player with a profit when the selected mission is accomplished.

The method selected mission may include a predetermined number of combos. The second process may further include determining whether the actuated technique succeeds, determining whether the actuated technique is continuous to a previous successful technique when the actuated technique succeeds, and incrementing a number of combos by one when the actuated technique is continuous to the previous successful technique. The method may further include determining that the selected mission is accomplished when the number of combos is equal to or greater than the predetermined number when the match-up between the character and the second character ends.

According to yet another aspect of the social game, a method of controlling a Fighting game is provided by a game management server. The method includes receiving, from each of a plurality of other players, information on an avatar corresponding to each of a plurality of other players, receiving a selection of any one from among a plurality of avatars corresponding to the plurality of other players from a game terminal, and transmitting, to the game terminal, information to an avatar technique set including a plurality of technique that is set by other player corresponding to the selected avatar. When a match-up between a character corresponding to a player of the game terminal and the selected avatar is started, an operation in which any one technique selected from among the plurality of techniques included in the avatar technique set and is actuated on the character is repeated.

Any one technique may be randomly selected based on selection probabilities that are assigned to the plurality of techniques respectively.

Stamina of the character corresponding to the player may be reduced when the actuated technique succeeds.

Each of the plurality of techniques may have a power for determining a reducing amount of the stamina. Any one technique may be randomly selected based on selection probabilities corresponding to the plurality of techniques.

Further, a selection probability of a first technique having a first power may be higher than a selection probability of a second technique having a second power higher than the first power when a remaining amount of the stamina is less than a predetermined amount, and a selection probability of the first technique may be lower than a selection probability of the second technique when the remaining amount of the stamina is greater than the predetermined amount.

Each of the plurality of techniques may have a hit distance and an action initiate time. The actuated technique may succeed if a distance between the character and the avatar is within the hit distance when the action initiate time is lapsed from a time when the selected technique is actuated.

Stamina may be reduced with lapse of time and the match-up ends when the stamina reaches zero. The plurality of techniques may correspond to a plurality of remaining amounts of the stamina, and any one technique corresponding to a remaining amount of the stamina may be selected from among the plurality of techniques.

The method may further include providing the selected avatar with an experience according to a result of the match-up.

According to yet another aspect of the social game, a computer readable recording medium having recorded thereon a program executable by a computer for performing the above-described may be provided.

In the following detailed description, only certain examples of the social game have been shown and described, simply by way of illustration. As those skilled in the art would realize, the described examples may be modified in various different ways, all without departing from the spirit or scope of the social game. Accordingly, the drawings and description are to be regarded as illustrative in nature and not restrictive. Like reference numerals designate like elements throughout the specification.

A game control method and a recording medium according to examples of the social game are described in detail with reference to the accompanying drawings.

Overall Game Control Method

A game control method according to examples of the social game is described with reference to FIG. 1 and FIG. 2.

Figure 1:
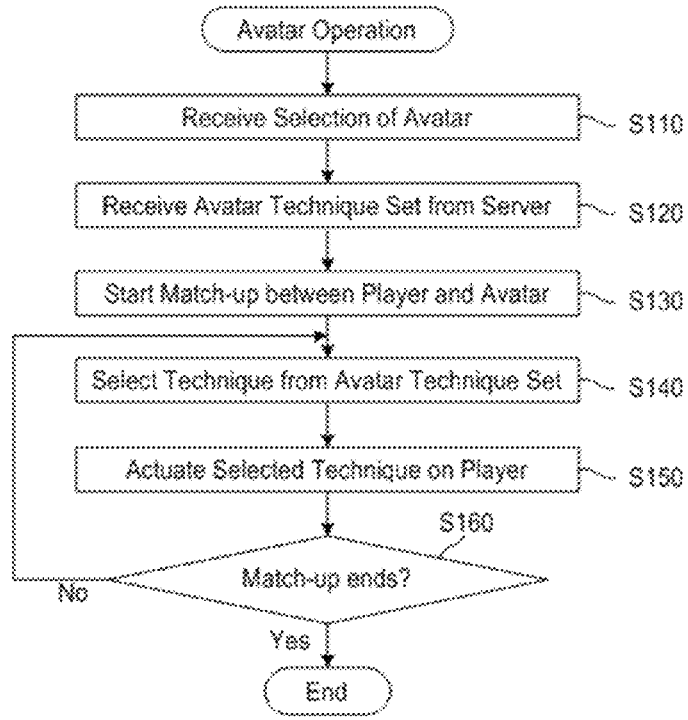
FIG. 1 is a flowchart of a game control method according to an example of a social game.
Figure 2:
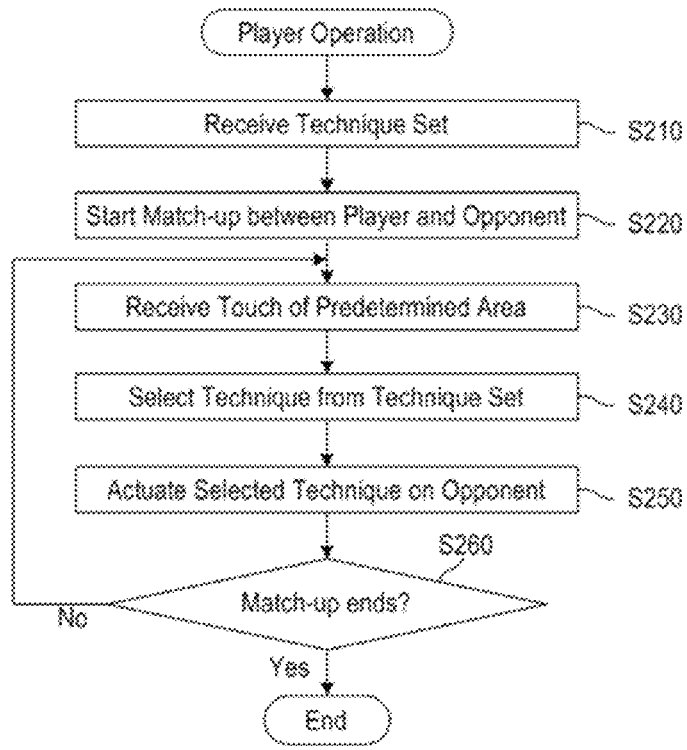
FIG. 2 is a flowchart of a game control method according to another example of the social game

FIG. 1 and FIG. 2 are flowcharts of a game control method according to examples of the social game.

Avatar Operation

A player-to-player match-up process in which a character corresponding to a player of a game terminal fights an avatar corresponding to other player is executed in the game terminal. FIG. 1 describes an avatar operation of the player-to-player match-up process.

Referring to FIG. 1, the game terminal receives a selection of any one from among a plurality of avatars through a touch screen panel of the game terminal (S110). In this case, the plurality of avatars correspond to a plurality of other players, respectively. Next, the game terminal receives, from a game management server, an avatar technique set including a plurality of technique that is set by other player corresponding to the selected avatar (S120). Subsequently, the game terminal starts a player-to-player match-up between the character corresponding to the player of the game terminal and the selected avatar (S130).

When starting the player-to-player match-up, the game terminal selects any one technique from among the plurality of techniques included in the avatar technique set (S140), and actuates the selected technique on the character corresponding to the player (S150). Further, the game terminal repeatedly performs a process including selecting selects any one technique from among the plurality of techniques and actuating the selected technique (S140, S150), until the player-to-player match-up ends (S160). Accordingly, the avatar corresponding to the other player can Fight the character corresponding to the player if the other player set the avatar technique set including the plurality of technique to be used in the player-to-player match-up even though the other player does not control the avatar.

In some examples, when selecting any one technique from among the plurality of techniques included in the avatar technique set, the game terminal may randomly select any one technique based on selection probabilities that are assigned to the plurality of techniques respectively. Further, stamina of the character corresponding to the player may be reduced when the actuated technique of the avatar succeeds. In some examples, the plurality of techniques may correspond to a plurality of remaining amounts of stamina. In this case, selecting any one technique including selecting any one technique corresponding to a remaining amount of the stamina from among the plurality of techniques. Further, stamina may be reduced with the lapse of time.

In some examples, the game management server may select any one technique from among the plurality of techniques included in the avatar technique set. In this case, the game management server may provide information on the selected technique to the game terminal.

Player Operation

A match-up process in which a character corresponding to a player of a game terminal fights an opponent character controlled by a controller of the game terminal. FIG. 2 describes a player operation of the match-up process or the player-to-player match-up process.

Referring to FIG. 2, the game terminal receives a technique set including a plurality of techniques through a touch screen panel of the game terminal (S210). Next, the game terminal starts a match-up between the character corresponding to the player of the game terminal and an opponent character (S220). The opponent character may be a character controlled by a controller of the game terminal or an avatar of other player.

When starting the player-to-player match-up, the game terminal receives a touch on a predetermined area of the touch screen panel (S230). The game terminal selects any one technique from among the plurality of techniques included in the technique set in response to the touch (S240), and actuates the selected technique on the opponent character (S250). Further, the game terminal repeatedly performs a process including receiving a touch on the predetermined area of the touch screen panel, selecting any one technique from among the plurality of techniques in response to the touch, and actuating the selected technique (S230, S240, S250), until the match-up ends (S260). Accordingly, the player can Fight the opponent character by using various techniques only by touching the predetermined area, for example an action button, of the touch screen panel.

In some examples, the plurality of techniques may be arranged in sequence in the technique set. The plurality of techniques may be selected in sequence when any one technique is selected from among the plurality of techniques.

Overall Configuration of Game System

A game system according to examples of the social game is described in detail with reference to FIG. 3 and FIG. 4.

Figure 3:
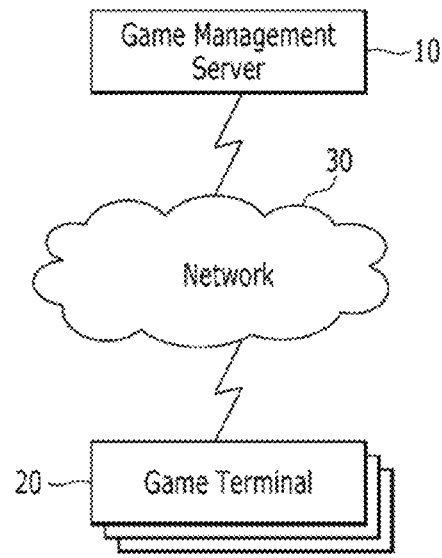
FIG. 3 is a schematic diagram showing a game system according to an example of the social game.
Figure 4:
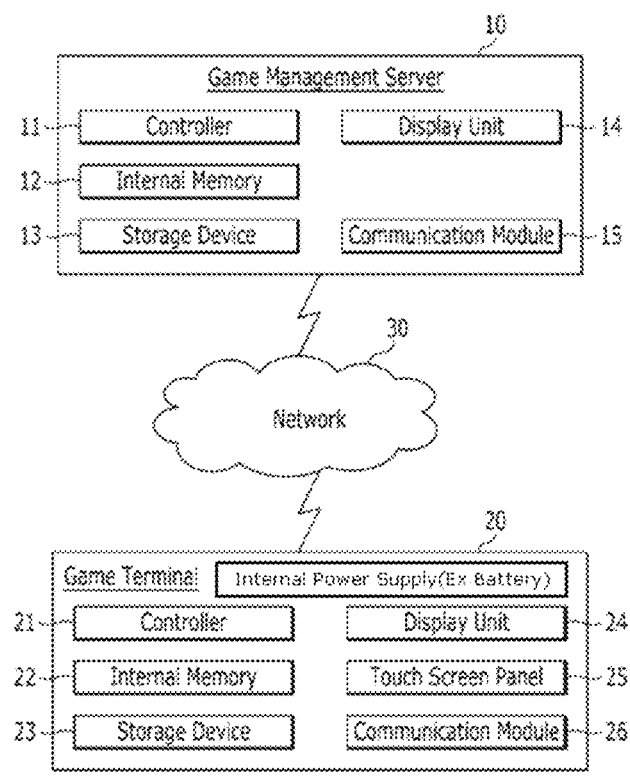
FIG. 4 is a schematic diagram showing a game management server and a game terminal according to an example of the social game.

FIG. 3 is a schematic diagram showing a game system according to an example of the social game, and FIG. 4 is a schematic diagram showing a game management server and a game terminal according to an example of the social game.

Referring to FIG. 3, a game system includes a game management server 10 and a plurality of game terminals 20 connected to the game management server 10 via a network 30.

The game management server 10 manages games which are executed on the plurality of game terminals 20 and information on players of the game terminals 20.

The game terminal 20 executes a game, for example a Fighting game, and may be a terminal having a touch panel, for example a smart phone or a tablet. The game terminal 20 can download and install a game application, and execute the game application to operate a game. The game application may be provided through an application store that is a type of digital distribution platform for application software.

Referring to FIG. 4, a game terminal 20 includes a controller 21, an internal memory 22, a storage device 23, a display unit 24, a touch screen panel 25, and a communication module 26. The internal memory 22 may include a read only memory (ROM) and a random access memory (RAM).

The controller 21 may be a central process unit (CPU). The controller 21 loads applications including a game application stored in the storage device 23 into the internal memory 22, particularly the RAM, and executes the loaded applications. Further, the controller 21 controls the display unit 24 to display images from the loaded application, and controls the communication module 26 to communicate a game management server 10. The internal memory 22, particularly the ROM, stores a program to be executed by the controller 21 such as BIOS, along with another data to be maintained permanently. The internal memory 22, particularly the RAM stores data and programs or applications which are used during the operation of the controller 21, and further stores data such as tables used for operating the game application. The communication module 26 facilitates data communication of the controller 21 with an external controller of, for example, the game management server 10 through a communication channel. The display unit 24 displays images that output from the executed applications. The touch screen panel 25 operates an input device, and detects a position touched by a player to provide the controller 21 with a position sense signal corresponding to the detected position. The controller 21 receives the position sense signal to detect input. The display unit 24 and the touch screen panel 25 may be provided as a display device.

The game management server 10 includes a controller 11, an internal memory 12, a storage device 13, a display unit 14, and a communication module 15. The internal memory 12 may include a ROM and a RAM.

The controller 11 may be a CPU. The controller 11 loads programs including a game management program stored in the storage device 13 into the internal memory 12, particularly the RAM, and executes the loaded game management program. Further, the controller 11 controls the display unit 14 to display images from the loaded program, and controls the communication module 15 to communicate a plurality of game terminals 20. The internal memory 12, particularly the ROM, stores a program to be executed by the controller 11 such as BIOS, along with another data to be maintained permanently. The internal memory 12, particularly the RAM stores data and programs which are used during the operation of the controller 11, and further stores data used for operating the game management program and data used for authenticating the game terminal 20. The communication module 15 facilitates data communication of the controller 11 with the controller 21 of each of the plurality of game terminals 10 through a communication channel.

The storage unit 13 stores the game management program and other programs for authenticating and managing the games of the game terminals 20. Further, the storage unit 13 stores information on each of the game terminals 20, information on each of players using the game terminals 20, and information associated with the game executed in each of the game terminals 20. The storage unit 13 may operate as a database. The display unit 14 displays images that output from the executed programs.

Gaming Operations

Hereinafter, gaming operations according to examples of the social game are described in detail with reference to FIG. 5 to FIG. 34C.

Example of Access Process

Figure 5:
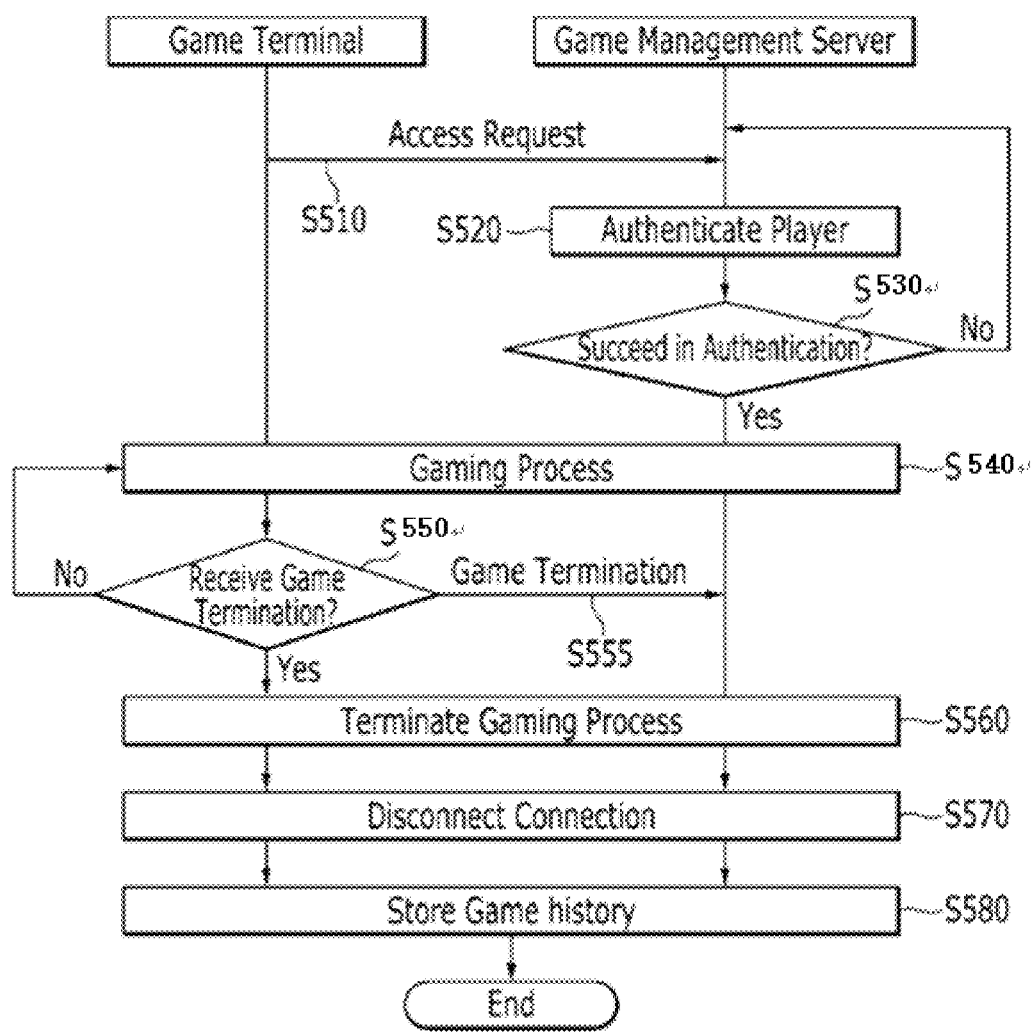
FIG. 5 is a flowchart of an access process according to an example of the social game.

FIG. 5 is a flowchart of an access process according to an example of the social game.

Referring to FIG. 5, a game terminal executes a game application and accesses a game management server (S510). In this case, the game terminal may receive identification information of a player through an input device, and transmit the identification information to the game management server to request an access. The input device may include a touch screen, and the player may input the identification information on the touch screen. The game management server, upon receiving the access request from the game terminal, authenticates the player (S520). When succeeding in authenticating the player (S530: Yes), the game terminal and the game management server performs a gaming process (S540).

When the game terminal receives game termination input from the player through the input device (S550: Yes), the game terminal transmits a game termination signal to the game management server (S555). Then, the game terminal and the game management server terminate the gaming process (S560). The input device may include a touch screen, and the player may touch an area for indicating a game termination, a logout, or a logoff on the touch screen. The game terminal and the game management server disconnect the connection between the game terminal and the game management server (S570), and store a game history of the player (S580).

Example of Gaming Process for Match-Up

Figure 6:
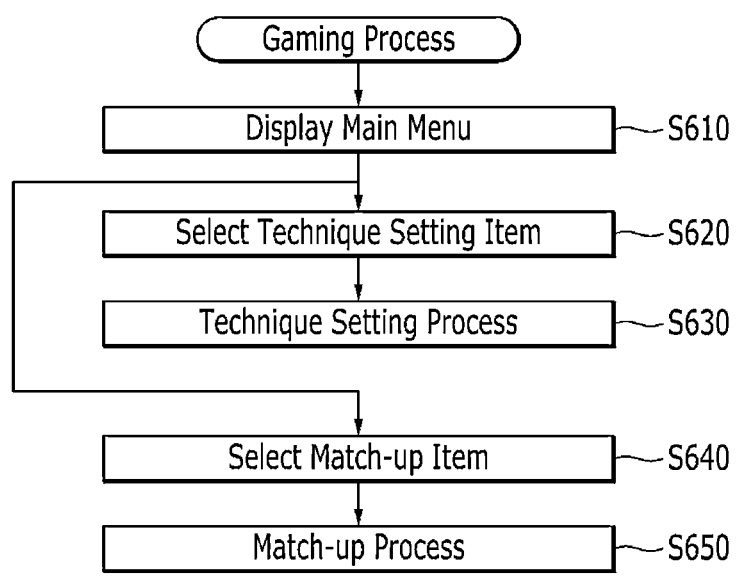
FIG. 6 is a flowchart of a gaming process according to an example of the social game.
Figure 7:
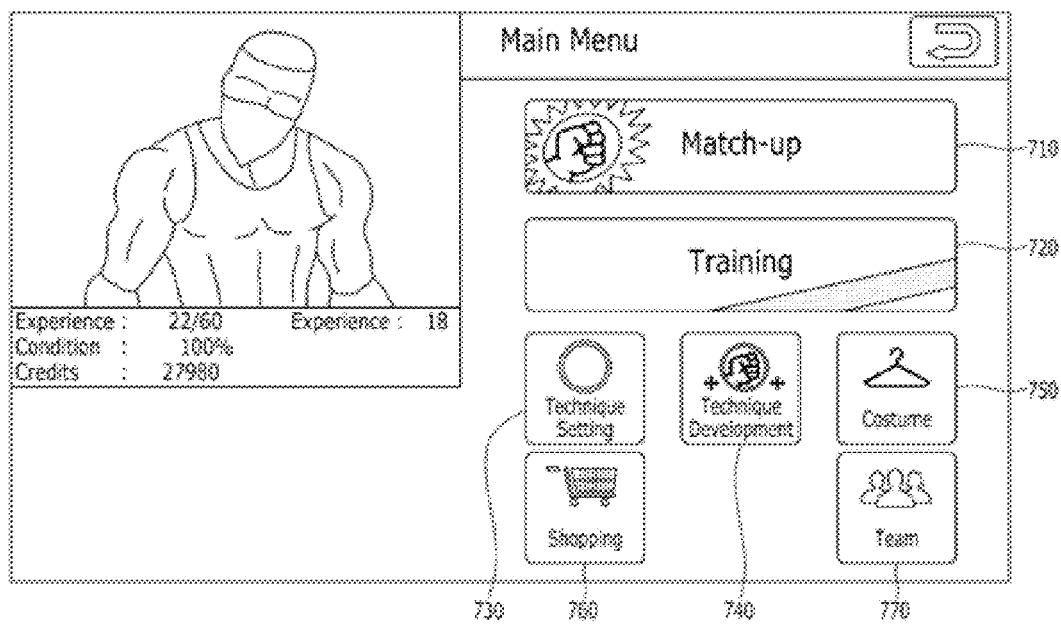
FIG. 7 shows an example of a main menu displayed when a gaming process shown in FIG. 6 is executed.

FIG. 6 is a flowchart of a gaming process according to an example of the social game, and FIG. 7 shows an example of a main menu displayed when a gaming process of FIG. 6 is executed.

Referring to FIG. 6, when the gaming process is executed, a controller of the game terminal displays a main menu on a display device (for example, the display unit 24 described above) of the game terminal (S610). As shown in FIG. 7, the main menu includes a plurality of items to be selected by the player. The plurality of items includes a match-up item 710 for Fighting a character controlled by the controller, a training item 720 for training character of the player, and a technique setting item 730 for setting a sequence of techniques. The training item 720 provides a screen for training the character of the player, and the player can increase his or her experience through training.

The plurality of items may further a technique development item 740, a costume item 750, a shopping item 760, and a team item 770. The technique development item 740 may provide a screen for allowing the player to develop a technique, and the costume item 750 may provide a screen for allowing the player to change a costume. The shopping item 760 may provide a screen for allowing the player to buy credits or techniques, and the team item 770 may provide a screen for allowing the player to interact with members of the same team.

When the player selects the technique setting item 730 using an input device (S620), the controller executes a technique setting process (S630). The input device may include a touch screen, and the player may touch a desired item on the touch screen to select the time.

Example of Technique Setting Process

Figure 8:
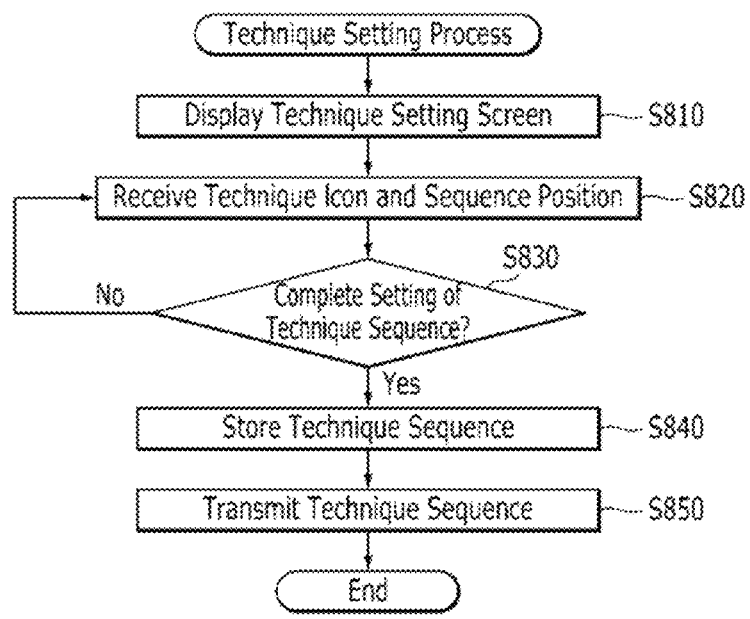
FIG. 8 is a flowchart of a technique setting process of a gaming process according to an example of the social game.
Figure 9:
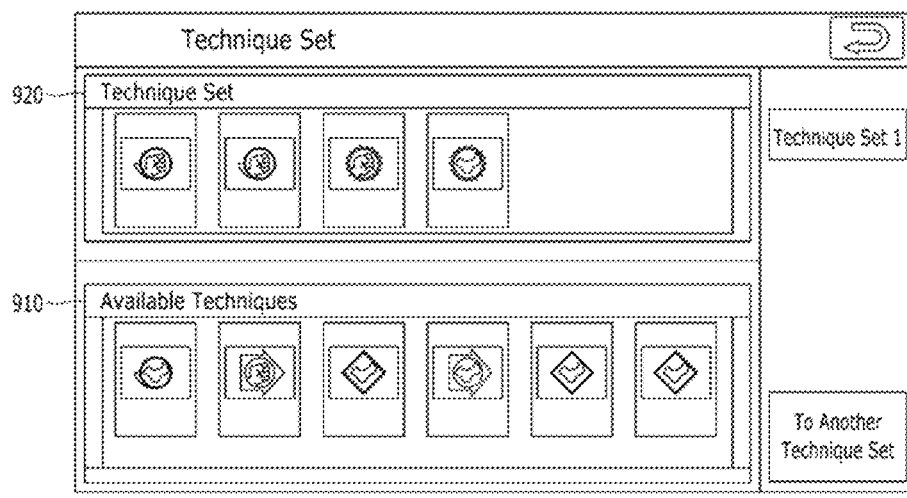
FIG. 9 shows an example of a technique setting screen displayed when a technique setting process shown in FIG. 8 is executed.
Figure 10:
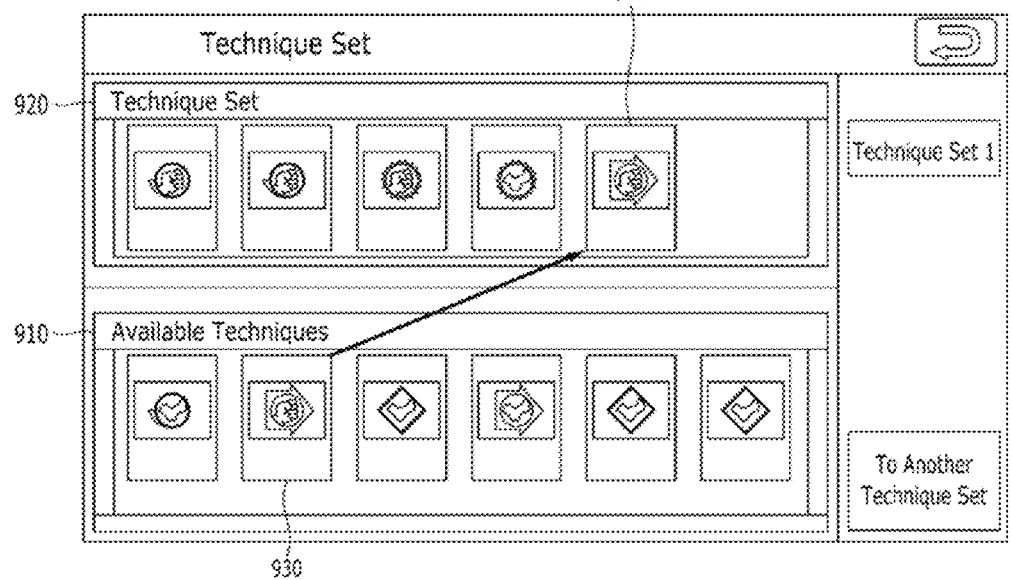
FIG. 10 shows an example of a technique setting operation in a technique setting screen of FIG. 9.

FIG. 8 is a flowchart of a technique setting process of a gaming process according to an example of the social game, FIG. 9 shows an example of a technique setting screen displayed when a technique setting process of FIG. 8 is executed, and FIG. 10 shows a an example of a technique setting operation in a technique setting screen of FIG. 9.

Referring to FIG. 8, in the technique setting process, the controller displays a technique setting screen on the display device (S810). Referring to FIG. 9, the technique setting screen includes an available technique area 910 and a technique set area 920. The available technique area 910 includes a plurality of technique icons corresponding to a plurality of techniques that can be used by the player. The technique set area 910 includes a sequence of technique icons that are selected from the available technique area 910 by the player. For example, the plurality of techniques may include attacking techniques, a blocking technique and/or a throwing technique. The attacking techniques may include various first attacks, elbow attacks, body attacks, shoulder attacks, grappling attacks, leg attacks, and/or head attacks. Next, the controller receives a selection of a technique icon to be set and a sequence position of the selected technique icon in the technique set area 920 by the input device (S820). As shown in FIG. 10, the player may touch and drag the technique icon 930 to be selected from the available technique area 910, and drop the selected technique icon 930 on the sequence position 940 to be selected in the technique set area 920. The sequence position may be the beginning of the technique sequence, the end of the technique sequence, or a position between two adjacent techniques in the technique sequence. Next, the controller determines whether the setting of the technique sequence is completed (S830). When the setting of the technique sequence is not completed (S830: No), the controller receives other technique icon and a sequence position of the other technique icon by the input device (S820). When the setting of the technique sequence is completed (S830: Yes), the controller stores the technique sequence that has been set (S840). The setting of technique sequence may be completed by touch of a return button on the technique set screen. Further, the controller may transmit information on the technique sequence to the game management server (S850). The game management server may store information on the technique sequence for the player. As a result, the technique sequence includes a plurality of techniques that are sequentially arranged.

It should be noted that control is so performed that the controller triggers the techniques in the order of the technique sequence in which the technique icons are arranged. That is, the controller controls so that the techniques of the technique icons arranged in the technique set in FIG. 9 and FIG. 10 are automatically triggered sequentially from left to right in the Figs. Technique icons which can be set by the player are arranged in Available Techniques, and the technique icons can be dragged by the player from this area of Available Technique to the area of the technique set by operating the input device as the touch screen panel (the same meaning as the touch screen panel).

In a certain example, plural types of technique sequences may be set. The player may select any one of the plural types of technique sequences when performing a match-up.

Example of Match-up Process

Figure 11:
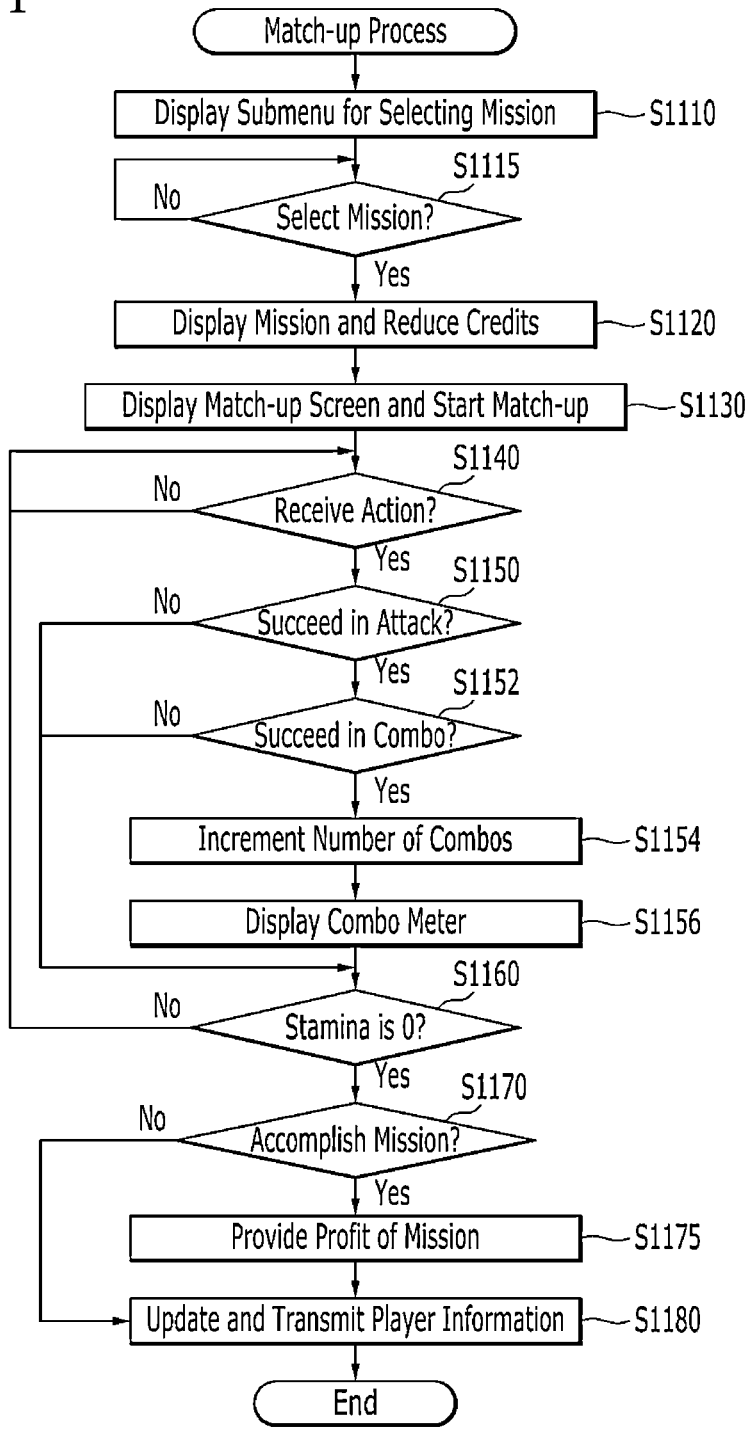
FIG. 11 is a flowchart of a match-up process of a gaming process according to an example of the social game.
Figure 12:
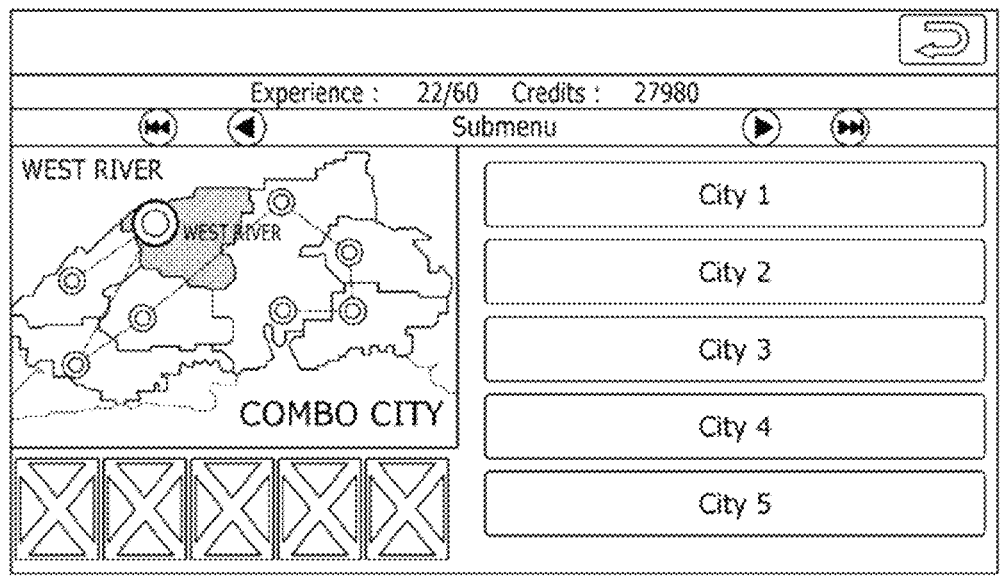
FIG. 12 shows an example of a submenu displayed when a match-up process shown in FIG. 11 is executed.
Figure 13:
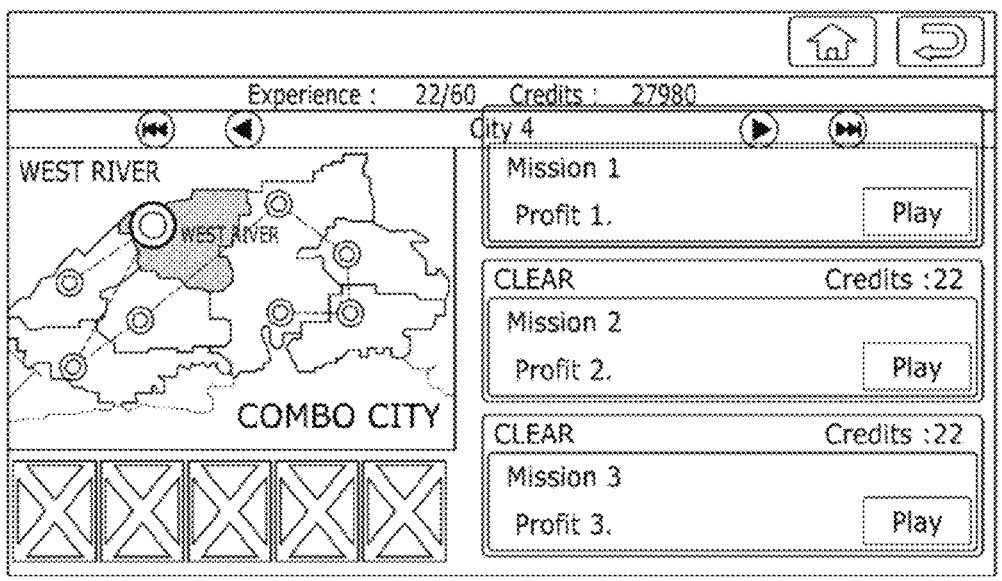
FIG. 13 shows an example of a sub-item in a submenu shown in FIG. 12.
Figure 14:
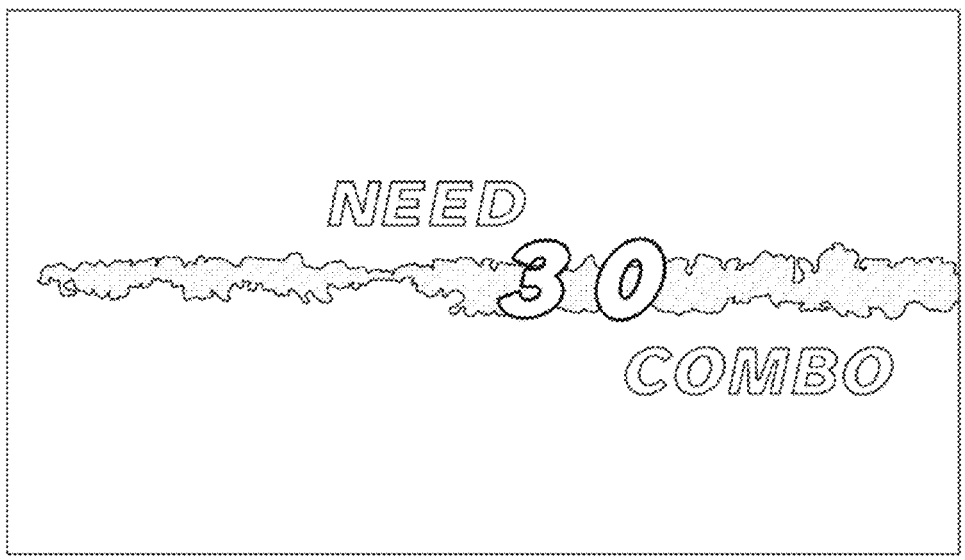
FIG. 14 shows an example of a mission used in a game control method according to an example of the social game.
Figure 15:
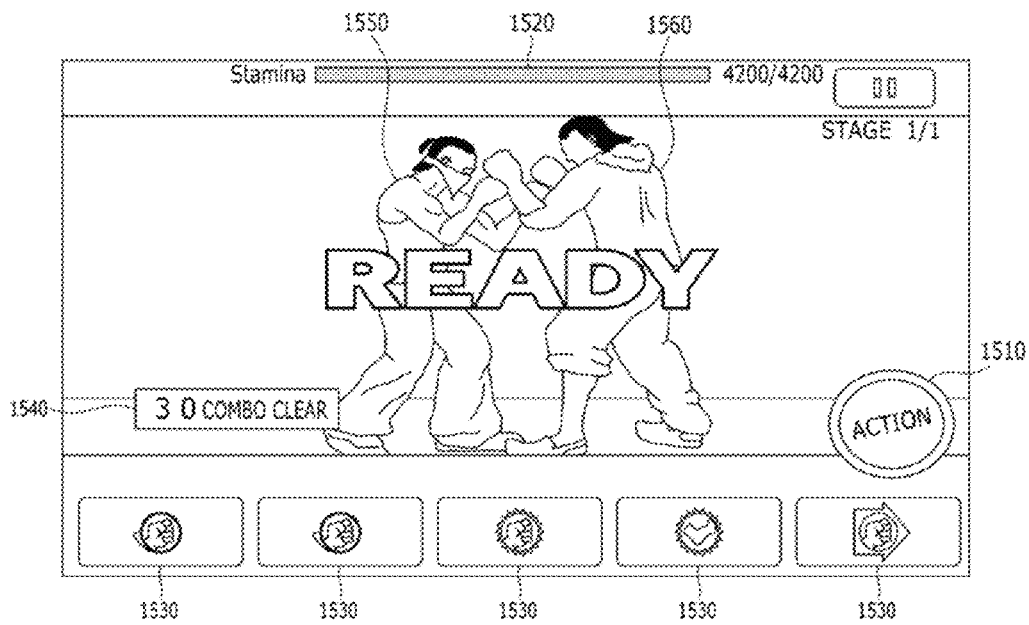
FIG. 15 shows an example of a match-up screen.
Figure 16:
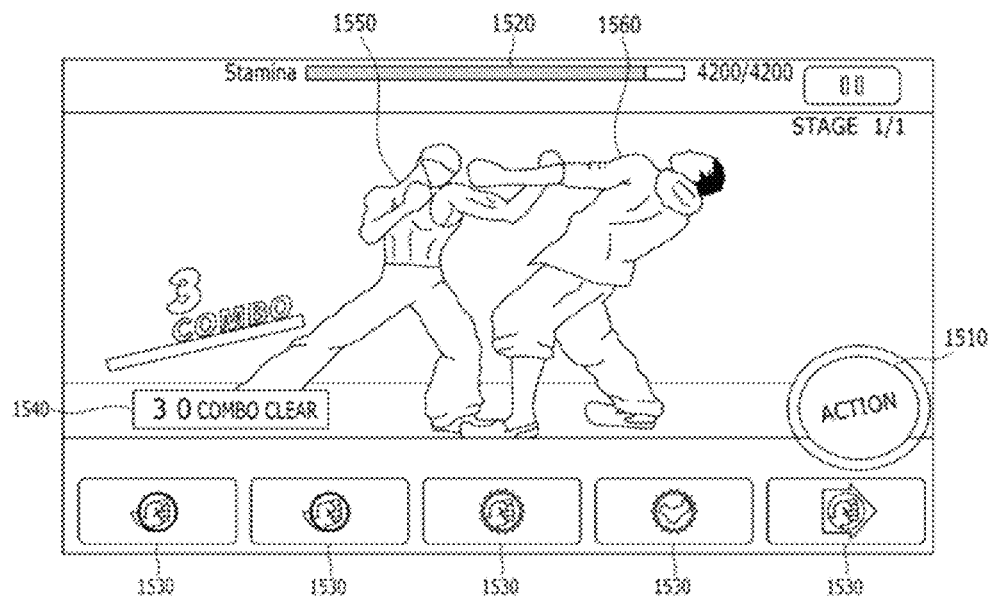
FIG. 16 shows an example of a player operation in a match-up screen shown in FIG. 15.

FIG. 11 is a flowchart of a match-up process of a gaming process according to an example of the social game, FIG. 12 shows an example of a submenu displayed when a match-up process shown in FIG. 11 is executed, FIG. 13 shows an example of a sub-item in a submenu shown in FIG. 12, FIG. 14 shows an example of a mission, FIG. 15 shows an example of a match-up screen, and FIG. 16 shows an example of a player operation in a match-up screen shown in FIG. 15.

Referring to FIG. 6 again, when the match-up item 710 is selected by the input device (S640), the controller executes a match-up process (S650). Referring to FIG. 11, in the match-up process, the controller displays a submenu for selecting an opponent character on the display device (S1110). As shown in FIG. 12, the submenu may list a plurality of sub-items that correspond to a plurality of countries or cities, respectively. As shown in FIG. 13, the sub-item may include at least one mission item. The mission item may include a credit value required to perform a mission provided in the mission item and a profit provided when the mission is cleared. The profit may include a credit value provided in the mission, an increase of a player experience, and/or a technique provided in the mission. When a certain mission item is selected, the player fights an opponent character provided in the mission item.

FIG. 54 shows a match-up process of the operated character competing with the enemy character.

To begin with, firstly, the controller 21 executes a mission (for stage clear) display process. The mission display process is for displaying the mission in the game, and for displaying conditions to clear the stage of the game to the player. For example, it is displayed that the stage can be cleared with 100 combos. Moreover, there is more than one such mission, and the controller 21 extracts a plurality of mission from the storage device of the reference numeral 22 or 23 stored in advance so that a plurality of missions are displayed on the display unit 24 and displays missions on the display unit 24. When the game is started, the player prompts to select a desired mission by the selection input by the player from a plurality of types of missions displayed. Such player's input of selection can be executed by the input into the touch panel 25 as the input device according to the present invention.

When the mission item is selected by the input device (FIG. 54, S1115:YES), the controller displays a mission of the mission item on the display device as shown in FIG. 14 and reduces the credits of the user by the credit value required in the mission item (S1120). In this case, the controller may transmit the reduced credits to the game management server, and the game management server may update the credits of the user according to the reduced credits. The mission may include the number of attack combinations (hereinafter referred to as "combos") that should be accomplished. The combos are a term that designates a set of actions performed in sequence, with timing limitations, that yield a decrease of stamina of the opponent character. Next, the controller displays a match-up screen on the display device as shown in FIG. 15 and starts the match-up (S1130). The match-up screen includes an action button 1510 and a stamina meter 1520. The stamina meter 1520 indicates a remaining amount of stamina. The match-up screen may further include a plurality of technique buttons 1530 corresponding to a plurality of techniques. The match-up screen may further include the number of combos to be accomplished (1540). Further, the match-up screen displays the character 1550 corresponding to the player and the opponent character 1560 controlled by the controller. Next, the controller receives an action from the player by using the input device (S1140). The player may input the action by touching the action button 1510 on the display device as shown in FIG. 16. Each time the action button 1510 is touched, the plurality of techniques are sequentially performed in the order of the sequence of techniques set in the technique set area 920. For example, it is assumed that the technique sequence is a sequence of a straight, a body jab, an uppercut, a left middle kick, and an elbow. The first touch of the action button 1510 allows a character of the user to use the right high kick on the opponent character, the second touch of the action button 1510 allows the character to use the body jab on the opponent character, the third touch of the action button 1510 allows the character to use the uppercut on the opponent character, the fourth touch of the action button 1510 allows the character to use the left middle kick on the opponent character, and the fifth touch of the action button 1510 allows the character to use the elbow on the opponent character. If all of the techniques of the sequences, the technique is performed again from the beginning of the sequence. That is, the sixth touch of the action button 1510 allows the character to use the right high kick. Instead of touching the action button 1510, the use may directly touch the technique button 1530 corresponding to a desired technique.

Next, the controller 21 determines whether the attack according to the technique used by the player succeeds (S1150). In this case, an action of the opponent character is performed by the controller 21 according to a predetermined rule. That is, the opponent character may block the attack from the user, may counter-attack the user on the attack from the user, or may attack the user. When the attack from the user succeeds (S1150: Yes), the controller 21 determines whether the successful attack is continuous to a previous successful attack (S1152). When the successful attack is continuous (S1152: Yes), the controller 21 increments the number of combos by one (S1154). The controller 21 displays on the display device 24, A21 a combo meter 1540 representing the number of combos that are succeeded (S1156). When the continuous attack fails (S1152: No), the controller does not increment the number of combos.

Next, the controller 21 determines whether the remaining amount of the stamina meter 520 reaches zero (S1160). The stamina of the stamina meter 1520 may decrease with the lapse of time. Alternatively, the stamina may decrease each time the attack from the player succeeds. When the stamina of the stamina meter 1520 remains (S1160: No), the controller 21 receives the action from the player again (S1140). When the stamina of the stamina meter 1520 reaches zero (S1160: Yes), the controller 21 determines whether the mission is accomplished (S1170). That is, the controller 21 determines whether the number of combos that are succeeded is equal to or greater than the number of combos required in the mission (S1170). When the mission is accomplished, that is, the number of combos that are succeeded is equal to or greater than the number of combos required in the mission (S1170: Yes), the controller 21 provides the player with the profit of the mission (S1175). According to the profit, the controller 21 updates information of the player (S1180), and ends the match-up. The information may include the player experience, the credits of the player, and/or the available technique of the player. That is, according to the profit, the player experience and/or the credits of the player may be increased, and/or the player may obtain a new technique provided in the mission. In this case, the controller may transmit the updated information to the game management server (S1180), and the game management server may update the information of the player according to the updated information. When the mission is not accomplished (S1170: No), the controller 21 ends the match-up without providing the profit and update the information of the player. Even though the mission is not accomplished, the player experience may be increased. When the player experience increases to a predetermined value, a level of the player may be incremented by one.

Figure 17:
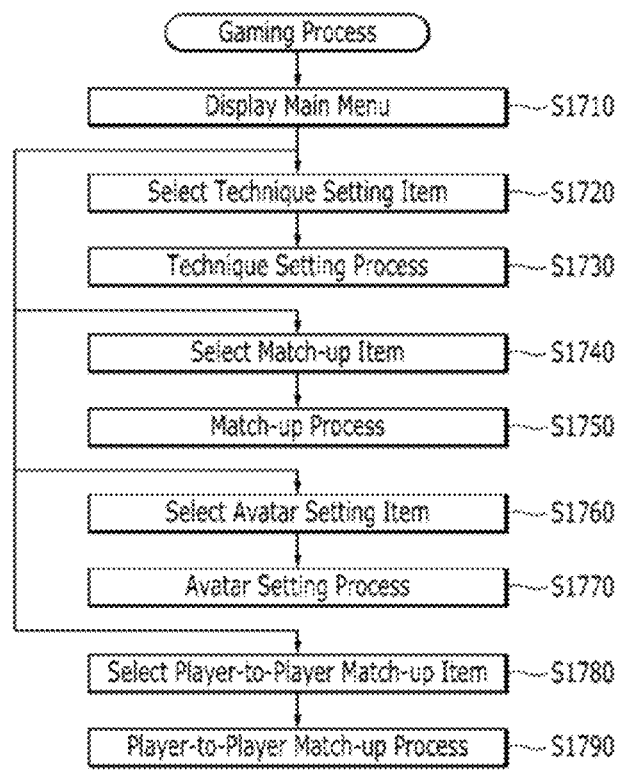
FIG. 17 is a flowchart of a gaming process according to another example of the social game.

Example of Gaming Process for Player-to-Player Match-Up
FIG. 17 is a flowchart of a gaming process according to another example of the social game.

Referring to FIG. 17, when the gaming process is executed, a controller 21 of the game terminal 20 A21 displays a main menu on the display device 24, A21 of the game terminal (S1710). The main menu includes a plurality of items to be selected by the user. The plurality of items include a player-to-player match-up item for Fighting a character of the other player as well as a technique setting item and a match-up item. That is, a game application in an example shown in FIG. 17 supports an option for fighting the other player. Further, the game application provides an avatar corresponding to the player for the user match-up. Accordingly, the plurality of items further includes an avatar setting item. The plurality of items may further include a training item for training character of the user. Operations when the technique setting item and the match-up item are selected may be substantially the same as the operations (S620, S630, S640, and S650) described with reference FIG. 6 to FIG. 16.

When the player selects the avatar setting item using an input device (S1760), the controller 21 executes an avatar setting process (S1770). An avatar corresponds to the player, and the avatar can be identified by an identifier (ID) of the player.

Figure 18:
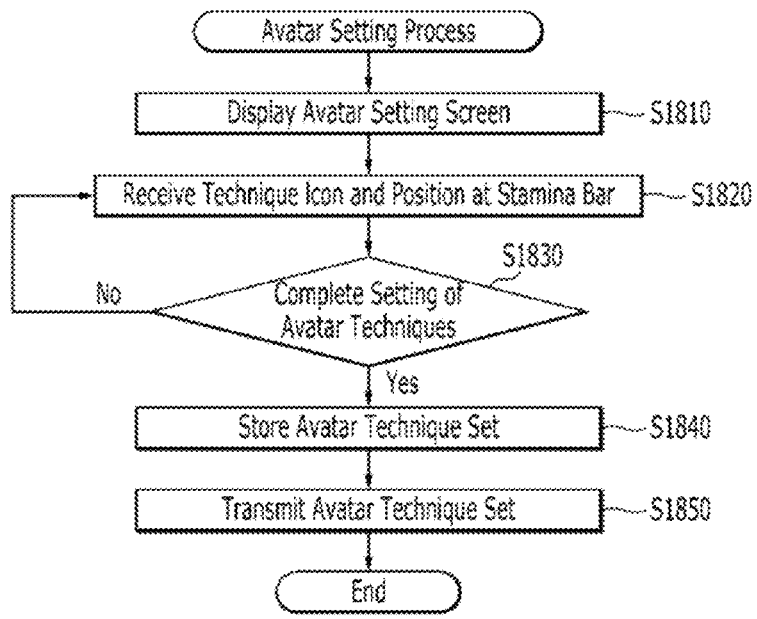
FIG. 18 is a flowchart of an avatar setting process of a gaming process according to another example of the social game.
Figure 19:
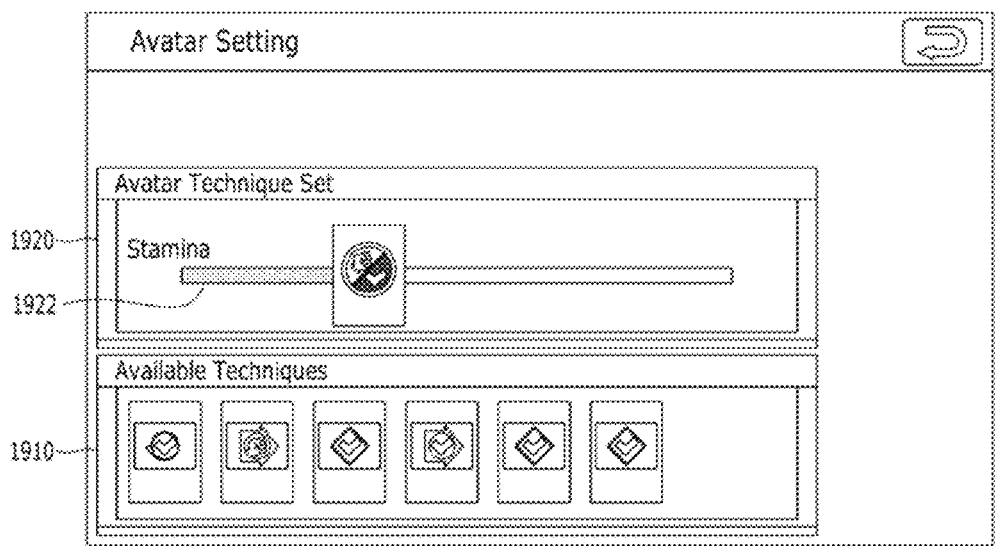
FIG. 19 shows an example of an avatar setting screen displayed when an avatar setting process shown in FIG. 18 is executed.
Figure 20:
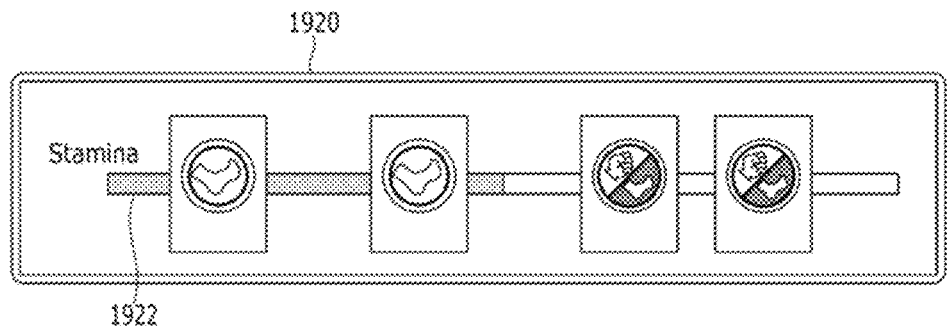
FIG. 20 shows an example of an avatar setting operation in an avatar setting screen shown in FIG. 19.

Example of Avatar Setting Process FIG. 18 is a flowchart of an avatar setting process of a gaming process according to another example of the social game, FIG. 19 shows an example of an avatar setting screen displayed when an avatar setting process shown in FIG. 18 is executed, and FIG. 20 shows an example of an avatar setting operation in an avatar setting screen shown in FIG. 19.

Referring to FIG. 18, in the avatar setting process, the controller displays an avatar set screen on the display device (S1810). Referring to FIG. 19, the avatar setting screen includes an available technique area 1910 and a technique set area 1920. The available technique area 1910 includes a plurality of technique icons corresponding to a plurality of techniques that can be used by the player. The technique set area 1920 includes a stamina bar 1922 indicating a gauge of stamina.

Next, the controller receives a technique icon selected by the player and a position of the selected technique icon at the stamina bar 1922 by the input device (S1820). As shown in FIG. 19 and FIG. 20, the user may touch and drag the technique icon from the available technique area 1910, and drop the dragged technique icon on a certain position of the stamina bar 1922. In this case, when the stamina of the opponent player is reduced to reach a certain position of the stamina bar, a technique corresponding to the technique icon dropped on the certain position is actuated. That is, a technique corresponding to remaining amount of the stamina is actuated according to the remaining amount of the stamina.

Next, the controller determines whether setting techniques of an avatar is completed (S1830). When setting the techniques of the avatar is not completed (S1830: No), the controller receives other technique icon and a position of the other technique icon by the input device (S1820). When setting of the avatar technique set is completed (S1830: Yes), the controller stores the avatar technique set that has been set (S1840). Setting of the avatar technique set may be completed by touch of a return button on the avatar set screen. Further, the controller may transmit information on the avatar technique set to the game management server (S1850). The game management server may store information on the avatar technique set for the player. As a result, the avatar technique set includes a plurality of techniques that are located at selected positions at the stamina bar, respectively. Accordingly, the avatar can actuate the predetermined technique in accordance with remaining amount of the stamina of the opponent player, thereby fighting a character of the opponent player.

On the other hand, the opponent player can Fight the avatar of the player during a plurality of stages. In a certain example, the player may set the techniques of the avatar for each of a plurality of stages or some of the plurality of stages. This example is described with reference to FIG. 21 and FIG. 22.

Figure 21:
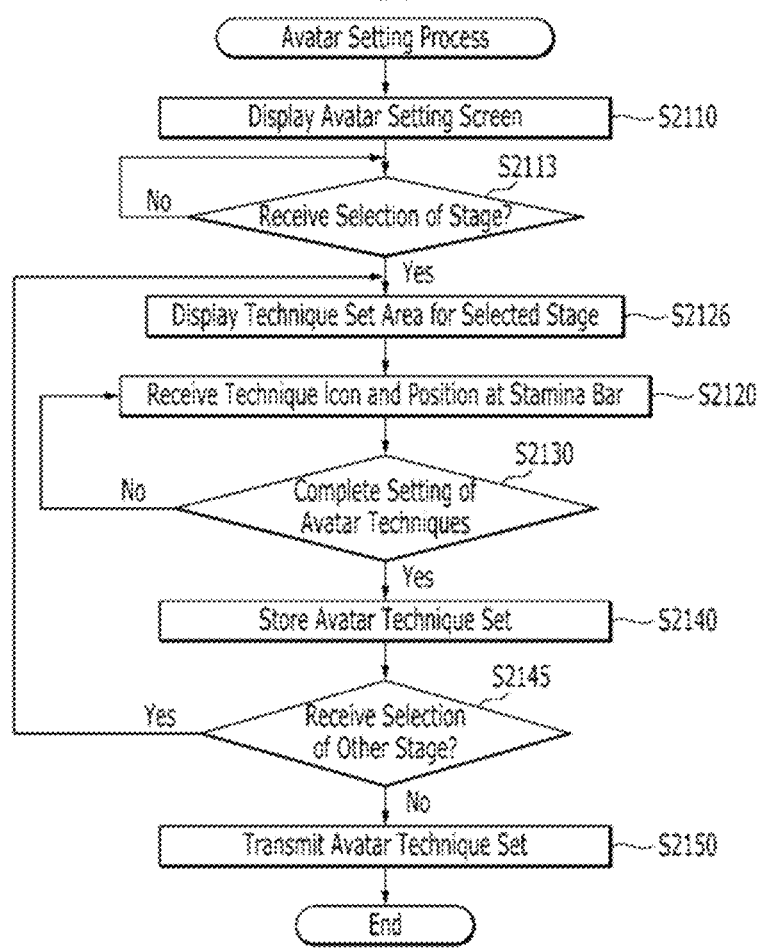
FIG. 21 is a flowchart of an avatar setting process of a gaming process according to yet another example of the social game.
Figure 22:
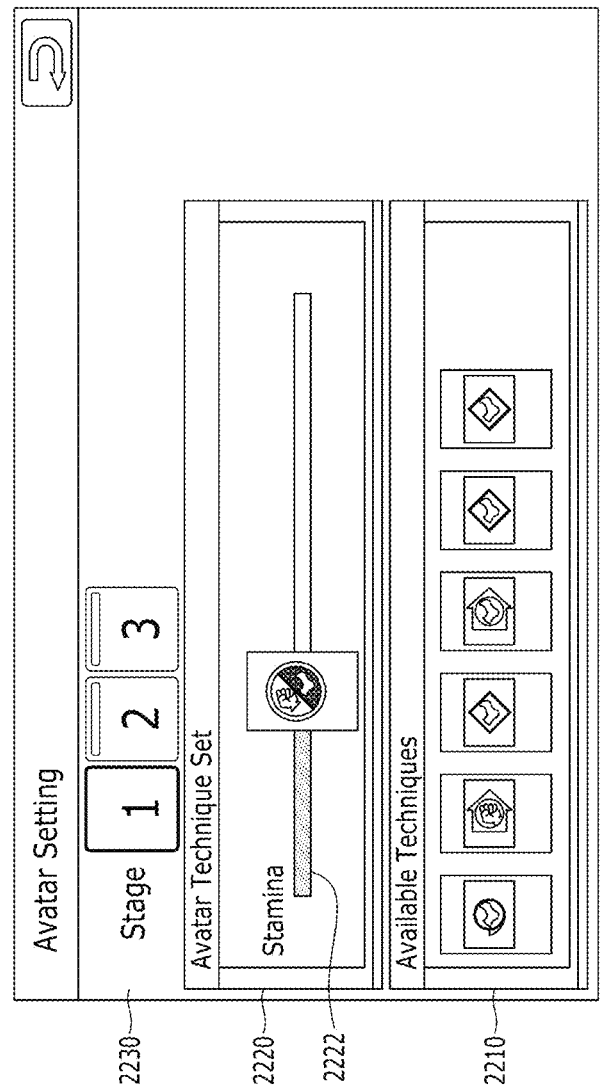
FIG. 22 shows an example of an avatar setting screen displayed when an avatar setting process shown in FIG. 21 is executed.

FIG. 21 is a flowchart of an avatar setting process of a gaming process according to yet another example of the social game, and FIG. 22 shows an example of an avatar setting screen displayed when a avatar setting process shown in FIG. 21 is executed.

Referring to FIG. 21, in the avatar setting process, the controller displays an avatar set screen on the display device (S2110). Referring to FIG. 22, the avatar set screen includes a stage set area 2230 as well as an available technique area 2210 and a technique set area 2220. The stage set area 2230 includes a plurality of stage items corresponding to a plurality of stages.

Next, the controller receives a selection of a stage to be set from among the plurality of stages by the input device (S2113). The player may touch a stage item corresponding to the stage to be set from among the plurality of stage items. Then, the controller displays a technique set area 2220 corresponding to the selected stage on the display device (S2116). Next, the controller sets the avatar technique set for the selected stage (S2120 to S2140) as described in the steps S1820 to S1840. When setting of the avatar technique set for the selected stage is completed (S2145: Yes), the controller determines whether the other stage is selected by the input device (S2145). When the other stage is selected (S2140: Yes), the controller displays a technique set area 2220 corresponding to the other stage on the display device (S2116) and sets the avatar technique set for the other stage (S2120 to S2140). When the other stage is not selected by the input device (S2145: No), the controller terminates the avatar set screen and returns to the main menu. Further, the controller may transmit information on the avatar technique sets for all of the selected stages to the game management server (S2150). The game management server may store information on the avatar technique sets for the player. As a result, the techniques of the avatar can be set for each of the plurality of stages.

Example of One-on-One Match-up Process between Players

Figure 23:
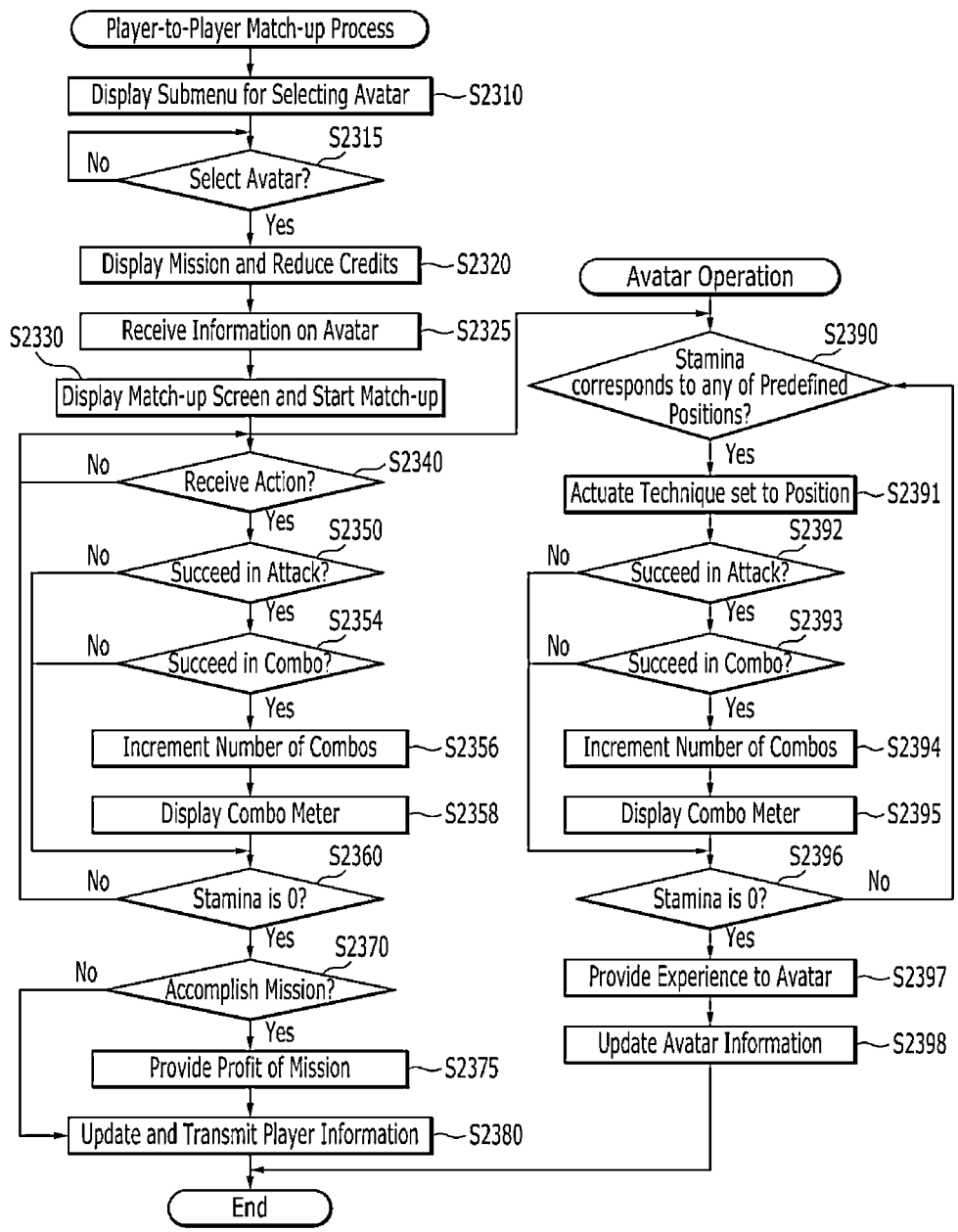
FIG. 23 shows a flowchart of a player-to-player match-up process of a gaming process according to another example of the social game.
Figure 24:
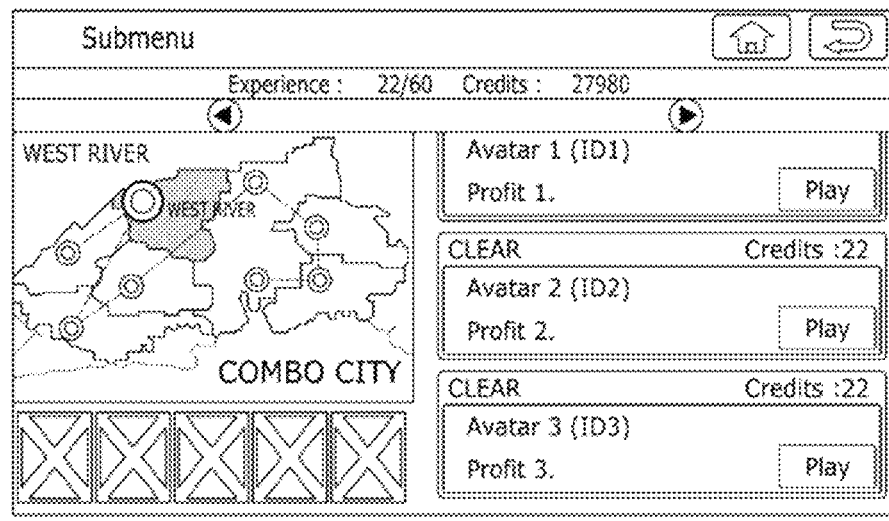
FIG. 24 shows an example of a submenu displayed when a player-to-player match-up process shown in FIG. 23 is executed.
Figure 25:
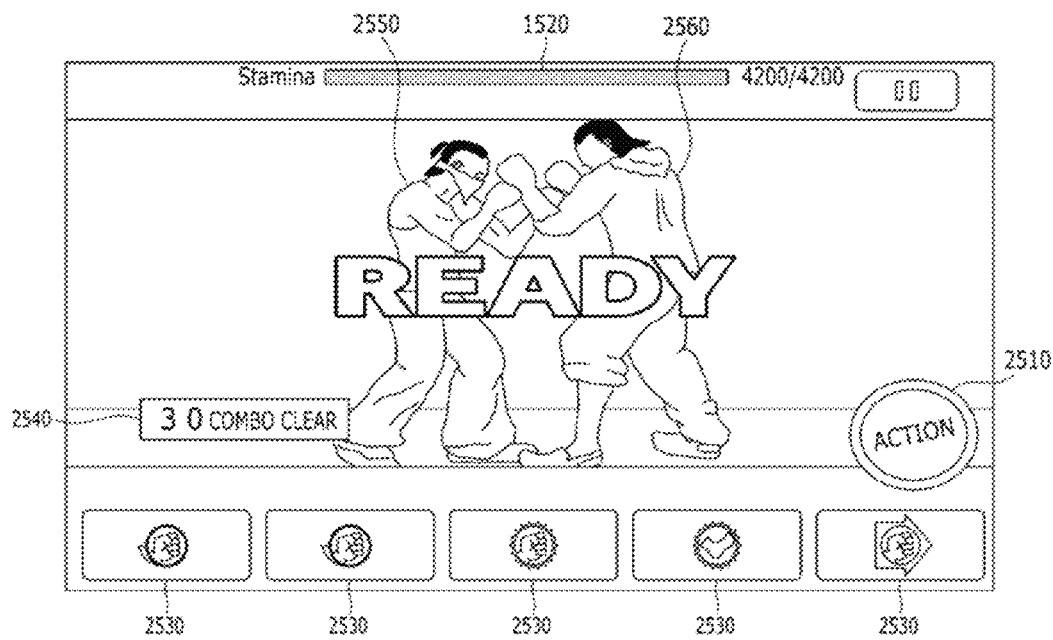
FIG. 25 shows an example of a player-to-player match-up screen.

FIG. 23 shows a flowchart of a player-to-player match-up process of a gaming process according to another example of the social game, FIG. 24 shows an example of a submenu displayed when a player-to-player match-up process shown in FIG. 23 is executed, and FIG. 25 shows an example of a player-to-player match-up screen.

Referring to FIG. 17 again, when the player-to-player match-up item is selected by the input device (S1780), the controller executes a player-to-player match-up process (S1790). Referring to FIG. 23, in the player-to-player match-up process, the controller displays a submenu for selecting an avatar on the display device (S2310). As shown in FIG. 24, the submenu includes a plurality of avatar item corresponding to a plurality of avatars. Each avatar item may include identification information of a player corresponding to the avatar, and the identification information may include at least one of an ID and a name of the player corresponding to the avatar. Each avatar item may display a level of the player corresponding to the avatar together with the identification information such that the player can select the avatar having the similar level to the player. In addition, each avatar item may further include a mission, a credit value required to perform the mission, and a profit provided when the mission is completed. The mission may include acquiring a predetermined number of combos or winning a Fight with the opponent player.

When the avatar is selected by the input device (S2315), the controller displays a mission on the display device and reduces the credits of the player by the credit value required in the mission (S2320). In this case, the controller may transmit the reduced credits to the game management server, and the game management server may update the credits of the player according to the reduced credits. Further, the controller receives information on the avatar from the game management server (S2325). The information on the avatar includes the avatar technique set of the player corresponding to the avatar. Next, the controller displays a match-up screen on the display device as shown in FIG. 25 and starts the player-to-player match-up (S2330). The match-up screen includes an action button 2510 and a stamina meter 2520. The match-up screen may further include a plurality of technique buttons 2530 corresponding to a plurality of techniques. The match-up screen may further include the number of combos to be accomplished (2540). Further, the match-up screen displays the character 2550 corresponding to the player and the avatar 2560 of the other player.

Next, the controller receives an action from the player by using the input device (S2340). The player may input the action by touching the action button 2510 on the display device. Each time the action button 2510 is touched, the plurality of techniques are sequentially performed in the order of the sequence of techniques set in the technique set area 720. Instead of touching the action button 2510, the player may directly touch the technique button 2330 corresponding to a desired technique.

Next, the controller determines whether the attack according to the technique used by the user succeeds (S2350). When the attack from the user succeeds (S2350: Yes), the controller determines whether the successful attack is continuous to a previous successful attack (S2354). When the successful attack is continuous (S2354: Yes), the controller increments the number of combos by one (S2356). The controller displays on the display device a combo meter representing the number of combos that are succeeded (S2358). When the continuous attack fails (S2354: No), the controller does not increment the number of combos.

Next, the controller determines whether the remaining amount of the stamina meter 2520 reaches zero (S2360). The stamina of the stamina meter 2520 may decrease with the lapse of time. When the stamina of the stamina meter 2520 remains (S2360: No), the controller receives the action from the player again (S2340). When the stamina of the stamina meter 2520 reaches zero (S2360: Yes), the controller determines whether the mission is accomplished (S2370). That is, the controller may determine whether the number of combos that are succeeded is equal to or greater than the number of combos required in the mission (S2370). When the mission is accomplished, that is, the number of combos that are succeeded is equal to or greater than the number of combos required in the mission (S2370: Yes), the controller provides the player with the profit of the mission (S2375). According to the profit, the controller updates information of the player (S2380), and ends the match-up. Further, the controller may transmit the updated information to the game management server (S2380), and the game management server may update the information of the player according to the updated information. When the mission is not accomplished (S2370: No), the controller ends the match-up without providing the profit and update the information of the player.

On the other hand, the controller controls the avatar of the opponent player according to the avatar setting when the player uses techniques. That is, the controller determines whether the remaining amount of the stamina of the player corresponds to any one of positions where techniques are set in the avatar technique set (S2390). When the remaining amount of the stamina corresponds to a certain position of the position (S2390: Yes), the controller controls the avatar to actuate the technique that is set in the certain position (S2391). Next, the controller determines whether the attack according to the technique actuated by the avatar succeeds (S2392). When the attack from the avatar succeeds (S2392: Yes), the controller determines whether the successful attack is continuous to a previous successful attack (S2393). When the successful attack is continuous (S2393: Yes), the controller increments the number of combos of the avatar by one (S2394). The controller displays on the display device a combo meter representing the number of combos that are succeeded (S2395). When the continuous attack fails (S2393: No), the controller does not increment the number of combos.

When the remaining amount of the stamina does not correspond to any of the position (S2390: No), the avatar actuates no technique. Further, when the match-up ends, that is, the remaining amount of the stamina reaches zero (S2396: Yes), the game management server provides the avatar with the experience according to the result of the match-up (S2397). That is, the controller transmits a result of the match-up to the game management server, and the game management server provides the avatar with the experience. For example, when the avatar defeats the player, succeeds to prevent the player from accomplishing the mission in the match-up, or acquire a predetermined number of combos, the avatar may acquire a high experience. When the avatar loses or fails to prevent the player from accomplishing the mission in the match-up, the avatar may acquire a low experience. Next, the game management server updates information on the avatar (S2398). That is, the game management server increases the experience of the avatar, and may increment a level of the avatar by one when the experience of the avatar increases to a predetermined value. As such, a player can set his or her own avatar to allow the avatar to fight other players. As a result, the avatar can acquire the experience such that the level of the avatar can increase.

Another Example of Avatar Setting Process

Figure 26:
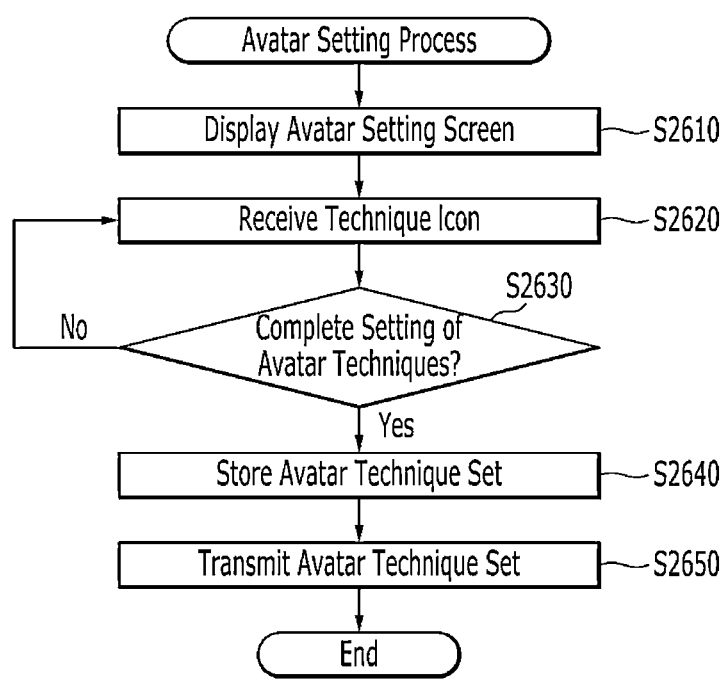
FIG. 26 is a flowchart of an avatar setting process of a gaming process according to yet another example of the social game.
Figure 27:
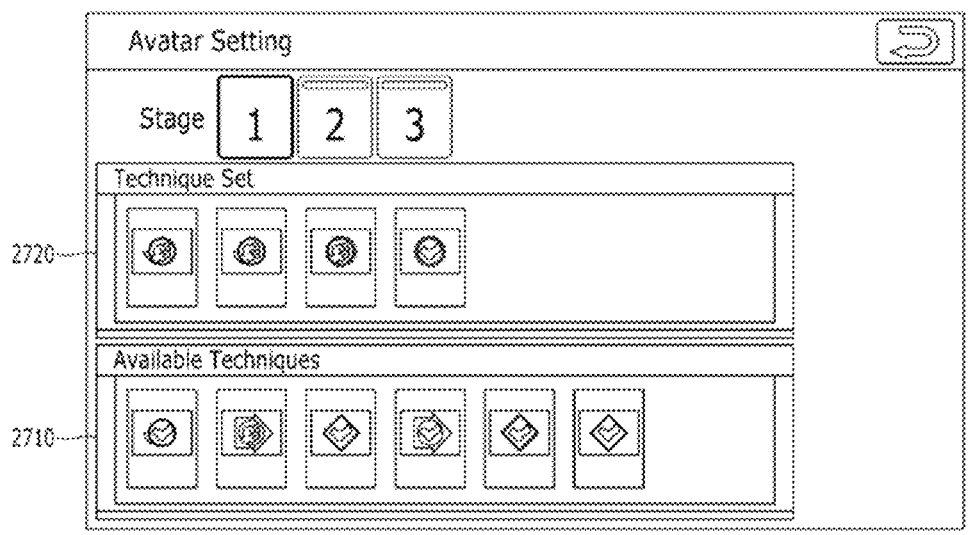
FIG. 27 shows an example of an avatar setting screen displayed when an avatar setting process shown in FIG. 26 is executed.

FIG. 26 is a flowchart of an avatar setting process of a gaming process according to yet another example of the social game, and FIG. 27 shows an example of an avatar setting screen displayed when an avatar setting process shown in FIG. 26 is executed.

Referring to FIG. 26, in an avatar setting process according to another example, the controller displays an avatar set screen on the display device (S2610). Referring to FIG. 27, the avatar set screen includes an available technique area 2710 and a technique set area 2720. The available technique area 2710 includes a plurality of technique icons corresponding to a plurality of techniques that can be used by the player.

Next, the controller receives a technique icon selected by the player by the input device (S2620). As shown in FIG. 27, the user may touch and drag the technique icon from the available technique area 2710, and drop the dragged technique icon on the technique set area 2720.

Next, the controller determines whether setting techniques of an avatar is completed (S2630). When setting the techniques of the avatar is not completed (S2630: No), the controller receives other technique icon by the input device (S2620). When setting of the avatar technique set is completed (S2630: Yes), the controller stores the avatar technique set that has been set (S2640). Setting of the avatar technique set may be completed by touch of a return button on the avatar set screen. Further, the controller may transmit information on the avatar technique set to the game management server (S2650). The game management server may store information on the avatar technique set for the player. In this case, the avatar technique set includes a plurality of techniques, and the plurality of techniques may be randomly selected when the match-up is performed.

On the other hand, the player may set the techniques of the avatar for each of a plurality of stages or some of the plurality of stages as described with reference to FIG. 20 and FIG. 21.

Another Example of Player-to-Player Match-up Process

Figure 28:
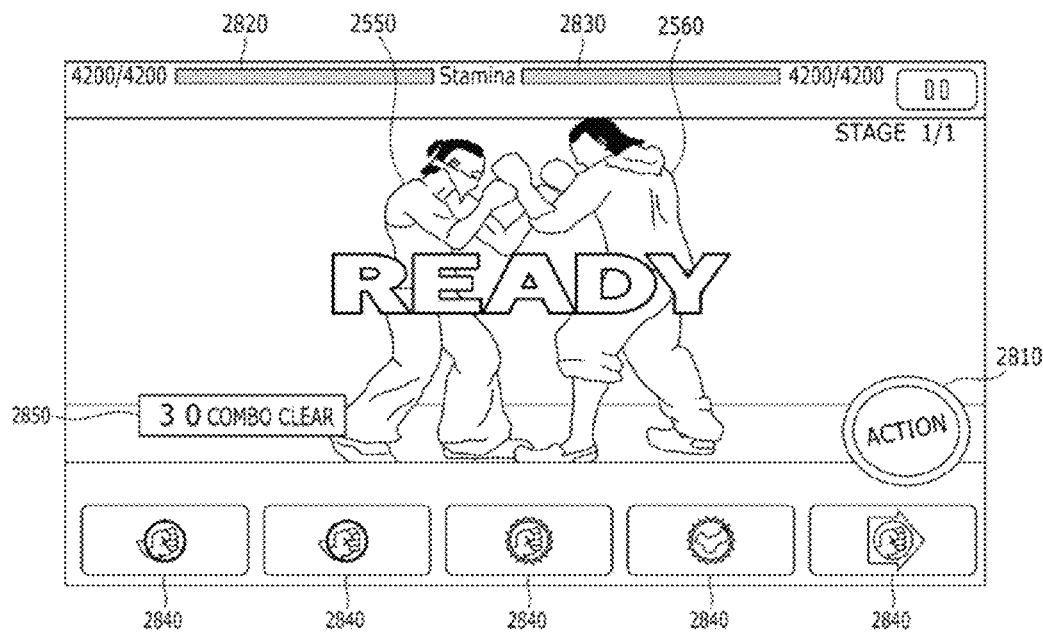
FIG. 28 shows an example of a player-to-player match-up screen according to yet another example of the social game.
Figure 29:
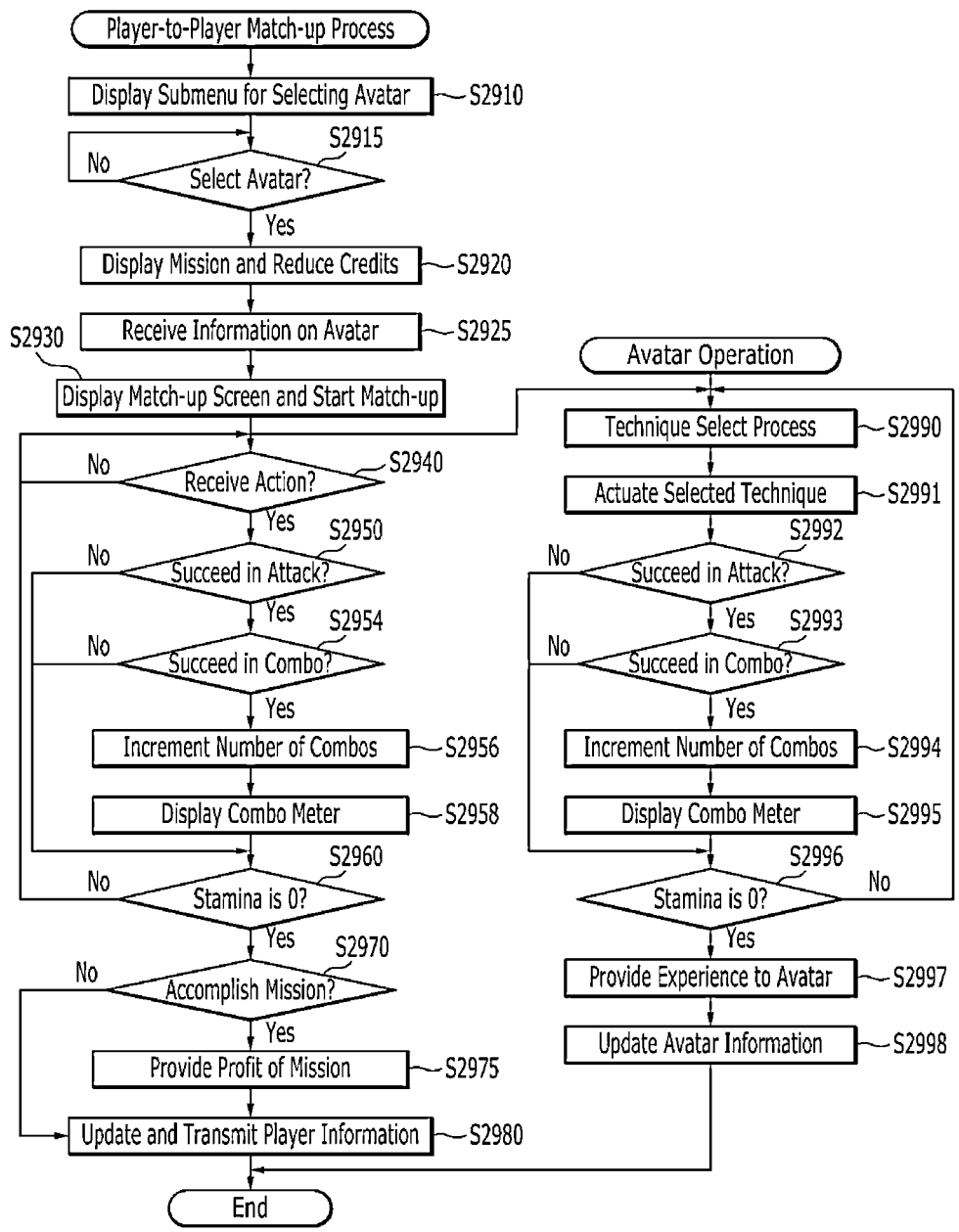
FIG. 29 shows a flowchart of a player-to-player match-up process of a gaming process according to yet another example of the social game.

FIG. 28 shows an example of a player-to-player match-up screen according to yet another example of the social game, and FIG. 29 shows a flowchart of a player-to-player match-up process of a gaming process according to yet another example of the social game.

As shown in FIG. 28, a match-up screen for a player-to-player match-up may include an action button 2810, a stamina meter 2820 of a player, and a stamina meter 2830 of an avatar corresponding to an opponent player. In this case, the stamina of the stamina meter 2820 may be reduced according to damage by an attack of the opponent character, and the stamina of the stamina meter 2830 may be reduced according to damage by an attack of the player. The match-up screen may further include a plurality of technique buttons 2840 corresponding to a plurality of techniques. The match-up screen may further include the number of combos to be accomplished (2850). Further, the match-up screen displays the character 2860 corresponding to the player and the avatar 2870 of the other player.

Referring to FIG. 29, as described in steps S2310, S2315, S2320, S2325, and S2330, the controller displays a match-up screen on the display device and starts the player-to-player match-up with a selected avatar (S2910, S2915, S2920, S2925, and S2930).

Next, the controller receives an action from the player by using the input device (S2940), and determines whether the attack according to the technique used by the user succeeds (S2950). When the attack from the user succeeds (S2950: Yes), the controller reduces the stamina of the stamina bar of the avatar by damage corresponding to the successful attack (S2952). Next, the controller determines whether the successful attack is continuous to a previous successful attack (S2954). When the successful attack is continuous (S2954: Yes), the controller increments the number of combos by one (S2956). The controller displays on the display device a combo meter representing the number of combos that are succeeded (S2958). When the continuous attack fails (S2954: No), the controller does not increment the number of combos.

Next, the controller determines whether the remaining amount of the stamina meter of the player 2820 or the stamina meter of the avatar 2830 reaches zero (S2960). When the stamina of the stamina meter 2820 or 2830 remains (S2960: No), the controller receives the action from the player again (S2940). When the stamina of the stamina meter 2820 or 2830 reaches zero (S2960: Yes), the controller determines whether the mission is accomplished (S2970). When the mission is accomplished (S2970: Yes), the controller provides the player with the profit of the mission (S2975). According to the profit, the controller updates information of the player (S2980), and ends the match-up. Further, the controller may transmit the updated information to the game management server (S2980), and the game management server may update the information of the player according to the updated information. When the mission is not accomplished (S2970: No), the controller ends the match-up without providing the profit and update the information of the player.

On the other hand, the controller or the game management server controls the avatar of the opponent player according to the avatar technique set when the player uses techniques. In this case, the controller or the game management server performs a technique select process (S2990). That is, the controller or the game management server randomly selects any one technique from among the plurality of techniques included in the avatar technique set. The controller or the game management server may randomly select any one technique based on the remaining amount of the stamina meter 2620 of the player. Next, the controller controls the avatar to actuate the selected technique (S2991). The controller determines whether the attack according to the technique actuated by the avatar succeeds (S2992). When the attack from the avatar succeeds (S2992: Yes), the controller determines whether the successful attack is continuous to a previous successful attack (S2993). When the successful attack is continuous (S2993: Yes), the controller increments the number of combos of the avatar by one (S2994). The controller displays on the display device a combo meter representing the number of combos that are succeeded (S2995). When the continuous attack fails (S2993: No), the controller does not increment the number of combos.

Further, when the match-up ends, that is, the remaining amount of the stamina meter 2820 or 2830 reaches zero (S2996: Yes), the controller or the game management server provides the avatar with the experience according to the result of the match-up (S2997). Next, the game management server updates information on the avatar (S2998).

Technique Select Process

Figure 30:
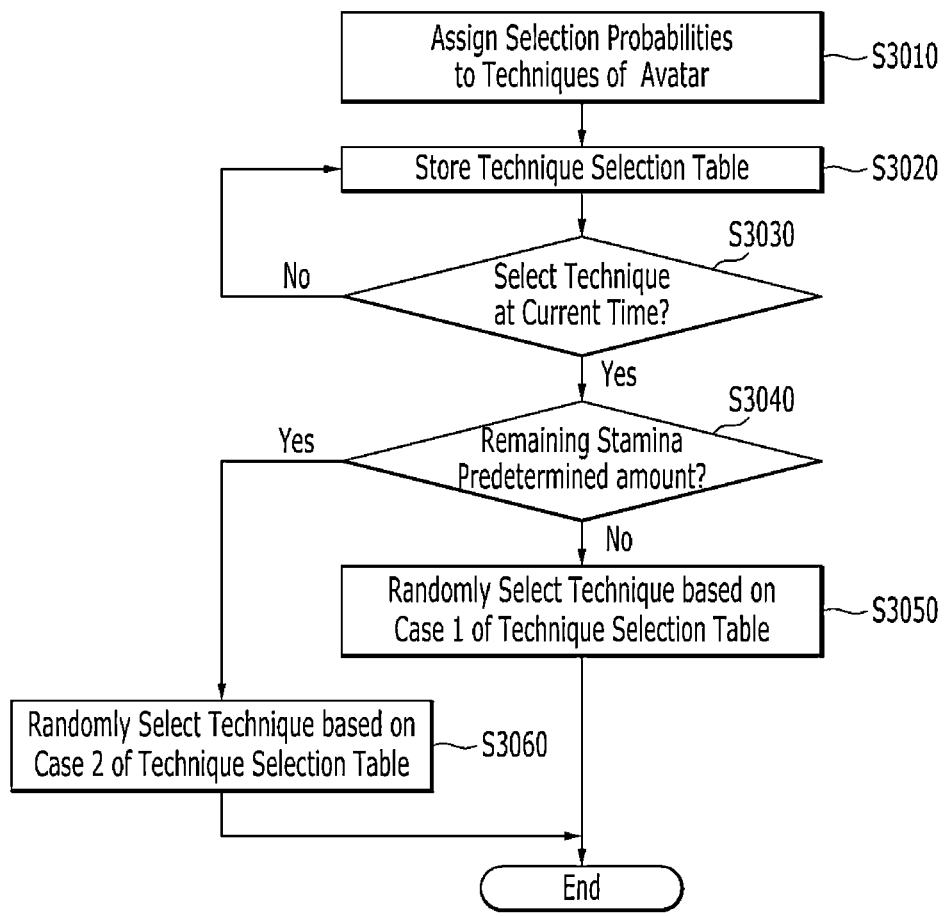
FIG. 30 is a flowchart of a technique select process according to an example of the social game.

FIG. 30 is a flowchart of a technique select process according to an example of the social game, and FIG. 31 shows an example of a technique selection table.

Referring to FIG. 30, when the game management server receives information on an avatar technique set for a certain player (S26650 of FIG. 26), the game management server assigns a plurality of selection probabilities to a plurality of techniques included in the avatar technique set (S3010). As shown in FIG. 31, the game management server may assign higher selection probability to a technique having lower power (Case 1), or may assign higher selection probability to a technique having higher power (Case 2). It is assumed in FIG. 31 that the plurality of techniques include technique 1, technique 2, technique 3, technique 4, and technique 5 in descending order of power. The selection probability may be mapped to a range of random numbers. The game management server stores mappings between the selection probabilities and the techniques to a memory as a technique selection table (S3020). The technique selection table may be included in the information on the avatar when the information on the avatar is provided in the game terminal (S2925 of FIG. 29).

When the technique select process is performed (S2990 of FIG. 29), the controller or the game management server determines whether to select or not a technique of the avatar from among the plurality of techniques included in the avatar technique set at a current time (S3030). The controller or the game management server may select the technique of the avatar each time a predetermined time is lapsed. When determining to select the technique of the avatar (S3030: Yes), the controller or the game management server determines whether the remaining amount of the stamina meter 2820 is greater than a predetermined amount (S3040). When the remaining amount of the stamina meter 2820 is not greater than the predetermined amount (S3040: No), the controller or the game management server randomly selects any one technique from among the plurality of techniques based on the case 1 of the technique selection table (S3050). When the remaining amount of the stamina meter 2820 is greater than the predetermined amount (S3040: Yes), the controller or the game management server randomly selects any one technique from among the plurality of techniques based on the case 2 of the technique selection table (S3060). On the other hand, when determining to not select the technique of the avatar (S3030: No), the controller or the game management server determines waits until the predetermined time is lapsed.

As such, even though the player does not control his or her own avatar, the avatar can actuate a selected technique to Fight an opponent character each time the technique is selected. Accordingly, the player can allow the avatar to Fight the opponent character by selecting a plurality of techniques from among a plurality of available techniques. Further, because a technique having a relatively high power is selected with a high probability when the stamina of the opponent character is consumed enough, it can be easy to turn a match-up around.

Effective Technique

Next, an effective technique determination process for determining whether an actuated technique is effect or not is described with reference to FIG. 32, FIG. 33, FIG. 34A, FIG. 34B, and FIG. 34C.

Figure 33:
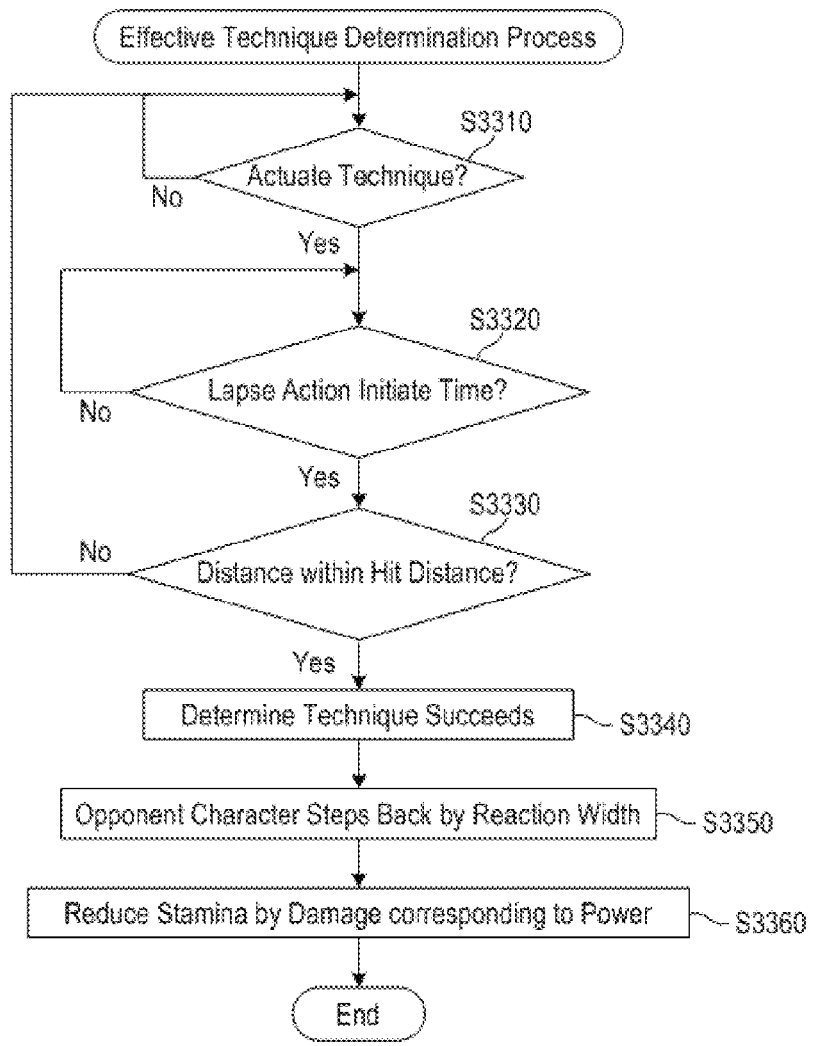
FIG. 33 is a flowchart an effective technique determination process according to an example of the social game.
Figure 34A:
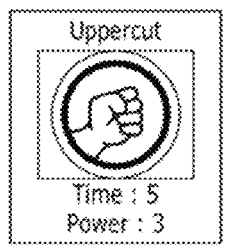
FIG. 34A, FIG. 34B and FIG. 34C show examples of technique buttons corresponding to techniques.
Figure 34B:
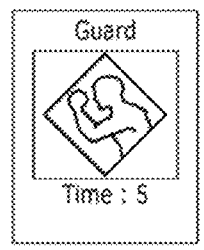
Figure 34C:
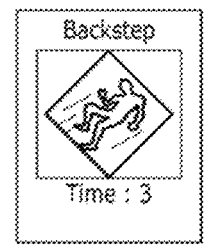

FIG. 32 shows an attribute of a technique used in a game control method according to an example of the social game, FIG. 33 is a flowchart an effective technique determination process according to an example of the social game, and FIG. 34A, FIG. 34B and FIG. 34C show examples of techniques.

The controller determines whether the technique activated by the player or avatar is successful or not at step S1150, S2350, S2392, S2950 or S2992 in FIG. 10, FIG. 22 or FIG. 29. In this case, as shown in FIG. 32, the techniques are divided, depending on the type thereof, into hit distance (the distance which leads to a successful hit: Hit Distance), Reaction width, Action Initiate time (the time from when a single technique is triggered until it ends) and Power (the value associated with the damage done to the opponent). Furthermore, when a character activates a technique, the technique is initiated after the action initiate time elapses from the time at which the technique is executed. When the technique of the character is initiated with the distance between the character and the opponent character being the hit distance range (hit distance range which leads to a successful hit set in advance for each technique), the technique is successfully performed. Furthermore, when the character activates the technique, the technique is initiated after the action initiate time has elapsed from the time when the technique is activated. If the activated technique is successful, the opponent character reacts based on the reaction width (movement width which expands the distance between the characters/for example, using a large technique with a large movement width increases the distance, whereby using a technique with a small hit distance is disabled), and takes damage by the power of the activated technique. It should be noted that when a technique with a long action initiate time is used, when one of the predetermined factors which determine the victory is whether the number of combos in a certain period of time exceeds that of the opponent, the time from when a technique initiates until it ends increases, and therefore the number of techniques triggered per unit time decreases, which means that the selection of techniques becomes an important strategy for the player.

Referring to FIG. 33, when a technique of a character is actuated by an input device (S3310), a controller determines whether an action initiate time of the technique is lapsed (S3320). When the action initiate time of the technique is lapsed (S3320: Yes), the controller determines whether a distance between the character and an opponent character is within a hit distance of the technique (S3330). When the distance between the character and the opponent character is within the hit distance of the technique (S3330: Yes), the controller determines that the technique succeeds (S3340). Further, the controller displays an image that the opponent character steps back by a reaction width of the technique (S3350). The controller reduces stamina of the opponent character by a damage corresponding to a power of the technique (S3360). If the stamina is reduced with the lapse of time, the step S3360 may be omitted.

Referring to FIG. 34A, FIG. 34B, and FIG. 34C, a technique icon corresponding to each technique may include an image for indicating a type of the technique and an indicator (time) for indicating an action initiate time of the technique.

When the type of the technique is an attack technique, the technique icon may further include an indicator (power) for indicating a power of the technique as shown in FIG. 34A. Further, the technique icon may be an icon for indicating any one of a first for a first attack or an elbow attack, a body for a body attack, a shoulder attack, or a grappling attack, a leg for a leg attack, and/or a head for a head attack. FIG. 34B shows that the type of the technique is a guard technique for blocking the attack from the opponent character, and FIG. 34C shows that the type of the technique is a backstep technique for avoiding the attack from the opponent character. In this case, the power of the technique may be increased according to a level of the player.

In some examples, a game application may provide a social network service for allowing a player to join a team.

Examples of the social game can also be embodied as a computer readable program on a computer-readable recording medium. The computer readable recording medium is any data storage device that can store data that can be read thereafter by a computer. Examples of the computer readable recording medium include ROMs, RAMs, CD-ROMs, magnetic tapes, floppy disks, and optical data storage devices. The computer readable recording medium can also be distributed over a network coupled computer system so that the computer readable code is stored and executed in a distributed fashion.

While this invention has been described in connection with what is presently considered to be practical examples, it is to be understood that the invention is not limited to the disclosed examples, but, on the contrary, is intended to cover various modifications and equivalent arrangements included within the spirit and scope of the appended claims.

Embodiment 1

FIGS. 40 to 49 are applicable to the game in which the use of items set for each Ryuha (school) is enabled by belonging to the school corresponding to the group described above. This concept of school is similar to the concept of the items for each group described in FIGS. 41 and 42, and therefore its detailed explanation is not provided. As for these items, as described above, the use of special items set for each school (for example, uniforms, weapons, or the technique button 1530 mentioned above (when the use of the special technique button 1530 is enabled, dragging of the technique which can be used only by the specific school to the technique set area 1920 is enabled)) is enabled.

The use of a special technique is set to be enabled by belonging to the school mentioned above, on the condition that the technique button 1530 of the technique is dragged into the technique set area 1920 in FIG. 19, the technique button 1530 of the special technique is displayed in a peripheral portion excluding a central portion of display area of the rectangular display 24. Thus, when the technique button 1530 is displayed on the display 24, the touch screen A21 located above the button 1530.

When the player taps on the screen A21 (touch panel 25), it is reflected on the action of the avatar of the player of a fighting scene displayed in a central portion of the screen 24. In the present invention, techniques can be triggered by the tapping operation of the buttons 1530, and therefore when the player competes with another player for the number of continuous techniques as in the present invention, or when the number is the condition for stage clear, because of the characteristics of the switch operability of the touch panel (generally called a touch screen) of the button which is not vertically movable even though it is a button, it is easier for the player to operate the button than the slide-switch operation. Although it may be so configured to determine the type of technique by the direction of slide of the slide operation, but such operation may be difficult in crowded trains, while walking, and like situations.

In those games, "If someone put a match with you, AI battles with the opponent using preset techniques. AI is strengthened by growing up, and contributes to your experience and winning points" or "even if you are not logged in, your Ai can increase your experience by winning before you know it and even increase your levels". These points correspond to FIGS. 19 to 23 and the explanation according to the drawings mentioned above. In FIG. 21, the player selects a technique button 1530 from a plurality of available technique buttons 1530, . . . , 1530 displayed in the available technique area 2210, moves the technique button 1530 to the stamina gauge 2222 in the area 2220 of the avatar technique set, and touches and drags the technique button 1530 to the area 2220 of the avatar technique set. This automatically enables the AI (avatar) to perform a match-up with another avatar as shown in FIG. 23. It should be noted that the stamina mentioned above is equivalent to the HP (drive) in this Example. Moreover, the avatar grows up as those (characters) in conventional role playing games by the experience obtained by the result of the fighting. This growth corresponds to the contents such that the entire amount of HP mentioned above increases, the numerical value of attacking power increases, or the rate of recovery of HP increases over time.

In a log-in state, it is so configured that a match-up as mentioned above is automatically triggered by inputting the action 1510. In addition, in a non-log-in state, on the condition that another player has been set as the opponent avatar, upon the start of the game, the controller A100 of the server automatically performs a technique program process associated with the technique buttons 1530 in the order of the technique buttons 1530, 1530 set in the stamina bar 1922 in FIG. 20. The timing at which the technique program associated with the technique buttons 1530 is triggered by the controller A100 is automatically triggered sequentially according to the degree of decrease of the stamina (HP) of AI. That is, even in a non-log-in state, when the avatar (AI) raised by the player in a non-log-in state is selected as an opponent, the avatar raised by the player him/herself plays a match against an avatar of the player in a log-in state while the player in a non-log-in state is not aware of it (while the player is not logged in). According to the result of the match-up, the controller A100 of the server automatically performs the update process of the status numerical data containing the experience of the opponent avatar which is stored in association with the ID of the player in a non-log-in state.

No fighting game which adopts such setting exists so far. By employing this setting, when the player in a non-log-in state next logs in, the controller A100 displays the status data of the updated avatar, whereby the possibility that the player acknowledges the display and to enjoy occurs. This increases the possibility to stimulate player's motivation to log in again and continuously.

It is expected that the player tries to change the costume, face and hair style of the avatar so that the avatar raised by him/herself is selected in a non-log-in state by other players. New costumes, faces, and hair styles can be purchased using the shop function executed under control of the controller A100 through a virtual currency in the game. This virtual currency can also be exchanged and increased by credit card transactions, etc., using a real currency (charging), but it can be also configured so that a certain amount of virtual currency increases depending on the results of the various events within the game, or a certain amount of actual time elapsed (for example, each time the date changes).

Moreover, it is also possible to determine the avatar of the match-up opponent at random by a lottery program of the controller A100 using random numbers. In this case, it may be so configured that the random-number range assigned is changed according to the amount of currency used so that the probability that the avatar is selected as the match-up opponent is increased depending on the accumulated amount of money used to purchase in real currency.

The card picture A depending on the type of the technique buttons 1530 is stored in the above-mentioned server. It may be so configured that the card image A for visually displaying the card is downloaded on the terminal A 20 side every time the technique button 1530 is obtained, or that it is downloaded when the operation to display the card is performed on the terminal A20 side. According to the type of the technique buttons 1530, two or more types of these card pictures A are stored in the data base A101 of the server.

In those games, a style (martial artist, Commando, assassin, . . . etc.) can be selected from various schools.

That is, the method includes the step of connecting the terminal A20 in FIG. 38 to the server 10 by operating the touch screen A21 of the user (player) (a type of the game terminal 20, as well as a cellular phone and a tablet terminal, is present), the step of transmitting an ID such as the user ID or/and terminal ID to the server 10, PIN code such as password as necessary is input through the operation of the touch screen A21, the step of receiving those information from the server 10, and the step in which the controller 11 of the server 10 executes an authenticating program stored in the storage device 13 to execute an authenticating process, the step of transmitting an existing as selection request response S1 in FIG. 43 in order to display a plurality of existing schools on the display screen 24, the step of determination process in which the controller A100 determines whether or not a request from the game terminal A20 generate a new group A130 (whether to participate in the existing group A130) (step S2 described above), the step (S3 in FIG. 43) in which the controller A100 (100) performs a group generation process when a request from the game terminal A20 generates a new group A130 (S2: YES in FIG. 43), and the step (S4 in FIG. 43) in which the controller A100 performs a process of group participation when a request from the game terminal A200 participates in the existing group A130 (S2: No in FIG. 43), and next, when it is determined that a request to participate in a plurality of existing schools (groups) has been made (S2: NO in FIG. 43), the controller A100 executes the step in which the controller A100 transmits a response to request a selection of the existing group A130 (S20 in FIG. 45).

This response may include a name associated with the existing group A130 and the content of a special item A112. In this case, the data table which defines a group item table (FIG. 40), the status of the item itself which is not illustrated, etc. are referred to. The game terminal A20 that received a response displays options for selecting a group as a for-input image A22.

Next, the controller A100, based on the selected group contained in the request from the game terminals A20, the group ID of the group and the user ID of the registered user who demanded the request, and newly stores in the user belonging group table (refer to FIG. 41) (S21). The controller A100 refers to all the group items associated with the selected group, from the group item table. The controller A100 then transmits the response for requiring the selection of the special items A112 (S23). Here, the game terminals A20 which received the response displays all the special item A112 associated with the selected group A130 and all the items associated with said registered user in the user's item table (see FIG. 42), as for-input images A22 for a check list. That is, the registered user selects a restricted number (for example, not more than five) of items to possess.

Next, the controller A100 updates the item columns 1 to 5 of the user's item table (see FIG. 42) with the selected items A112 included in the request from the game terminal A20. This process then ends.

Thus, in response to the request from the second registered user A120 who demands the participation in the group A130, the game management server A10 stores the second registered user A120 in the data base A101 in association with the group A130, while it imparts the authority to possess one or more special items A112 from the group items A131 associated with the groups A130 to the second registered user A120.

Meanwhile, after the school to which the user wishes to belong is stored in association with the ID relating to the user is stored by the controller 11 of the server 10, the controller 11 executes a step in which a signal for requesting to select any style from various schools mentioned above (martial artist, Commando, assassin . . . etc.) is transmitted to the terminal A20. This step can be omitted when the determination of the school is the determination of the style.

Furthermore, after the school is determined and the style is determined, the process proceeds to the participation in the community utilizing the characteristics of the social games, or the step of process of generation of the community under the control of the controller 11.

Embodiment 2

In this invention of another games, the key features are that a plurality of technique buttons 1530 of the technique which are technique icons are disposed around the display screen 24, and these are tapped on (continuously contacted by the fingers) while the technique program associated with the technique button 1530 is executed continuously, and that the score is determined by the number of hits of the technique while keeping the opponent character in the air by triggering the continuous techniques.

In order to realize such control, the controller 11 of the server solely or the controller 11 of the server and the controller 21 of the terminal in combination executes the following control process.

When the technique buttons which can be used are set, icons of techniques are set to the position which avoids the center portion for displaying a fighting scene along with the bottom side of the rectangular display screen 24. Every time this icon is touched, the technique is executed by control of the controllers 11 and 21, and the image related to the same is displayed by control of the above-mentioned controllers 11 and 21. Such a control is also the same as that of the school fighting mentioned above.

The controllers 11 and 21 display the state where the opponent character is in the air off from the floor of the display screen when the above-mentioned technique is executed at a certain timing. Between this state and the time when the opponent character touches the floor, the controllers 11 and 21 execute the process of temporarily storing the number of hits made on the opponent character by the operated character as the score in the storage units 13 and 23.

In association with the technique icon 1530, condition data for determining whether or not the technique of the technique icon hits (the time required from the execution of the previous technique to the triggering of the next technique, and the interval of the same), the reduction value (attacking power value) of the HP of the opponent character when the technique is triggered and determined as a hit, temporal data for further extending the state that the character floats in the air (when a program by which the opponent character descends in a certain period of time is executed, substantially the same meaning since the time to retain the state of floating in the air off the floor is extended consequently even if it is an anti-gravity value which lifts the character when the technique is hits) are defined for each technique and table data is stored in advance in the storage unit 13 or the data base A101 in the server 10.

That is, this Embodiment includes the following invention.

This invention included relates to a game controlling method in which the terminal 20, A20 and the server 10, and A10 are connected by a communication line, the servers 10, A10 have the controllers 11, A100 to execute main social network game, and the controller 21 of A20 of the terminal 20 which receive request signals from the controllers 11, A100 and data for generating game screens transmitted, and executes control of transmitting the results operated by tapping on the image of a plurality of types of techniques on the touch panel 25 to the above-mentioned servers 10 and A10, the method executed by a computer which executes a game on a display screen of the terminals 20, A20, while the opponent character displayed on the display screens 24, A20 is floating in the air, calculate related the game score to the cumulative number to the technique which hit the opponent character, and the invention is realized by executing the following control by the computer.

That is, the controller 11 of A20, A100, 21 of the server 10, A10 or the terminal 20, as shown in FIGS. 57 and 58 described later, each time a unit game ends, is stored in the game progress information storage area P of the servers 10, A10 in a manner of being identifiable for each player varied depending on the result of the unit game.

When the unit game is started, the data necessary for the game progress based on the game progress information linked to the terminal ID and player ID from the game progress information P1, P2 . . . PN for each of a plurality of players stored in the game progress information storage area P of these servers 10, A10 have been downloaded from the servers 10, A10 to the terminals 20, A20 in advance. The downloaded data described above include descent control data for controlling the state that the opponent character descends in a certain stage among stages 1 to N, and "distance data for hitting of a technique" which is also the "date for determining the failure or success of the technique" for determining the outcome of the technique depending on the distance between reference points (distance) with the operated character relative to the opponent character. Other data include "image data of the character on the stage", movement data which control automatic movement of characters (in particular, opponent character) on the stage, movement data of techniques, ascending control data for ascending the opponent character when a technique hits, and gravity addition data for changing the descending speed of the opponent character after a hit stage.

Based on this downloaded data and the first program, the controller 21 executes a control process as illustrated in FIG. 55. The descent control data of the opponent character stored in advance in the servers 10, A10 are downloaded into the terminals 20, A20, and a process (step BS1) for controlling the state that the opponent character descends is executed based on the descent control data these downloaded data. If no technique hits (there was no hit), when the reference point of the opponent character descends to a position corresponding to the position data of the floor with reference to the data of the position of the floor of the display screen 24 (preset data of lowermost position), the initiated unit game ends.

That is, the controller 21, after executing the display of releasing the opponent character displayed in a state of being hung from the hung state, starts the descent display of the opponent character based on the descent control data received from the servers 10 and A10 (step BS2). The controller 21 constantly monitors the distance between the operated character and the opponent character.

The distance at the timing of touching the input of the technique to the touch panel 25 to perform the game input of the terminals 20, A20, depending on the data for determining the failure or success of the technique on the opponent character stored in advance for each technique, executes a process (step BS3) of determining the outcome of success or failure of the technique operated.

When the technique hits in the determination, a process of updating and storing the success of the technique of extra time to the cumulative data storage area for storing the number of times of success of the storage units 22 and 23 is executed (step BS4).

When the above-mentioned determined outcome is a success (when a technique hits), a process (step BS5) of executing a limiting control of floating or descent for the above-mentioned opponent character depending on the limiting control data (the same meaning as the ascending control data in FIG. 57) for each technique stored in advance is performed. The process of steps BS4 and BS5 is performed by the controller 11 executing the first program.

The cumulative number of hits stored in the cumulative data storage area is, when the servers 10, A10 and the terminals 20 or A20 are connected at the end of the unit game, updated and stored to P1, P2, . . . , PN of the game progress information storage unit P (storage area included in the storage units 12, 13) corresponding to each the terminal 20 or A20ID (or the player IDs), respectively, under the control of the controller 11.

As the descent limiting data, when the parameter (data included in the descent control data) of the descent acceleration of the opponent character is set, when a technique is successful and hits the opponent character, based on the power values of the techniques which we're set respectively in advance, based on the parameter of the descent acceleration and the data of the preset mass of the opponent character, a process of adjusting the descent control is executed by the controller 21 operating based on the data (step BS5).

for example, as a result of the adjustment process of the descent control by the controller 21, it is so configured that the speed of the opponent character is temporarily changed from a descending direction to a rising direction, or the descending speed functions to decrease. as for the parameter which changes in the rising direction in such a manner, the ascending control data by the techniques A to Z in FIG. 57 stored in the storage unit 12 or 13 are involved. This storage unit stores in the area W of the storage unit, technique action data A to Z, ascending control data by techniques A to Z (which can be also considered descent control data from a different perspective), and distance data for hitting of the technique by techniques A to Z, while The storage area CN stores data which are changed for every stage, and are prepared for every 2 to N stages. The data C1 of the first stage is included in the first program B1, and is stored so that it can be integrally transmitted. This is a consideration for allowing the game of the first stage to be immediately performed when the game is first downloaded as an application. The second game program is also stored in the storage part 12 or 13.

However, the descent limiting data and descent control data (the same meaning as ascending control data) are not limited to such instances, but it may be so configured that the ascending speed depending on the type of the technique on the descent control data is set in advance, and for a certain period of time predetermined for each technique from the time when the technique hits, the ascending representation is executed based on the ascending acceleration as the descent limiting data without using the descent control data. In this case, the operation process which used lowering-controls data for adjustment process of the above-mentioned lowering controls becomes unnecessary.

If the controller 21 determines that the opponent character has descended to the height which was set as the floor (step BS6), the game is ended as the end of the game (to be strict, the end of the unit game. The entire game consists of a set of unit games).

After the unit game ends, a process (step BS7) in which the controller 21 determines whether or not the stage is cleared by determining if the number of techniques which successfully hit the opponent character (success) reached a mission target between the start of the unit game and the ends of the same is executed.

In the process of step BS7, When the controller 21 determines that the mission target is cleared by executing the first program, The controller 21 executes a control process which displays the clear display image of the mission target stored in the storage units 22 and 23 in advance on the display screen of the display device 24 (step BS8). Subsequently, the controller 21 ends the unit game under the control of the first program, and executes a control process which displays the unit game-termination screen stored and prepared in the storage units 22 and 23 in advance on the display screen of the display device 24 (step BS9).

Meanwhile, in the process of step BS7, when the controller 21 determines that the mission target is failed (not cleared) by executing the first program, the controller 21 executes a control process of displaying the failure (non clearance) display image of the mission target stored in the storage units 22 and 23 in advance on the display screen of the display device 24 (step BS10). Subsequently, the controller 21 ends the unit game under the control of the first program, and executes a control process of displaying the unit game-termination screen stored and prepared in the storage units 22 and 23 in advance on the display screen of the display device 24 (step BS9). The game-termination screen displayed at this time may be different images for the cases of success and failure, respectively.

Described above is the flow of the control of the start of the unit game to the end of the same by the controller 21 executing the first program. In the scene displayed by the flow of the process of BS2 to BS5 mentioned above, the representation of the game displayed on the display screen of the display device 24 prevents the opponent character from descending, and therefore, visually natural and real representation, for example, kicking representation, is provided. Among several types of attacks given to the opponent character, visually big techniques are given great power values mentioned above, while techniques which are perceived as small techniques such as jab are given small power values mentioned above, whereby different weighting is set so that no unnatural feeling is given to the relationship between the visual representation of the technique and the power value.

Moreover, as for data for determining whether or not a hit is valid, the success determination data (the same meaning as the distance data for hitting of techniques) are sometimes so prepared in advance for each technique that, in the case of a small technique, the technique is successful when the distance between the reference point of the opponent character and the reference point of the operated character is small, while in the case of a large technique, the determination of a success is made with the distance between the reference point of the opponent character and the reference point of the operated character is greater than that of the small technique. However, since the data is preliminarily set that when a big technique hits, the big technique creates great reaction (reaction value) as shown in FIG. 32. This increases the distance between the reference points of the opponent character and operation character. Therefore, the controller 21 controls such a situation in the following game that the small technique does not hit until the opponent character comes down and the distance between the reference points becomes small enough to allow the operated character to hit the opponent character by executing the first game program.

Furthermore, when a technique is triggered with several types of techniques, the time values T1, T2, . . . are set in advance so that the time until the player is allowed to input the next technique (technique input acceptance rejection time), that is, the time from a technique is triggered until the acceptance of the next technique is started, increases as the power values of the plurality of techniques increase.

The controller 21 executes the control to allow the input of the next technique based on this data of the time value. Since the game of this embodiment employs such gaming characteristics that the more the number of hits of techniques, the better the game outcome of the unit game, as described above, strategic characteristics of the game can be imparted to the selection itself of techniques by the player by providing different technique input acceptance time for each technique.

Moreover, when the descent data of the opponent character is set by the parameter of acceleration, the controller controls to increase the acceleration according to the cumulative number of times stored in the storage unit 13 or 23 (or both storage units 13 and 23). The same applies to all controllers to which the reference mentioned above is not given, but when the representational image displayed on the display screen 24 in the social network game is controlled. It is case by case whether the image is controlled by the controller 12 on the server 10 side or the controller 21 on the terminal 20 (A20) side. However, in the case of this Example, since it is one of the features that no communication is performed between the servers 10, A10 and terminals 20, A20 during the execution of the unit game, it is the controller 21 of the terminals 20, A20 that controls the image displayed on the screen 24.

Thus, the descending speed of the opponent character increases by increasing the acceleration depending on the cumulative data associated with the cumulative number of techniques successfully made, and therefore depending on the player's (user's) timing (since the distance formed between the reference points of the opponent and operated character changes depending on the timing) of operation to successfully perform the technique becomes difficult so that the difficulty can be controlled to automatically increases.

It may be so configured that the controller 11 or/and 21 generates a score by acting the power value (also referred to as attacking power value) defined for each of the plurality of techniques on the cumulative data stored in association with the cumulative number of successful performance of the technique. That is, in view of the point that a large technique is difficult to successfully perform but has a great attacking power, when the same number of large techniques and small techniques successfully hit, it is so controlled that the case with a higher cumulative number of hits of large techniques gets greater game score.

However, in the present invention, the opponent character is hung in midair, and then the descent of the opponent character based on the descent control data described above is started from the hung state by a certain number of successful performance of techniques (hits). The controller lifts up the opponent character by performing calculation based on the descent limiting data (kicking, punching) associated with for each technique by the hits with the techniques which are the data used to have the same meaning as the ascending control data in this Example and the descent control data of the character. The descent control data are changed by the number of hits (success) of techniques, and this change is controlled by the controller so that the descending speed of the opponent character increases as the number of hits of the technique increases according to the gravity addition value data associated with each of techniques A to Z.

moreover, (A) the technique is a large technique, and the large technique is set in association with the ascending control data having a high degree of ascending the opponent character when hitting in the direction moving away from the height position data set as the floor, while (B) the technique is a small technique, and the small technique is associated with the ascending control data having a low degree of ascending the opponent character when hitting in the direction moving away from the height position data set as the floor. However, comparing (A) "the technique associated with the ascending control data having a high degree of ascending the opponent character when hitting in the direction moving away from the height position data set as the floor" and (B) "the technique associated with the ascending control data having a low degree of ascending the opponent character when hitting in the direction moving away from the height position data set as the floor", the technique (A) is stored in association with the gravity addition value data which increases the speed of descending when hit than with the technique (B).

Thus, the higher the "degree of ascending the opponent character when hitting the opponent character in the direction moving away from the height position data set as the floor" associated with the technique, the more "the gravity addition value data which increases the speed of descending when hitting the opponent character" is associated. Therefore, a large technique which lifts the opponent character higher is hit, the controller controls the opponent character to fall faster using the gravity addition value data with a high gravity value set. This allows the player to obtain strategic characteristics by selecting techniques.

The acceleration is equivalent to the gravity which generates the speed that the opponent character falls to the floor or the ground in this proposal.

It should be noted that an item called a doping item is present in this project. When this doping item exists in the item stored in association with the user's ID, and the controller 11 of the server 10 determines that the use of the item is selected and input by the operation of the player on the touch panel, a weight reduction value stored in association with the item is based on the controller 11, and a process of changing the attacking power value to that increased by the attacking power value set for each technique is executed, so that the descent inhibition is greater in the case where this item is used even when the same technique is hit.

Next, with reference to drawings, the contents of the game mentioned above and the hardware structure executing the same will be explained below.

Figure 47:
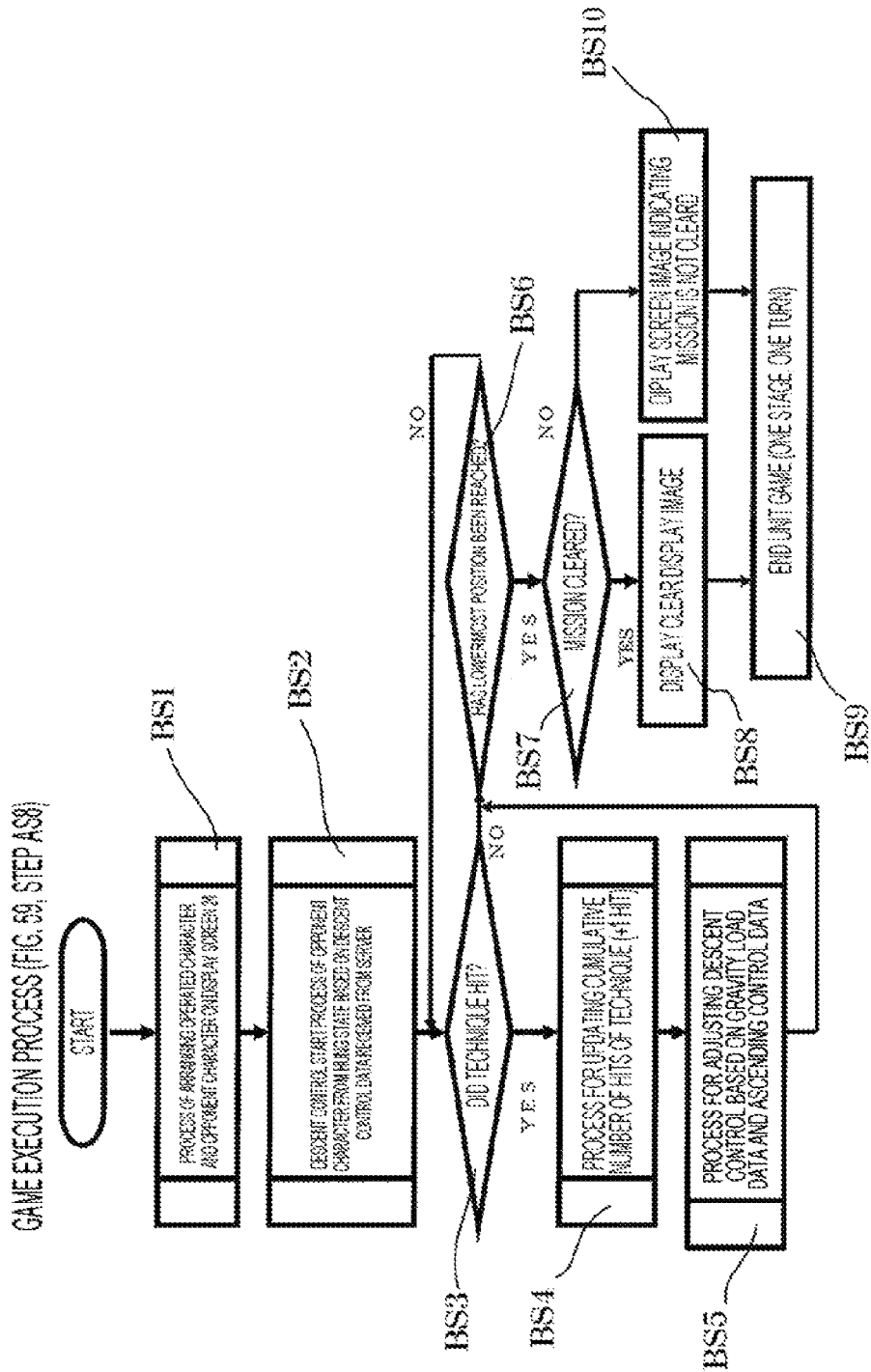
FIG. 47 is a process of part of the process of the game execution process AS8 of FIG. 50 described later and shows the control process flow of the case where the enemy character is hit in the game.
Figure 48:
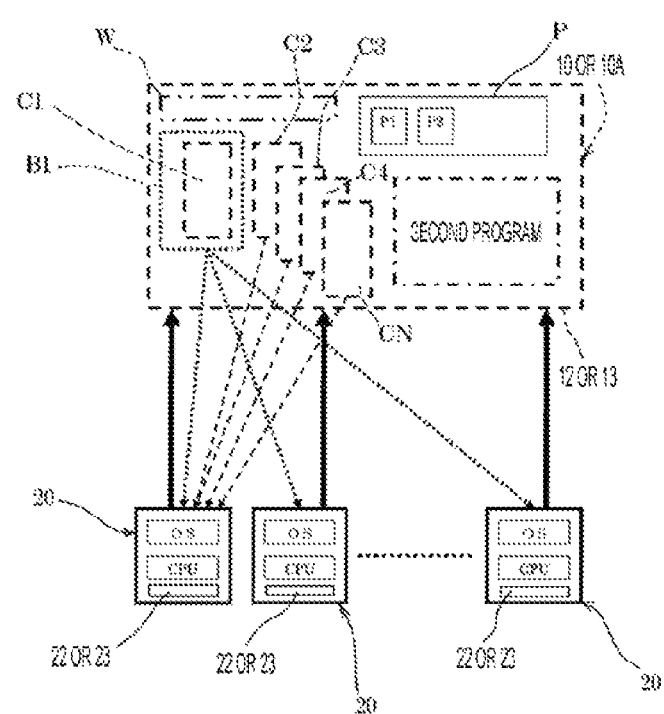
FIG. 48 is an explanatory drawing which shows the transmission state of the data for each unit game.

FIG. 47 shows the hardware structural drawing of the present invention. the components referred to by using the same numerals in the drawing described above in the drawing indicate the same structures.

In FIG. 47, indicated by the dotted line are an internal memory and a storage unit of numerals 12 and 13, and numeral 20 (A20) shown by the solid line is a game terminal.

The internal memory and storage unit shown by the numerals 12 and 13 store a first program B1 which is downloaded from an external server for game download into a portable terminal (hereinafter referred to as terminal)

equipped with an internal electrical power source and made portable and stored in the memory of the terminal.

The first program B1 contains data C1 such "descent control data of the opponent character in the first stage "for use in the game of a first stage and "the image data of the opponent character in the first stage", or "the movement data of the character in the first stage", which are necessary for executing the game.

The controllers of the terminal 20 and server 10 execute a control process of replacing the data C1 necessary for executing the game in this first stage with data C2 to CN necessary for executing games associated with a second to Nth stage different from the data necessary for the execution of the game in the first stage depending on the next stage based on the game progress information contained in a signal received from the terminal 20.

In the FIG. 47, numeral P indicates a player game progress information storage unit which stores the game progress information of the players who have played the game previously by a plurality of terminals 20 . . . 20. The game progress information is stored in different files P1, P2 . . . so that information can be overwritten and read independently for each player as each player has different game progress information. The identification information of the terminal used at the time of game execution is also stored in the game progress information for each player stored in P1 and P2 mentioned above. When the server 10 receives this terminal identification information, it automatically refers to the game progress information corresponding to the identification information of the connected terminal 20, causes the terminal 20 to download any of the data C1 to CN stored in advance for every stage, which are the data necessary for executing the game in the following stage, and prepares downloaded data to be stored in the memory 22 or 23.

In this embodiment, it is so configured that the game progress information is stored in both the server 10 and the terminal 20, but it may be so configure that the game progress information is stored at least on the terminal 20 side, and this game progress information is contained in a signal transmitted to the server 10 from the terminal 20 at the start of the game, whereby The controller of the server 10 determines the data necessary for executing the game started thereafter, and "the data necessary for executing the game" transmitted to the terminal 20 according to this determined outcome is prepared, which is then transmitted from the server 10 to the terminal 20. However, if it is stored in both the server 10 and the terminal 20, even if the game progress information stored in the internal storage unit is broken because the terminal 20 is submerged or for other reasons, the game progress information on the server 10 side is stored in association with the ID as an identification information which identifies each terminal or player, and therefore it is more likely that the game can be continuously executed on a new different terminal 20.

Numeral B1 is a first game program to be downloaded when a game is started. The first game program includes the data C1 necessary for executing the game in the first stage.

The first game program is a program prepared depending on the operation system (OS) stored in advance in the terminal 20. Although the server 10 may be prepared independently along with the OS, it may be so configured to display an OS selection screen on the display screen 24 of the terminal 20, operate the operation means as the touch screen panel 25 of the terminal 20, and to download the first game program to be downloaded into the terminal 20. The first game program is a program so constituted to execute a game on the OS through downloaded OS, and is not capable of executing a game on other OS.

Meanwhile, in the memory means (the memory 12 or the memory storage 13) of the server, a second game program for executing the game over a plurality of game stages by cooperating with the first game program. The first game program is a program executed by a CPU which is the controller 21, and the second game program is a program executed by the controller 11.

FIG. 49(A) is a drawing showing specific data of the data necessary for the game execution. "The data necessary for game execution" for executing the Nth stage is stored in the mark CN, and includes descent control data of the character in the Nth stage, image data of the character in the Nth stage, and movement data of the character in the Nth stage.

The technique data W shown in FIG. 49(B) can be used on a plurality of stages. They are also data associated with the techniques obtained by the points obtained in the game or by charging, or the technique directly acquired by the outcomes of the game. As the parameters for each technique shown in FIG. 32, with each technique, a table (not shown) in which A. Hit Distance which allow hitting of the technique. ascending control data which are reactions when a technique hits, specifying the distance and speed to lift the opponent character in this Example (Reaction), and C. gravity addition data which acts on the descent control data of the opponent character when a technique hits and increases the fall speed each the technique hits are associated are included in the technique data. Although this technique data W is stored in the memory means (the memory 12 or the memory storage 13) of the server in advance, it is so configured that, when downloading the first game program to the terminal 20 before the start of an early game, it is contained in the first game program to be transmitted by the controller of the server to the terminal 20, techniques are obtained by executing the game, techniques are purchased, or the data W about the techniques which become usable with the identification information (ID) associated with the terminal 20 depending on the score and points obtained in association with the game outcome is transmitted automatically from the server to the terminal 20 at a timing other than during the game.

Moreover, the movement data of the character (opponent character) included in the data C1 to CN necessary for executing the game is, for example, the data for automatically displaying the movement of technique A made by the operated character when the technique is executed on the display screen 24 without needing the player's detailed operation when the technique is executed.

As mentioned above, in this Example, a social network game program includes a first program (the same meaning as the first game program) downloaded from a server (10, A10) an external server for downloading games into a portable terminal (hereinafter referred to as terminal 20, A20) which is provided with an internal electric power source and made portable and stored in a memory 22 or 23 of the terminal 20, A20, and a second program (the same meaning as the second game program) which allows the terminal 20, A20 to execute the first program in response to an input for starting a game from an input device (25, A21) provided in the terminal 20, A20 via an operation system program (OS in FIG. 55) stored in the terminal 20, A20 in advance, and is capable of executing a game by being connected to the server (10, A10) by executing this first program and by cooperating with the first program, the second program stored in the memory 12 or 13 of the server (10, A10), and the social network game program which is composed of the first program and second program executes the following process on the controllers the server (10, A10) and the terminal 20, A20.

Figure 50:
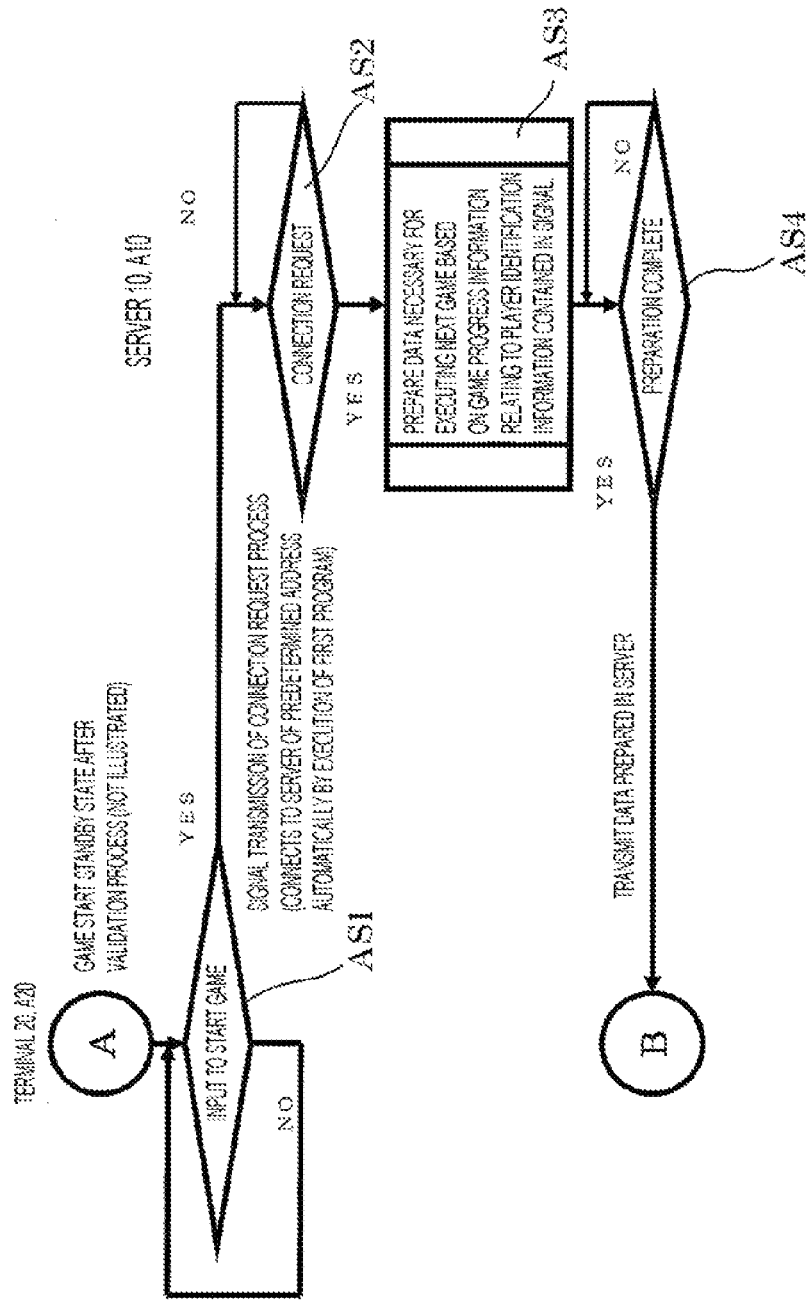

In response to receiving an input of the game start from the input device (25, A21) of the terminal 20, A20 (FIG. 50, step AS1), The first program transmits a signal for requiring connection to the external server (10, A10) storing the second program. In response to receiving the signal (FIG. 50, AS2), the second program is executed by the controller 11. The control process of this controller 11, allows the game program information (P1, P2, . . . , PN) linked to the player, terminal, or identification information for identifying the first program contained in the signal to be automatically referred to and extracted, and depending on this extracted game progress information, the data which are necessary for the controller 11 to download the game and to be downloaded into the terminal 20, A20 are prepared (FIG. 50, AS3). Furthermore, the controller determines that the preparation is completed (FIG. 50, AS4), the data is transmitted to the memory 22 or 23 of the terminal 20, A20 to be stored therein.

Figure 51:
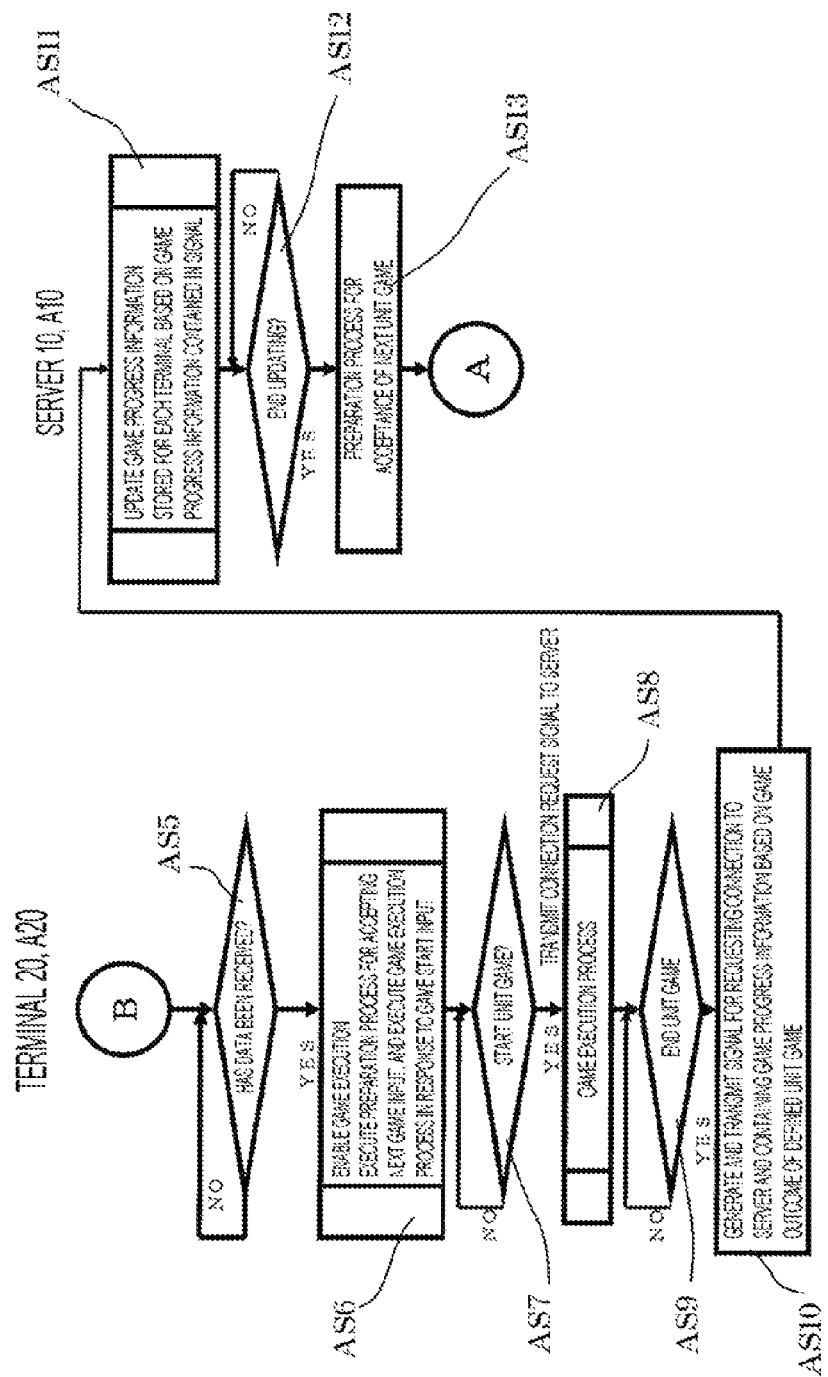
FIG. 51 is a control flow of the unit game following FIG. 50.

The first program is executed by the controller 21, whereby The controller 21 determines that data necessary for executing the game are stored in the memory 22 or 23 of the terminal 20, A20 (FIG. 51, AS5). The game is set enabled with the determination as a trigger, and the terminal 20 and A20 are caused to execute the process of receiving the game input into the input device 25 and A21. This execution of the receiving process includes perform internal settings for a standby state which allows the initiation of the game, as well as displaying a game start request screen such as "touch this button switch to start game" on the display screen 24 and screen A22. When the controller 21 receives the information that the game start input was made, The game is started and a game execution process is performed to execute the game (FIG. 51, AS6).

Next, the control process after the game is started will be described. In response to the determination by the execution process of the controller 21 of the first program that a turn or stage is terminated (the same meaning as the termination of a unit game) in the game executed in the terminal 20, A20 the signal to request connection to the server (10, A10) containing the second program is automatically transmitted by the execution of the first game program.

The game progress information contained in the signal stored as files identifiable with each ID which is a terminal identification data of the terminal 20, A20 is stored in the game progress information storage unit P. By using the structure of this premise, the game program information stored for each the terminal 20, A20 in the server 10, A10 corresponding to the ID (the same meaning as player identification information data) contained in the signal each time it is determined that the unit game is terminated, such as "in response to the determination by the execution process of the controller 21 of the first program that a turn or stage is terminated in the game executed in the terminal 20, A20" described above, the controller 21 executes a process of automatic updating by executing the first program. When automatically updating, for example, the data equivalent to the game score, the data relating to the number of continuous hits, or items and virtual money obtained at random during the game or depending on the game outcome occurring during the game and other game outcome data are contained in a signal transmitted from the terminal 20, A20 to the server 10, A10, and the game progress information is updated based on this game outcome data.

It should be noted that the ID can be the identification information of a SIM card incorporated in a smart phone as the terminal 20, A20, so that the identification information of this SIM card can be automatically transmitted to the server 10, A10 as a signal transmitted when the terminal 20, A20 is connected to the server 10, A10 by executing the first program, thereby simplifying the operation from the connection to the game start. However, when the ID is used as the identification information of the SIM card, and when the identification information of the SIM card has broken in emergency, it may be difficult to perform the game continuously. Therefore, it can be so configured that when the player inputs the game start from the terminal 20, A20 (FIG. 50, step AS1), the player manually input the player identification information data determined for each player on the touch panel and the like, whereby, although the input itself may be troublesome, a continued game can be advantageously performed using a new terminal 20, A20.

(A) The update process of the game progress information (P1, P2 . . . , PN) will be explained more specifically: The step of requesting connection in order for the controller 21 to transmit the signal generated by executing the first program to the server 10, A10, and transmitting the signal (between Steps SA1 and SA2).

(B) In response to receiving the signal described above, when it is determined that the terminal 20, A20 request connection to the server 10, A10 (Step AS2: YES), a validation process (not illustrated) is performed, and then the process proceeds to the next step SA3.

The controller 11, A100 of the server 10, A10 executes the second program, whereby, based on the game progress information contained in the signal, the data which is necessary for executing the following game and to be downloaded into the terminal 20, A20 are prepared (Step AS3).

When the controller 11, A10 of the server 10, A100 determines that this preparation is completed (step AS4), the prepared data is transmitted to the memory 22 or 23 of the terminal 20, A20 to be stored therein.

(C) When the first program determines that the data which is necessary for executing the game are stored in the memory 22 or 23 of the terminal 20, A20 (FIG. 51, step AS5), the game is set enabled with this determination as a trigger, and The terminal 20, A20 is caused to execute the process of receiving the game input to the input device 25 (step AS6).

Subsequently, when it is determined that the game input has been made on the touch panel 25 of the terminal 20, A20 (FIG. 51, step AS7: YES), the game is executed (step AS8). In the process of this step AS8, the first program and The images and movement data of the character for executing the game in the stage, technique movement data, ascending control data depending on the technique, the technique distance data, the gravity addition value data of techniques, and all other data for executing all the games have been transmitted to the terminal 20, A20 from the server 10, A10 in advance. It is therefore configured to eliminate the necessity for the terminal 20, A20 to connect to the server 10, A10 during the unit game.

(D) It is determined that a situation of the game executed on the terminal 20, A20 had terminated a turn or stage by the execution process of the first program (step AS9).

In response to this determination, the controller 21 executes the first game program, whereby a signal for requesting connection to the server 10, A10 storing the second program, which is also a signal containing the game progress information based on the game outcome of the unit game defined by the termination of a turn or a stage, is automatically generated and transmitted (Step AS10).

(E) Based on the game progress information contained in the signal, the game progress information corresponding to the terminal identification data contained in the signal is updated. This game updated information is data stored in each terminal of the server 10, A10 in a manner of being identifiable. (FIG. 51, step AS11).

Next, when it is determined that the game update information containing the outcome of the game (items, number of hits in the game, or scores, etc., obtained during the game) obtained when the unit game ends contained the signal transmitted from the terminal 20, A20 have been stored in the storage unit 12, 13 or A101 by the control of the controller 11, A100 of the server 10, A10 and the updating is terminated (Step AS), a preparation process for executing the next unit game is executed, that is, the standby state for receiving the game start input in the above (A) is prepared (step AS13.).

When the game starts and an input is received, of returning to numeral A in FIG. 50 as for the processes of steps AS1 to AS13, a process of repeating the subroutine from the start to the end of a unit game until a turn or a stage is terminated is executed. That is, the process of (A) to (E) is executed.

In this embodiment, being the characteristic of social games, the concept of the end of the game does not exist, and when the player interrupts the communication state of the terminal 20, A20 with the server 10, A10 by the player's intention, or when the communication state worsens and is interrupted regardless of the operation on the terminal 20, A20 of the player it is preferable that, the next time the terminal 20, A20 with the server 10, A10, to configure to perform a known validation process (not shown) described above and then transmit and receive the data put on the signal in the terminal 20, A20 and the server 10, A10. Therefore, the validation process is inserted every time the connection is interrupted, and thus a little more time is required in such a case than in the case where no validation process exists.

Accordingly, it is so configured that the frequency of transmission and receiving of the server (10, A10) and the terminal 20, A20 is controlled to be limited to only the start and end of the unit game. (In short, no input for the player to execute the game in real time is necessary, and transmission and receiving for the updating process of the game progress information to the server only at the timing which does not affect the success or failure of the game even when the input timing is delayed or the communication state itself is interrupted)

This allow such a constitution that even if communication between the terminal 20, A20 and the server 10, A10 does not occur during the execution of the unit game, the terminal 20, A20 executes the first program by the controller 21, so that the game can be played regardless of the communication state. Therefore, even in fighting games and like games where a large amount of input signals are generated during the games, the game can be played comfortably with no stress.

Further, in such a case that the game progress information is put on a signal and transmitted between the terminal 20, A20 and the server 10, A10 at the end of the unit game, when both controllers 11, A100, 21 on the terminal 20, A20 and server 10, A10 side determine that the communication between the terminal 20, A20 and the server 10, A10 is continuously established, it is desirably so configured that the server 10, A10 transmits the data necessary for the next game to the terminal 20, A20 without performing a validation process.

Embodiment 3

The game contents of this invention are applicable to a shooting game project. Although the hardware environment is similar to that in Embodiments and Examples 1 and 2, the genre of this Example is a shooting game, while the games described above are fighting games and card games. The concept of this project is to allow players to play a social network game in a small chunk of time and in special environments, such as in a car. That is, a plurality of stages are stored by the storage unit 13, and based on the stage data and the game program stored in this storage unit 13, the controller 11 and/or 21 execute a shooting game, where the play time of each stage is set to 1 to 2 minutes. Such ease of game play that a single play can be completed quickly is suitable for social network games which are often played to kill time while in a train for a few stops or while waiting for a bus.

Moreover, generally in social games, customers are attracted by throwing events from time to time, but the new configuration is that even if the players defeat the same BOSS character, their game outcomes differ depending on the absolute time used to defeat. The game outcome is the stage appearing after defeating the BOSS character and a plurality of stages (it branches) which appear after defeating the boss character are stored in the storage unit 13. The controller 11 executes a control process in which the stage to appear is determined by the absolute time on the game managed by the server which is obtained by the timer (not shown) provided in the server 10, the server being common to the terminals 20 (A20).

As is often the case in social network games, many players stop playing the game because their friends have already cleared many stages ahead of them. By so configuring that the controller 11 executes the process described above, such dropout players can be easily and effectively reduced.

Industrial Availability

This invention improves, in playing a fighting game using a terminal executing a social network game by operating a touch panel, the operability to a function suitable for a fighting game. In addition, the invention provides a program for controlling the communication timing between a server and a portable terminal, which is suitable for two peculiarities: fighting games and shooting games where game input are frequently made; and social network games which require special environment where its progress needs a cellular wireless communication connection with an external server.

What is claimed is:

1. A system configured to execute a network game, the system including a user terminal in communication with a server,
   the user terminal comprising:
   a user input device;
   a display device;
   a storage device storing a control program; and,
   a controller, wherein,
   the controller controls communication timing between the user terminal and the server under direction of the control program and is configured to execute the following processes:
   a) when a game start input signal is received from the user input device from the user terminal, starting the network game, b) storing a game score in the storage device of the user terminal, c) forcibly ending the network game when a predetermined end trigger of the network game is detected, d) after or simultaneously with the process (c), transmitting at least one of the network game score stored in the storage device and network game outcome information associated with the game score to the server, the server transitioning to a standby state for receiving game update information based on the game outcome information, and, e) upon input of the user input device, switching from a server reception-disabled state to a reception-enabled state; and wherein, the controller is programmed to, during execution of the network game:

when an opponent character displayed on the display device is displayed as floating in air, and until the opponent character reaches a predetermined lower point position, which triggers a termination of the network game, calculate a game score associated with a cumulative number of hits of a technique of an operated character on the opponent character made in response to an input on the user input device, and wherein, the controller is further programmed to perform:

a process of controlling descent of an opponent character based on pre-stored descent control data;

a process of determining an outcome of success or failure of a technique operated upon the opponent character, in response to pre-stored data for determining failure or success of the technique, the pre-stored data for determining failure or success of the technique including data corresponding to a plurality of techniques and a timing that an image of a specific technique is input via the user input device;

a process of executing, when the determination outcome is a success, a control to inhibit floating or descending of the opponent character in response to descent limiting data of each of the pre-stored plurality of techniques;

a process of executing, when the determination outcome is a success, a process of updating and storing cumulative data associated with a number of successes; and, transmitting the cumulative data to the server when the opponent character is determined as having reached the lower point position.

2. The system configured to execute a network game of claim 1, wherein, a first program is stored in a memory of the user terminal downloaded onto the user terminal from the server; and a second program, in which the user terminal executes the first program in response to an input to start a game from an input device of the user terminal, is stored in a memory of the server and is configured to execute the network game on the user terminal in cooperation with the first program, wherein:

(A) in response to an acceptance of the input to start the network game from the input device of the user terminal, causing the first program to transmit a signal requesting connection to the server in which the second program is stored, (B) in response to receiving the signal, causing the second program to prepare data configured to execute the network game based on game progress information contained in the signal, download the prepared data onto the user terminal, and store the prepared data in the memory of the user terminal, (C) the first program sets the network game to be executable upon storing of the prepared data in the memory of the user terminal, and causes the user terminal to execute a process to accept game input to the input device, (D) in response to a determination by the execution process of the first program that a single turn or stage has ended in the network game executed at the terminal, transmitting the signal to request connection to the server in which the second program is stored automatically by the execution of the first game program, (E) based on the game progress information contained in the signal, updating the game progress information stored in the user terminal at the server corresponding to terminal identification data contained in the signal, (F) subsequently executing the above processes (B) to (E), and controlling a transmission frequency of the server and the terminal to occur only at the start of the network game and the end of the network game.

3. The system configured to execute a network game of claim 1, wherein the user terminal comprises one of a smart phone and electronic tablet.

4. The system configured to execute a network game of claim 1, wherein the user input device comprises a touch-screen-type device.

5. The system configured to execute a network game of claim 1, wherein the user input device comprises a button.

6. The system configured to execute a network game of claim 1, wherein the display device comprises a touch-screen-type device.

7. The system configured to execute a network game of claim 1, wherein the user terminal comprises one of a smart phone and electronic tablet.

8. The system configured to execute a network game of claim 2, wherein the user input device comprises a touch-screen-type device.

9. The system configured to execute a network game of claim 2, wherein the user input device comprises a button.

10. The system configured to execute a network game of claim 2, wherein the display device comprises a touch-screen-type device.

* * * * *